US009161076B2

(12) United States Patent
Kawai et al.

(10) Patent No.: US 9,161,076 B2
(45) Date of Patent: Oct. 13, 2015

(54) INFORMATION PROCESSING SYSTEM, SERVER SYSTEM, TERMINAL SYSTEM, INFORMATION PROCESSING PROGRAM, AND INFORMATION PRESENTATION METHOD

(71) Applicant: NINTENDO CO., LTD., Kyoto (JP)

(72) Inventors: Eizi Kawai, Kyoto (JP); Atsushi Watanabe, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/661,827

(22) Filed: Oct. 26, 2012

(65) Prior Publication Data

US 2013/0111531 A1 May 2, 2013

(30) Foreign Application Priority Data

Oct. 28, 2011 (JP) ................................ 2011-236765
Sep. 28, 2012 (JP) ................................ 2012-216015

(51) Int. Cl.
H04N 7/173 (2011.01)
H04N 21/41 (2011.01)
H04N 21/422 (2011.01)
H04N 21/43 (2011.01)
H04N 21/436 (2011.01)
H04N 21/478 (2011.01)
(Continued)

(52) U.S. Cl.
CPC ....... H04N 21/4126 (2013.01); H04N 21/4222 (2013.01); H04N 21/42203 (2013.01); H04N 21/4305 (2013.01); H04N 21/43615 (2013.01); H04N 21/4781 (2013.01); H04N 21/4882 (2013.01); H04N 21/8106 (2013.01)

(58) Field of Classification Search
None
See application file for complete search history.

(56) References Cited

U.S. PATENT DOCUMENTS 6,921,336 B1 7/2005 Best
7,712,125 B2 * 5/2010 Herigstad et al. ............. 725/141
2002/0162120 A1 10/2002 Mitchell
(Continued)

FOREIGN PATENT DOCUMENTS

GB 2 442 259 4/2008
JP 2001-275173 10/2001
(Continued)

OTHER PUBLICATIONS

Mar. 18, 2013 European Search Report for EP 12189534.6, 6 pages.
(Continued)

Primary Examiner — Jason Salce
Assistant Examiner — William J Kim
(74) Attorney, Agent, or Firm — Nixon & Vanderhye P.C.

(57) ABSTRACT

An information processing system comprises a terminal system which includes a terminal device and also comprises a server system. In the terminal system, a microphone provided in the terminal device senses a sound in the vicinity thereof. Sound information representing the sound sensed by the microphone or a feature of the sound is transmitted to the server system. In the server system, the sound in the vicinity of the terminal device is specified based on the sound information. Also, presentation information to be presented by the terminal device is specified based on the specified sound, and the presentation information is transmitted to the information processing device. The terminal system receives displays the presentation information transmitted from the server, and presentation information is displayed on a display unit of the terminal device.

18 Claims, 24 Drawing Sheets

(51) Int. Cl.
*H04N 21/488* (2011.01)
*H04N 21/81* (2011.01)

(56) References Cited

U.S. PATENT DOCUMENTS

| | | |
|---|---|---|
| 2003/0216177 A1 | 11/2003 | Aonuma et al. |
| 2005/0210502 A1 | 9/2005 | Flickinger et al. |
| 2007/0022437 A1* | 1/2007 | Gerken ............ 725/41 |
| 2007/0124775 A1* | 5/2007 | DaCosta ............ 725/62 |
| 2008/0082510 A1* | 4/2008 | Wang et al. ............ 707/3 |
| 2008/0178241 A1* | 7/2008 | Gilboy ............ 725/114 |
| 2009/0172780 A1 | 7/2009 | Sukeda et al. |
| 2009/0249388 A1 | 10/2009 | Seidel et al. |
| 2010/0166389 A1 | 7/2010 | Knee et al. |
| 2010/0192173 A1 | 7/2010 | Mizuki et al. |
| 2010/0199318 A1* | 8/2010 | Chang et al. ............ 725/97 |
| 2011/0190052 A1 | 8/2011 | Takeda et al. |
| 2011/0247042 A1* | 10/2011 | Mallinson ............ 725/86 |
| 2012/0192222 A1 | 7/2012 | Kumar et al. |
| 2012/0192228 A1 | 7/2012 | Zito et al. |

FOREIGN PATENT DOCUMENTS

| | | |
|---|---|---|
| JP | 2009-159188 | 7/2009 |
| JP | 2009-177540 | 8/2009 |
| JP | 2010-177939 | 8/2010 |
| JP | 2010-273060 | 12/2010 |
| JP | 2011-193325 | 9/2011 |

OTHER PUBLICATIONS

Office Action issued in U.S. Appl. No. 13/661,899 dated May 14, 2014.

Office Action issued in U.S. Appl. No. 13/661,899 dated Aug. 29, 2014.

Office Action issued in U.S. Appl. No. 13/661,899 dated Apr. 14, 2015.

Office Action issued in U.S. Appl. No. 13/661,899 dated Jul. 31, 2015.

* cited by examiner

INFORMATION PROCESSING SYSTEM, SERVER SYSTEM, TERMINAL SYSTEM, INFORMATION PROCESSING PROGRAM, AND INFORMATION PRESENTATION METHOD

CROSS REFERENCE TO RELATED APPLICATION

The disclosures of Japanese Patent Application No. 2011-236765 filed on Oct. 28, 2011 and Japanese Patent Application No. 2012-216015 filed on Sep. 28, 2012 are incorporated herein by reference.

FIELD

The technology herein discloses an information processing system and the like (an information processing system; and a server system, a terminal system, an information processing program, and an information presentation method which are usable in the information processing system) for transmitting information from a server or the like via a network and presenting the information on the side of a terminal.

BACKGROUND AND SUMMARY

Conventionally, there are systems for acquiring a video on the side of a terminal from a server via the Internet and displaying the video on the side of the terminal. In such a system, it is conceivable that, for example, a game device at home acquires a video content from the server by the Internet and causes a TV at home to display the video content.

It is not possible to present other information (e.g., advertisement information or additional information) to a user together with the video content.

Therefore, this application discloses an information processing system and the like which can present other information to be presented to the user together with the video content effectively. This application also discloses an information processing system and the like which can present information useful for the user.

(1)

A non-limiting example of information processing system as described herein comprises a terminal system including a terminal device and also comprises a server system.

The terminal system includes a microphone, a transmission unit, and a display unit. The microphone is provided in the terminal device and senses a sound in the vicinity thereof. The transmission unit transmits sound information representing the sound sensed by the microphone or a feature of the sound to the server system. The display unit is provided in the terminal device.

The server system includes a content specification unit and a presentation information specification unit. The content specification unit specifies a video content which is being reproduced in the vicinity of the terminal device, based on the sound information. The presentation information specification unit specifies presentation information to be presented together with the specified video content, in accordance with the video content, and transmits the presentation information to the terminal system.

The terminal system displays the presentation information transmitted from the server system on the display unit.

According to the configuration of (1), in the case where the video content is reproduced on the terminal side, the reproduction sound of the video content is sensed by the microphone, and the sound information on the reproduction sound is transmitted to the server system. The server system specifies the video content based on the reproduction sound, and the presentation information corresponding to the specified video content is transmitted to the terminal side. Owing to this, presentation information suitable to the video content reproduced on the terminal side can be presented to the user. Namely, according to the configuration of (1), information useful for the user can be presented, and also other information can be presented to the user effectively together with the video content.

(2)

Another example of information processing system as described herein comprises a terminal system including a terminal device and an information processing device, and also comprises a server system.

The terminal device includes a microphone for sensing a sound in the vicinity thereof and a display unit. The information processing device includes a transmission unit for transmitting sound information representing the sound sensed by the microphone or a feature of the sound to the server system.

The server system includes a sound specification unit and a presentation information specification unit. The sound specification unit specifies the sound in the vicinity of the terminal device based on the sound information. The presentation information specification unit specifies presentation information to be presented by the terminal device in accordance with the specified sound, and transmits the presentation information to the information processing device.

The information processing device receives the presentation information transmitted from the server system and causes the display unit of the terminal device to display the presentation information.

According to the configuration of (2), the sound on the terminal side is sensed by the microphone, and sound information on the sensed sound is transmitted to the server system. The server system specifies the presentation information corresponding to the sensed sound based on the sound information and transmits the presentation information to the terminal side. Owing to this, presentation information corresponding to the sound on the terminal side (reproduction sound of the video content, sound of conversation of the user, etc.) can be presented to the user. Therefore, according to the configuration of (2), information useful for the user can be presented.

(3)

The sound specification unit may specify a video content which is being reproduced in the vicinity of the terminal device.

According to the configuration of (3), like according to the configuration of (1) described above, other information can be presented to the user effectively together with the video content.

(4)

The presentation information specification unit may specify, as the presentation information, advertisement information on a product or a service which is regarding the video content and/or which appears in the video content.

According to the configuration of (4), a video content and/or advertisement information corresponding to the specific content the video content can be presented to the user. Therefore, advertisement information can be presented to the user effectively, and thus the advertizing effect can be improved. Since the advertisement information is not displayed on the display device which displays the video content, the advertisement information does not block the video content displayed on the display device, and thus the video content can be presented to the user in an easy-to-view manner.

(5)

The server system may further include a timing determination unit for determining a timing to present the presentation information based on the specified video content. In this case, the terminal system displays the presentation information on the display unit at the determined timing.

According to the configuration of (5), the server system can control the timing to present the presentation information. Owing to this, the presentation information can be presented at an appropriate timing, and therefore can be presented to the user effectively.

(6)

The timing determination unit may specify, based on the sound information, a time point of the sound sensed by the microphone on a time axis of the specified video content, and determine the timing to present the presentation information based on the time point and a time table of the specified video content.

According to the configuration of (6), the timing to present the presentation information can be set easily to an appropriate timing suitable to the specific content of the video content.

(7)

The terminal system may further include a device control unit for controlling a predetermined display device capable of reproducing the video content, regarding reproduction and/or display of the video content.

According to the configuration of (7), the terminal system can change the operation of a predetermined display device. Owing to this, a video content and presentation information can be presented to the user effectively.

(8)

The device control unit may be provided in the terminal device.

According to the configuration of (8), the user can operate a predetermined display device by use of the terminal device. Therefore, the ease of operation on the video content can be improved.

(9)

The server system may further include an instruction transmission unit for specifying, based on the specified video content, a control command regarding the reproduction and/or the display of the video content, and transmitting the control command. In this case, the device control unit controls the predetermined display device based on the control command received from the server system.

According to the configuration of (9), the operation of the predetermined display device can be controlled on the server side. For example, the server system can control the operation of the predetermined display device such that the video content and the presentation information are presented to the user effectively.

(10)

The server system may further include a statistics generation unit for generating statistics information on the specified video content regarding the terminal system, and transmitting the statistics information to the terminal system.

According to the configuration of (10), statistics information such as, for example, a past viewing history or the like of the video content can be presented to the user. Therefore, information useful for the user can be presented.

(11)

The server system may further include a content transmission unit for specifying, based on the specified video content, a sequel video content to the video content, and transmitting the sequel video content to the terminal system. The terminal system causes a display device of the terminal device and/or a predetermined display device separate from the terminal device to display the sequel video content.

According to the configuration of (11), when the video content is terminated, the information processing system can present the sequel video content to the video content to the user. Owing to this, information useful for the user can be presented.

(12)

Still another example of information processing system as described herein comprises a terminal system including a terminal device and also comprises a server system.

The terminal system includes a microphone, a transmission unit, and a display unit. The microphone is provided in the terminal device and senses a sound in the vicinity thereof. The transmission unit transmits sound information representing the sound sensed by the microphone or a feature of the sound to the server system. The display unit is provided in the terminal device.

The server system includes a sound specification unit and a presentation information specification unit. The sound specification unit specifies the sound in the vicinity of the terminal device based on the sound information. The presentation information specification unit specifies presentation information to be presented by the terminal device based on the specified sound, and transmits the presentation information to the information processing device.

The terminal system receives the presentation information transmitted from the server system and causes the display unit of the terminal device to display the presentation information.

According to the configuration of (12), like according to the configuration of (2), information useful for the user can be presented.

This specification discloses a server system (server device) having the same functions as those of the server system included in the information processing system according to any one of (1) through (12). This specification also discloses a terminal system (terminal device) having the same functions as those of the terminal system included in the information processing system. This specification further discloses an information processing program causing a computer to act as units equivalent to the units of the server system or the terminal system. This specification further discloses an information presentation method which is carried out by the information processing system.

According to the information processing system and the like described above, information useful for the user can be presented by the terminal device of the terminal system.

These and other objects, features, aspects and advantages will become more apparent from the following detailed description when taken in conjunction with the accompanying drawings.

DETAILED DESCRIPTION OF NON-LIMITING EXAMPLE EMBODIMENTS

First Embodiment

1-1. Overall Configuration of Video Display System

Figure 1:
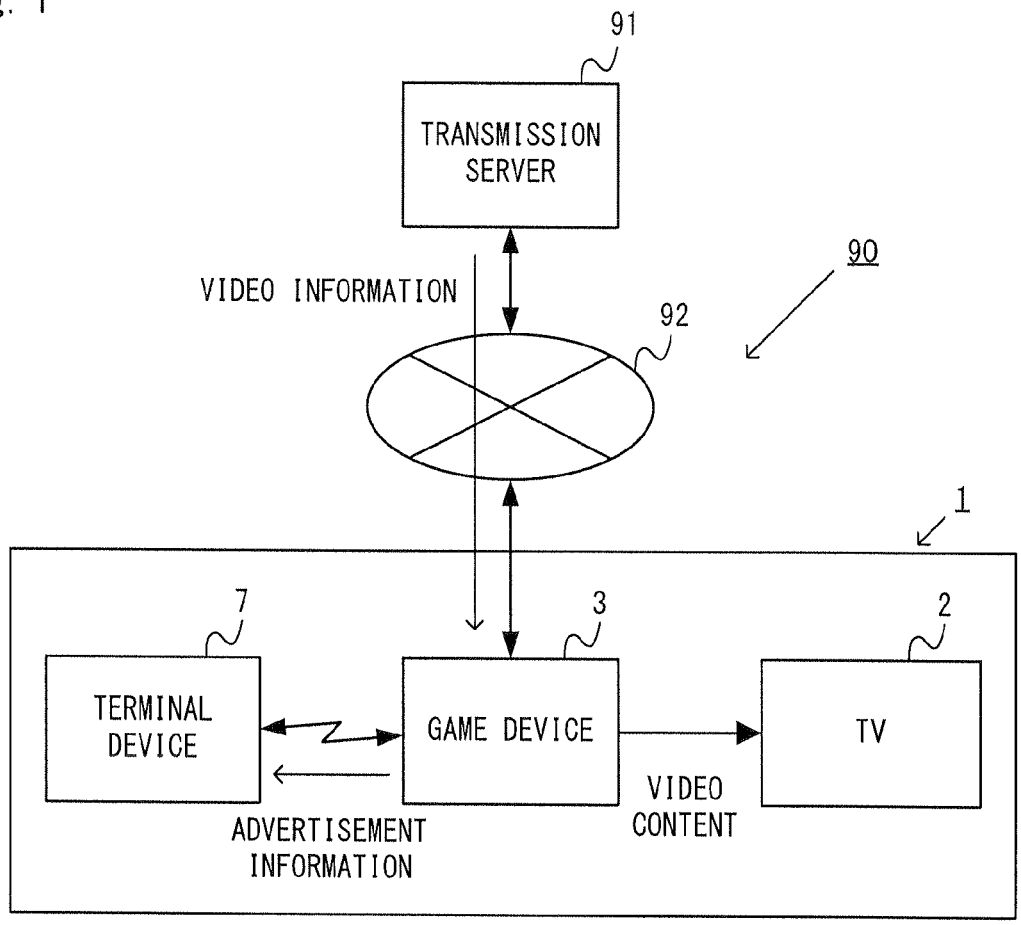
FIG. 1 is a block diagram showing an example non-limiting video display system in a first embodiment.

Hereinafter, an example of a video display system according to a first embodiment will be described with reference to the drawings. FIG. 1 is a block diagram showing an example of video display system according to the first embodiment. As shown in FIG. 1, a video display system 90 includes a server-side transmission server 91 and a terminal-side game system 1. The transmission server 91 and the game system 1 are mutually communicable via a network 92 such as, for example, the Internet or the like. In the first embodiment, the video display system 90 displays a video content and advertisement information transmitted from the transmission server 91 separately on two display devices in the game system 1. Owing to this, the video content and the advertisement information can be presented to a user (viewer) effectively.

The transmission server 91 transmits video information to a game device 3 via the network 92. In the first embodiment, the video information is information including at least a combination of the video content and the advertisement information. The video content is a moving image to be presented to the user and is displayed on a predetermined display device (in the first embodiment, TV 2) in the game system 1. The video content may be any content, and may be, for example, a TV program, a film or the like. The TV program transmitted as the video content may be a program planned to be broadcast, a program which is being broadcast, or a program which has been broadcast. In the first embodiment, the video content which has been selected by a selection instruction from the game system 1 (selected by the user) is transmitted from the transmission server 91 to the game system 1. FIG. 1 shows one transmission server 1, but the game system 1 may be capable of accessing a plurality of transmission servers. The video display system 90 may include a plurality of game systems 1.

The advertisement information is information including an image to be presented to the user together with the video content. The advertisement information is displayed on a portable display device (in the first embodiment, terminal device 7) in the game system 1. The advertisement information may be specifically any information, and typically, is an image which advertizes a product or a service. The advertisement information may be, for example, a moving image such as a commercial included in a TV program or a still image. The advertisement information is not limited to only to a moving image or a still image, and may be an image, the displayed content of which is operated (changed) by the user such as, for example, an image on a web page, a game image or the like. The advertisement information may be on a product or a service which is irrelevant to the video content, or may be on the video content itself. For example, the advertisement information may be a version for sample viewing of the video content (typically, in the case where the video content itself is charged).

The game system 1 receives the video information via the network 92. The game system 1 outputs the video content included in the received video information to one of the display devices (TV 2) to be displayed, and also outputs the advertisement information included in the video information to the other portable display device (terminal device 7) to be displayed.

The game system 1 may include any devices. In the first embodiment, as shown in FIG. 1, the game system 1 includes the game device 3 as an example of information processing device, the TV 2 as an example of display device, and the terminal device 7 as an example of portable display device. In other embodiments, the game device 3 and the TV 2 may be integral with each other. Namely, the game system 1 may include an information processing device having a function of receiving the video information and a function of displaying the video content. In still other embodiments, the game device 3 and the terminal device 7 may be integral with each other. Namely, the game system 1 may include an information processing device (may or may not be portable) having a function of receiving the video information and a function of displaying the advertisement information.

In the first embodiment, the game device 3 receives the video information from the transmission server 91. The video content included in the video information is output to the TV 2. The TV 2 displays the video content input from the game device 3. The advertisement information included in the video information is output to the terminal device 7. The terminal device 7 displays the advertisement information received from the game device 3. In the first embodiment, the communication between the game device 3 and the TV 2 is wired communication. In other embodiments, the communication between the game device 3 and the TV 2 may be wireless communication. In the first embodiment, the communication between the game device 3 and the terminal device 7 is wireless communication. In other embodiments, the communication between the game device 3 and the terminal device 7 may be wired communication.

As described above, in the video display system 90 according to the first embodiment, the video content and the advertisement information are transmitted from the transmission server 91, and the game system 1 uses two display devices to display the video content on one of the display devices (TV 2) and display the advertisement information on the other display device (terminal device 7). Therefore, according to the first embodiment, while the video content is being reproduced by the TV 2, the advertisement information can be reproduced by the terminal device 7. The user having the terminal device 7 can view the advertisement information on the terminal device 7 at hand while viewing the video content on the TV 2. According to the first embodiment, the advertisement information can be displayed for the same time duration as the reproduction time duration of the video content. Therefore, the advertisement can be presented to the user effectively and thus the advertizing effect can be improved. Also, according to the first embodiment, the advertisement information displayed on the terminal device 7 is not displayed on the TV 2. Therefore, the advertisement information does not block the video content displayed on the TV 2, and thus the video content can be presented to the user in an easy-to-view manner.

1-2. Configuration of Transmission Server

Figure 2:
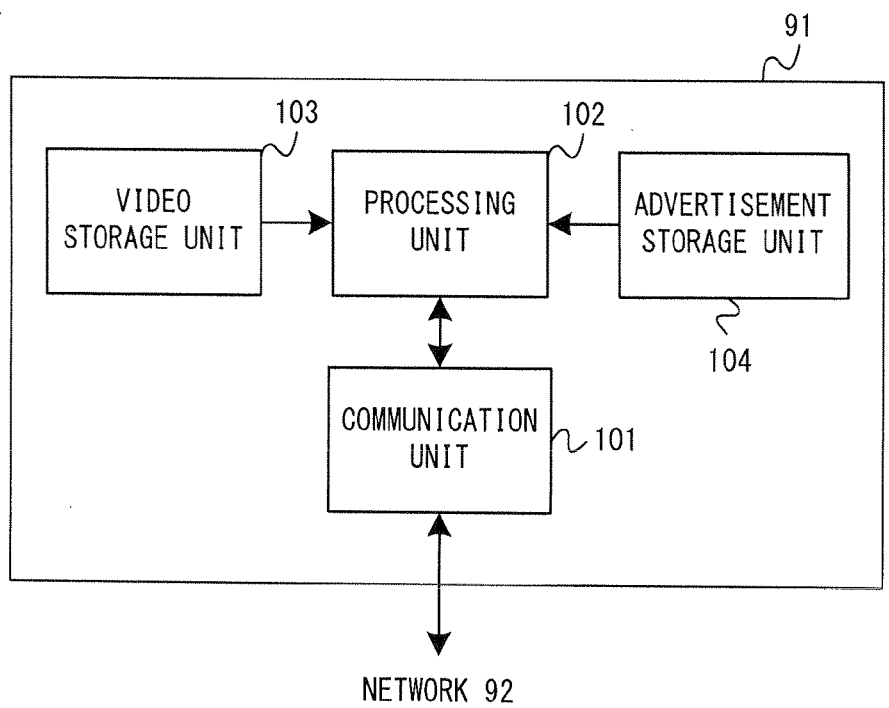
FIG. 2 is a block diagram showing a configuration of an example non-limiting transmission server in the first embodiment.

Hereinafter, a configuration of the transmission server 91 will be described. FIG. 2 is a block diagram showing an example of structure of the transmission server 91. As shown in FIG. 2, the transmission server 91 includes a communication unit 101, a processing unit 102, a video storage unit 103, and an advertisement storage unit 104. The transmission server 91 may have any structure which is communicable with an external device (game system 1, etc.) via the network 92 and has a function of transmitting video information in response to an acquisition request from the external device. For example, the transmission server 91 includes one or more information processing devices. For example, the video storage unit 103 and the advertisement storage unit 104 may be included in different servers. In such a case, the entirety of the servers will be referred to as a "transmission server".

The communication unit 101 is communicable with the network 92, and performs data transmission and reception via the network 92 to and from the external device. Data received from the external device is output to the processing unit 102 by the communication unit 101. Data input to the communication unit 101 from the processing unit 102 is transmitted to the external device by the communication unit 101 via the network 92.

The processing unit 102 is an information processing unit for executing information processing in the transmission server 91. The processing unit 102 includes a CPU, a memory and the like for executing the information processing. In the first embodiment, the processing unit 102 generates the video information in response to an acquisition request from the external device (game system 1) and transmits the video information to the external device via the communication unit 101. Processes executed by the processing unit 102 will be described later in more detail.

The video storage unit 103 is a storage unit for storing (saving) data of the video content. The video content stored on the video storage unit 103 is read by the processing unit 102 when appropriate and is transmitted to the external device as the video information. The advertisement storage unit 104 is a storage unit for storing (saving) the advertisement information. The advertisement information stored on the advertisement storage unit 104 is read by the processing unit 102 when appropriate and is transmitted to the external device as the video information.

1-3. Overall Configuration of Game System

Figure 3:
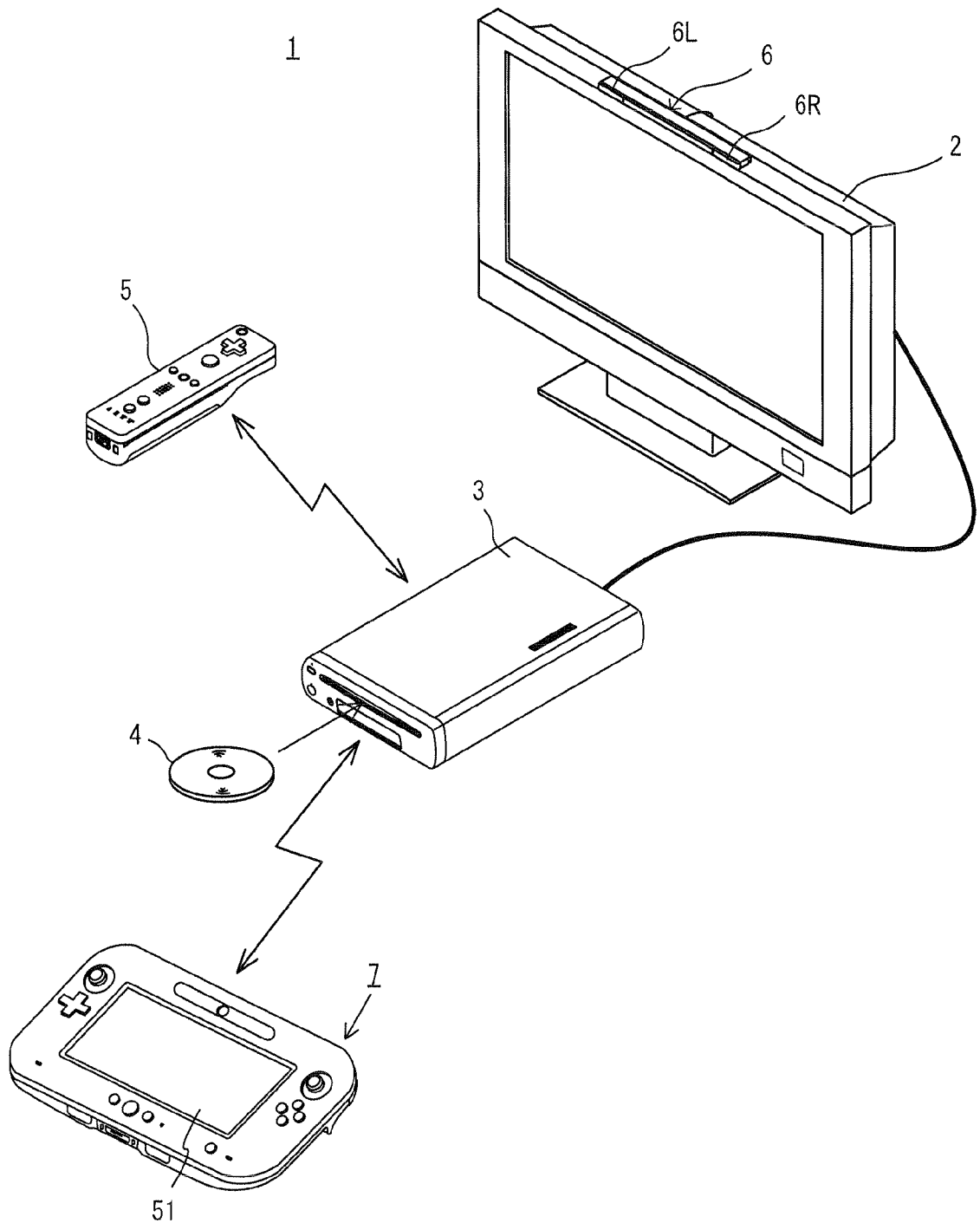
FIG. 3 is an external view of an example non-limiting game system in the first embodiment.

Hereinafter, a configuration of the game system will be described. FIG. 3 is an external view of an example game system. As shown in FIG. 3, a game system 1 includes a stationary display device 2 such as a TV receiver or the like (hereinafter, referred to as the "TV 2"), a stationary game device 3, an optical disc 4, a controller 5, a marker device 6, and a terminal device 7. In the game system 1, the game device 3 executes a game process based on a game operation performed using the controller 5 and/or the terminal device 7, and a game image obtained through the game process is displayed on the TV 2 and/or the terminal device 7. In other embodiments, the game system 1 may include an information processing device which does not have a function of executing game processes, instead of the game device 3. Alternatively, the game system 1 may not include the optical disc 4, the controller 5, or the marker device 6.

In the game device 3, the optical disc 4, which is an example of information storage medium used for the game device 3 in a replaceable manner, is removably inserted. An information processing program (typically, game program) to be executed by the game device 3 is stored on the optical disc 4. The game device 3 has, on a front surface thereof, an insertion opening for the optical disc 4. The game device 3 reads and executes the information processing program stored on the optical disc 4 which is inserted into the insertion opening, to execute the game process.

The TV 2, which is an example of predetermined display device, is connected to the game device 3 by a connecting cord. The TV 2 is a stationary display device having a larger screen than a display unit (LCD 51) of the terminal device 7. The TV 2 displays an image output from the game device 3. The TV 2 includes a speaker 2a (FIG. 4) for outputting a sound which is output from the game device 3.

The marker device 6 is provided along a periphery of the screen (on the upper side with respect to the screen in FIG. 3) of the TV 2. A user (player) can perform a game operation by moving the controller 5, the details of which will be described later, and the marker device 6 is used by the game device 3 for calculating the movement, position, attitude, etc. of the controller 5. The marker device 6 includes two markers 6R and 6L on opposite ends thereof. Specifically, the marker 6R (as well as the marker 6L) includes one or more infrared LEDs (Light Emitting Diodes), and emits infrared light in a forward direction from the TV 2. The marker device 6 is connected to the game device 3 in a wired connection (or a wireless connection), and the game device 3 can control lighting of each infrared LED of the marker device 6. The marker device 6 is portable so that the user can install the marker device 6 in any desired position. While FIG. 3 shows an embodiment in which the marker device 6 is arranged on top of the TV 2, the position and the direction of arranging the marker device 6 are not limited to this particular arrangement.

The controller 5 provides the game device 3 with operation data representing a content of an operation performed on the controller 5 itself. The controller 5 and the game device 3 can wirelessly communicate with each other. In other embodiments, the controller 5 and the game device 3 may be connected in a wired manner. While FIG. 3 shows only one controller 5 included in the game system 1, the game system 1 may include a plurality of controllers 5.

The terminal device 7 is portable and is of a size that can be held by the user. In use, the user can hold and move the terminal device 7 or can place the terminal device 7 in any desired position. As will be described in detail later, the terminal device 7 includes an LCD (Liquid Crystal Display) 51, and an input unit (touch panel 52, gyrosensor 74, etc. to be described later). The terminal device 7 can communicate with the game device 3 wirelessly (or in a wired manner). The terminal device 7 receives data on an image (e.g., advertisement image) transmitted from the game device 3, and displays the image on the LCD 51. In the first embodiment, the LCD is used as the display device, but the terminal device 7 may include any other display device such as a display device utilizing EL (Electro Luminescence) or the like. The terminal device 7 also transmits operation data representing a content of an operation performed thereon to the game device 3.

1-4. Internal Configuration of Game Device 3

Figure 4:
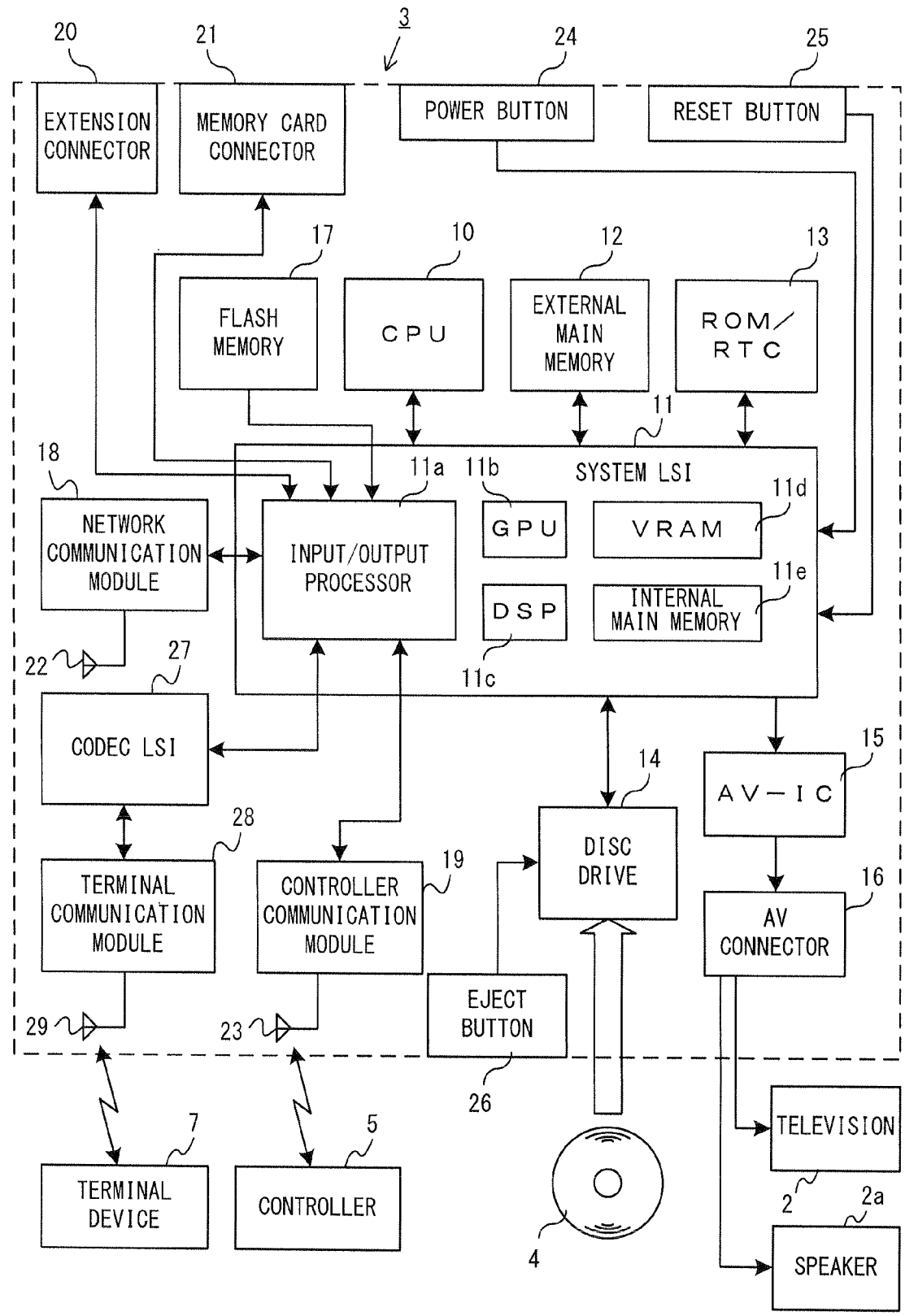
FIG. 4 is a block diagram showing an internal configuration of an example non-limiting game device.

Now, an internal configuration of the game device 3 will be described with reference to FIG. 4. FIG. 4 is a block diagram illustrating an internal configuration of the example game device 3. The game device 3 includes a CPU (Central Processing Unit) 10, a system LSI 11, an external main memory 12, a ROM/RTC 13, a disc drive 14, an AV-IC 15, and the like.

The CPU 10 executes a game process by executing a game program stored on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs a process of controlling data transmission between the respective components connected thereto, generating an image to be displayed, obtaining data from an external device(s), or the like. The internal configuration of the system LSI 11 will be described below. The external main memory 12 is of a volatile type and stores a program such as a game program read from the optical disc 4, a game program read from a flash memory 17 or the like, and various data. The external main memory 12 is used as a work area or a buffer area for the CPU 10. The ROM/RTC 13 includes a ROM (so-called boot ROM) incorporating a boot program for the game device 3, and a clock circuit (RTC: Real Time Clock) for counting time. The disc drive 14 reads program data, texture data, or the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a through 11e are connected with each other through an internal bus.

The GPU 11b, acting as a part of a rendering mechanism, generates an image in accordance with a graphics command (rendering instruction) from the CPU 10. The VRAM 11d stores data (data such as polygon data, texture data or the like) used by the GPU 11b to execute a graphics command. For generating an image, the GPU 11b generates image data using data stored on the VRAM 11d. In the first embodiment, the game device 3 generates both of an image to be displayed on the TV 2 and an image to be displayed on the terminal device 7. Hereinafter, the image to be displayed on the TV 2 may be referred to as a "TV image" and the image to be displayed on the terminal device 7 may be referred to as a "terminal image".

The DSP 11c, functioning as an audio processor, generates sound data using sound data or sound waveform (e.g., tone quality) data stored on the internal main memory 11e or the external main memory 12. In the first embodiment, sounds (game sounds) to be generated are classified into two types as in the case of the game images, one being output by the speaker of the TV 2 and the other being output by speakers of the terminal device 7. Hereinafter, the sound to be output by the TV 2 may be referred to as a "TV sound", and the sound to be output by the terminal device 7 may be referred to as a "terminal sound".

Among the images and sounds generated by the game device 3 as described above, data on the image and data on the sound to be output by the TV 2 are read out by the AV-IC 15. The AV-IC 15 outputs the read-out image data to the TV 2 via an AV connector 16, and outputs the read-out sound data to the speaker 2a built in the TV 2. Thus, the image is displayed on the TV 2, and the sound is output by the speaker 2a. While the connection scheme between the game device 3 and the TV 2 may be any scheme, the game device 3 may transmit a control command for controlling the TV 2 to the TV 2 via a wired connection or a wireless connection. For example, an HDMI (High-Definition Multimedia Interface) cable in conformity with the HDMI standard may be used. According to the HDMI standard, it is possible to control the connected device by a function called CEC (Consumer Electronics Control). Thus, in the case where the game device 3 can control the TV 2, as when an HDMI cable is used, the game device 3 can turn on the power of the TV 2 or switch the input of the TV 2 from one to another at an appropriate timing.

Among the images and sounds generated by the game device 3, data on the image and data on the sound to be output by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to the network 92 such as the Internet or the like to communicate with an external information processing device (e.g., any of various types of servers such as the transmission server 91 or the like). Specifically, the input/output processor 11a can be connected to a network such as the Internet or the like via the network communication module 18 and the antenna 22, and can communicate with other information processing devices connected to the network. The input/output processor 11a regularly accesses the flash memory 17, and detects the presence or absence of any data to be transmitted to the network. When such data is detected, the input/output processor 11a transmits the data to the network 92 via the network communication module 18 and the antenna 22. Further, the input/output processor 11a receives data transmitted from an external information processing device and data downloaded from a download server, via the network, via the antenna 22 and via the network communication module 18, and stores the received data on the flash memory 17. The CPU 10 executes a game program to read data stored on the flash memory 17 and to use the data in the game program. The flash memory 17 may store saved game data (e.g., game result data or unfinished game data) of a game played using the game device 3 in addition to data exchanged between the game device 3 and an external information processing device. The flash memory 17 may also have a game program stored thereon.

The game device 3 can receive operation data from the controller 5. Specifically, the input/output processor 11a receives operation data transmitted from the controller 5 via the antenna 23 and the controller communication module 19, and stores (temporarily stores) the operation data in a buffer area of the internal main memory 11e or the external main memory 12.

The game device 3 can exchange image data, sound data or any other data with the terminal device 7. For transmitting an image (terminal image) to the terminal device 7, the input/output processor 11a outputs data on an image generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. The transmission of the image data from the game device 3 to the terminal device 7 may be performed such that delay is avoided as much as possible. Therefore, in the first embodiment, the codec LSI 27 compresses the image data using a compression technology with high efficiency such as, for example, the H.264 standard. Other compression technologies may be used, or the image data may be transmitted uncompressed if the communication speed is sufficiently high. The terminal communication module 28 is, for example, a Wi-Fi certified communication module, and may perform wireless communication at high speed with the terminal device 7 using a MIMO (Multiple Input Multiple Output) technology employed in, for example, the IEEE 802.11n standard, or may use other communication schemes.

In addition to the image data, the game device 3 also transmits sound data to the terminal device 7. Specifically, the input/output processor 11a outputs the sound data generated by the DSP 11c to the terminal communication module 28 via the codec LSI 27. The codec LSI 27 performs a compression process on the sound data as it does on the image data. The method of compressing the sound data may be any method. In other embodiments, the sound data may be transmitted uncompressed. The terminal communication module 28 transmits such compressed image data and sound data to the terminal device 7 via the antenna 29.

In addition to the image data and the sound data, the game device 3 transmits various types of control data (referred to as "terminal control data") to the terminal device 7 when necessary. The terminal control data is data representing an instruction to control a component included in the terminal device 7, for example, an instruction to control lighting of a marker unit (marker unit 55 shown in FIG. 10) or an instruction to control image capturing by a camera (camera 56 shown in FIG. 10). The input/output processor 11a transmits the terminal control data to the terminal device 7 in accordance with an instruction from the CPU 10. In the first embodiment, the codec LSI 27 does not perform a compression process on the terminal control data, but in other embodiments, the codec LSI 27 may perform a compression process. The data to be transmitted from the game device 3 to the terminal device 7 may be encrypted when necessary or may not be encrypted.

The game device 3 can receive various types of data from the terminal device 7. As will be described in detail later, in the first embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data transmitted from the game device 3 to the terminal device 7. Accordingly, the image data and the sound data are transferred from the terminal communication module 28 to the codec LSI 27, and subjected to a decompression process by the codec LSI 27 before being output to the input/output processor 11a. Meanwhile, the operation data from the terminal device 7 is smaller in size than the image data or the sound data and therefore may not be subjected to a compression process. The operation data may be encrypted when necessary or may not be encrypted. Accordingly, after being received by the terminal communication module 28, the operation data is output to the input/output processor 11a via the codec LSI 27. The input/output processor 11a stores (temporarily stores) the data received from the terminal device 7 in a buffer area of the internal main memory 11e or the external main memory 12.

The game device 3 can be connected to other devices or external storage mediums. Specifically, the input/output processor 11a is connected to the extension connector 20 and the memory card connector 21. The extension connector 20 is a connector for an interface, such as a USB or SCSI interface. The extension connector 20 can be connected to a medium such as an external storage medium, a peripheral device such as another controller, or a wired communication connector, and thus can communicate with a network in place of the network communication module 18. The memory card connector 21 is a connector for connecting thereto an external storage medium such as a memory card. For example, the input/output processor 11a can access an external storage medium via the extension connector 20 or the memory card connector 21 to store data on the external storage medium or read data from the external storage medium.

The game device 3 includes a power button 24, a reset button 25, and an eject button 26. The power button 24 and the reset button 25 are connected to the system LSI 11. When the power button 24 is turned on, power is supplied from an external power source to the components of the game device 3 via an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via, for example, the extension connector 20. Specifically, an extension device may include, for example, the codec LSI 27, the terminal communication module 28, and the antenna 29, and can be attached to or detached from the extension connector 20. Thus, by connecting the extension device to a game device which does not include the above components, the game device can communicate with the terminal device 7.

1-5. Configuration of Controller 5

Figure 5:
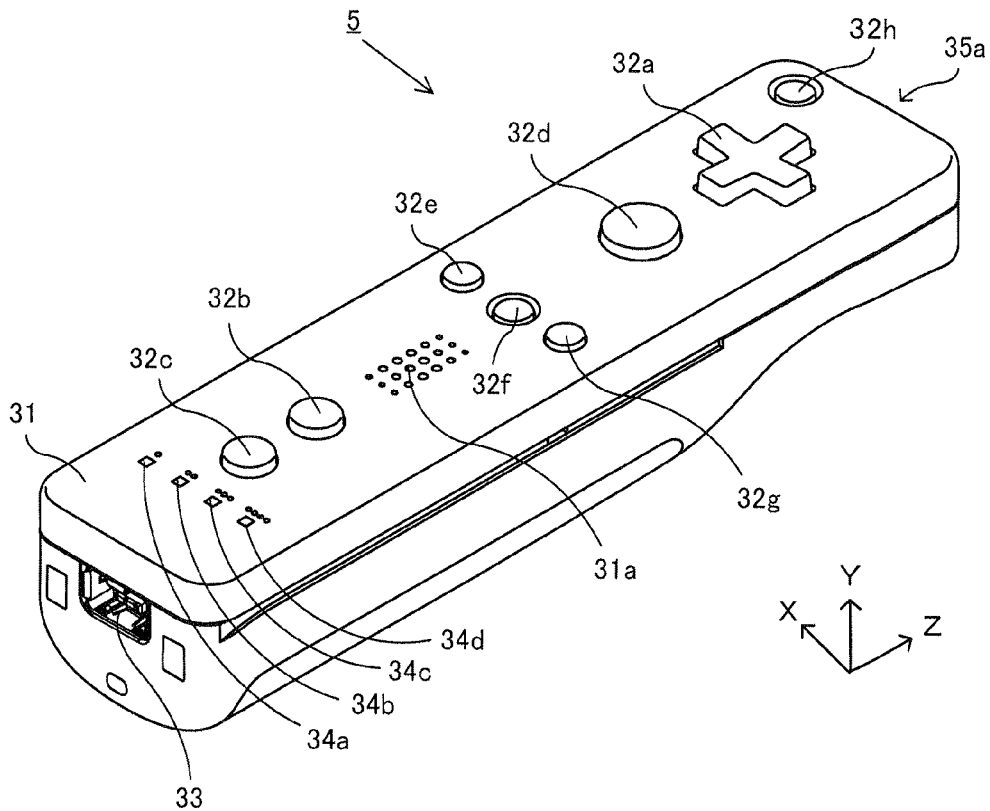
FIG. 5 is a perspective view showing an external configuration of an example non-limiting controller.
Figure 6:
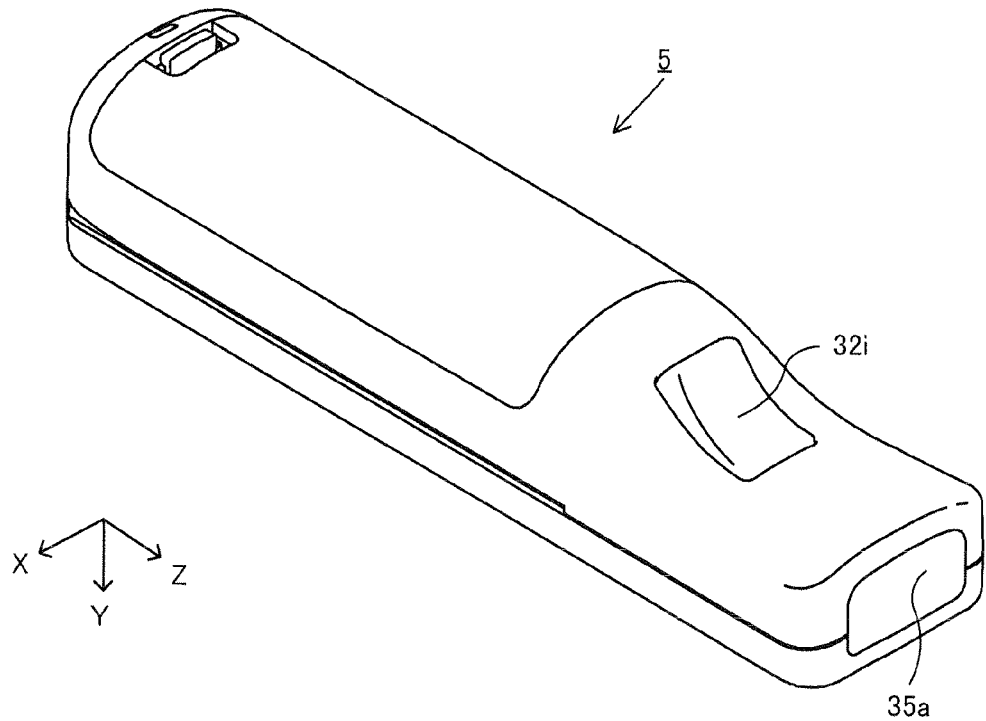
FIG. 6 is a perspective view showing an external configuration of an example non-limiting controller.

Now, with reference to FIGS. 5 through 7, the controller 5 will be described. FIG. 5 is a perspective view illustrating an external configuration of the example controller 5. FIG. 6 is a perspective view illustrating an external configuration of the controller 5. The perspective view of FIG. 5 shows the controller 5 as viewed from the top rear side thereof, and the perspective view of FIG. 6 shows the controller 5 as viewed from the bottom front side thereof. The controller 5 may be any controller device capable of being controlled by the player. In the first embodiment, the controller 5 includes buttons and sensors, and the player can perform button operations and an operation of moving the controller device itself. While the controller 5 does not include a display unit in the first embodiment, the controller 5 may include a display unit in other embodiments.

As shown in FIG. 5 and FIG. 6, the controller 5 includes a housing 31 formed by, for example, plastic molding. The housing 31 has a generally parallelepiped shape extending in a longitudinal direction from front to rear (Z-axis direction shown in FIG. 5), and as a whole is sized to be held by one hand of an adult or even a child. The user can perform an operation by pressing a button provided in the controller 5, and moving the controller 5 itself to change the position and the attitude (tilt) thereof.

The housing 31 has a plurality of operation buttons. As shown in FIG. 5, on a top surface of the housing 31, a cross button 32*a*, a first button 32*b*, a second button 32*c*, an A button 32*d*, a minus button 32*e*, a home button 32*f*, a plus button 32*g*, and a power button 32*h* are provided. In the example embodiment, the top surface of the housing 31 on which the buttons 32*a* through 32*h* are provided may be referred to as a "button surface". Meanwhile, as shown in FIG. 6, a recessed portion is formed in a bottom surface of the housing 31, and a B button 32*i* is provided on a rear slope surface of the recessed portion. The operation buttons 32*a* through 32*i* are appropriately assigned respective functions in accordance with the information processing program to be executed by the game device 3. The power button 32*h* is intended to remotely turn ON/OFF the game device 3.

On a rear surface of the housing 31, the connector 33 is provided. The connector 33 is used for connecting the controller 5 to another device (e.g., another sensor unit or controller). Both sides of the connector 33 on the rear surface of the housing 31 have an engagement hole 33*a* for preventing easy inadvertent disengagement of the above-described another device.

In a rear-side portion of the top surface of the housing 31, a plurality of (four in FIG. 5) LEDs 34*a* through 34*d* are provided. The controller 5 is assigned a controller type (number) so as to be distinguishable from another controller. The LEDs 34*a* through 34*d* are each used, for example, for informing the user of the controller type which is currently set for the controller 5, or for informing the user of remaining battery power of the controller 5. Specifically, when an operation is to be performed using the controller 5, one of the LEDs 34*a* through 34*d* corresponding to the controller type is lit up.

The controller 5 has an image-capturing/processing unit 35 (FIG. 7), and a light incident surface 35*a* through which light is incident on the image-capturing/processing unit 35 is provided on a front surface of the housing 31 as shown in FIG. 6. The light incident surface 35*a* is formed of a material transmissive of at least infrared light output by the markers 6R and 6L.

On the top surface of the housing 31, sound holes 31*a* for externally outputting a sound from a speaker (not shown) incorporated in the controller 5 is provided between the first button 32*b* and the home button 32*f*.

A substrate is fixed inside the housing 31, and the operation buttons 32*a* through 32*h*, the LEDs 34*a* through 34*d*, an acceleration sensor 37, an antenna 45, a speaker, a wireless module 44, and the like are provided on the substrate. These components are connected to a microcomputer 42 (FIG. 7) via lines (not shown) formed on the substrate or the like.

At a front edge of the substrate, the image-capturing/processing unit 35 is provided. The image-capturing/processing unit 35 includes an infrared filter 38, a lens 39, an image-capturing element 40 and an image processing circuit 41 (FIG. 7) located in this order from the front side of the controller 5. These components 38 through 41 are attached on a bottom main surface of the substrate.

Moreover on the substrate, the microcomputer 42 and a vibrator are provided. The vibrator is, for example, a vibration motor or a solenoid, and is connected to the microcomputer 42 via lines formed on the substrate or the like. The controller 5 is vibrated by actuation of the vibrator based on a command from the microcomputer 42. Thus, the vibration is conveyed to the user's hand holding the controller 5, and thus a so-called vibration-feedback game is realized.

In addition to the above components, the controller 5 includes a crystal oscillator for generating a basic clock for the microcomputer 42, an amplifier for outputting a sound signal to the speaker, etc.

The shape of the controller 5, the shape of each operation button, the number and the positions of acceleration sensor and vibrator and so on shown in FIGS. 5 and 6 are merely examples, and other shapes, numbers, and positions may be employed. Although in the first embodiment, the imaging direction of an image-capturing mechanism is a Z-axis positive direction, the imaging direction may be any direction. That is, the image-capturing/processing unit 35 (light incident surface 35*a* through which light is incident on the image-capturing/processing unit 35) of the controller 5 may not necessarily be provided on the front surface of the housing 31, but may be provided on any other surface on which light can be received from the outside of the housing 31.

Figure 7:
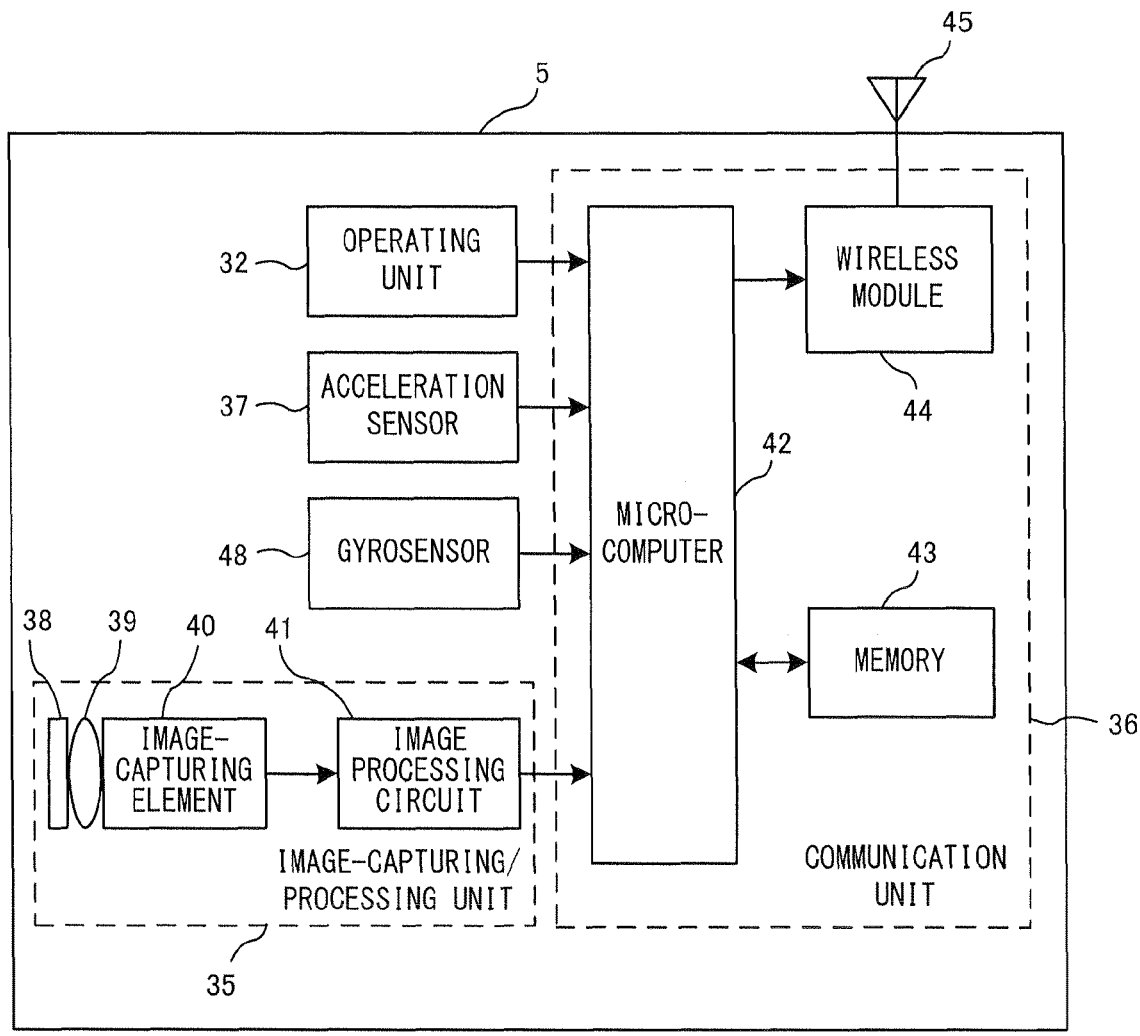
FIG. 7 is a block diagram showing a configuration of an example non-limiting controller.

FIG. 7 is a block diagram illustrating a configuration of the example controller 5. The controller 5 includes the operating units 32 (operation buttons 32*a* through 32*i*), the image-capturing/processing unit 35, a communication unit 36, the acceleration sensor 37, and a gyrosensor 48. The controller 5 transmits, to the game device 3, data representing the content of an operation performed on the controller 5 itself as operation data. Hereinafter, operation data transmitted by the controller 5 may be referred to as "controller operation data", and operation data transmitted by the terminal device 7 may be referred to as "terminal operation data".

The operating unit 32 includes the operation buttons 32*a* through 32*i* described above, and outputs, to the microcomputer 42 of the communication unit 36, operation button data representing an input state of each of the operation buttons 32*a* through 32*i* (that is, whether or not each operation button 32*a* through 32*i* has been pressed).

The image-capturing/processing unit 35 is a system for analyzing image data taken by the image-capturing mechanism and calculating, for example, the centroid, the size or the like of an area having a high brightness in the image data. The image-capturing/processing unit 35 includes the infrared filter 38, the lens 39, the image-capturing element 40 and the image processing circuit 41. The infrared filter 38 transmits therethrough only infrared light included in the light incident on a front surface of the controller 5. The lens 39 collects the infrared light transmitted through the infrared filter 38 so as to be incident on the image-capturing element 40. The image-capturing element 40 is a solid-state imaging device such as, for example, a CMOS sensor or a CCD sensor, which receives the infrared light collected by the lens 39 and outputs an image signal. The marker unit 55 of the terminal device 7 and the marker device 6, which are image-capturing targets, each include a marker(s) for outputting infrared light. Therefore, the infrared filter 38 enables the image-capturing element 40 to receive only the infrared light transmitted through the infrared filter 38 and generate image data, so that an image of each image-capturing target (marker unit 55 and/or marker device 6) can be captured with accuracy. Hereinafter, an image captured by the image-capturing element 40 will be referred to as a "captured image". The image data generated by the image-capturing element 40 is processed by the image processing circuit 41. The image processing circuit 41 calculates a position, in the captured image, of an image-capturing target. The image processing circuit 41 outputs a coordinate point of the calculated position to the microcomputer 42 of the communication unit 36. Data representing the coordinate point is transmitted as operation data to the game device 3 by the microcomputer 42. Hereinafter, such a coordinate point will be referred to as a "marker coordinate point". The marker coordinate point changes depending on the attitude (angle of tilt) or the position of the controller 5 itself, and therefore the game device 3 can calculate the attitude and the position of the controller 5 using the marker coordinate point.

In other embodiments, the controller 5 may not include the image processing circuit 41, and the controller 5 may transmit the captured image as it is to the game device 3. In this case, the game device 3 may include a circuit or a program having the same function as that of the image processing circuit 41 and calculate the marker coordinate point.

The acceleration sensor 37 detects an acceleration (including a gravitational acceleration) of the controller 5, that is, a force (including gravity) applied to the controller 5. The acceleration sensor 37 detects a value of an acceleration (linear acceleration) applied to a detection unit of the acceleration sensor 37 in a straight line direction along a sensing axis direction, among all accelerations applied to a detection unit of the acceleration sensor 37. While the acceleration sensor 37 may be any acceleration sensor capable of detecting an acceleration in one or more sensing axis directions, the acceleration sensor 37 in the first embodiment detects a linear acceleration in three axis directions with respect to the controller 5, i.e., an up-down direction (Y-axis direction shown in FIG. 5), a left-right direction (X-axis direction shown in FIG. 5), and a front-rear direction (Z-axis direction shown in FIG. 5). The acceleration sensor 37 is, for example, a capacitive MEMS (Micro-Electro Mechanical System) acceleration sensor. However, another type of acceleration sensor may be used. Data representing the acceleration (acceleration data) detected by the acceleration sensor 37 is output to the communication unit 36. The acceleration detected by the acceleration sensor 37 changes depending on the attitude (angle of tilt) or the movement of the controller 5, and therefore the game device 3 can calculate the attitude and the movement of the controller 5 using the obtained acceleration data. In the first embodiment, the game device 3 calculates the attitude, angle of tilt, etc., of the controller 5 based on the obtained acceleration data.

The gyrosensor 48 detects angular velocities about three axes (in the first embodiment, the X-, Y-, and Z-axes). In this specification, the directions of rotation about the X-axis, the Y-axis, and the Z-axis relative to the imaging direction (Z-axis positive direction) of the controller 5 are referred to as a pitch direction, a yaw direction, and a roll direction, respectively. So long as the gyrosensor 48 can detect the angular velocities about the three axes, any number of gyrosensors or any combination of gyrosensors may be included therein. Data representing the angular velocities detected by the gyrosensor 48 is output to the communication unit 36. Alternatively, the gyrosensor 48 may detect an angular velocity about one axis or angular velocities about two axes.

The communication unit 36 includes the microcomputer 42, a memory 43, the wireless module 44 and the antenna 45. By the communication unit 36 (wireless module 44 and antenna 45), the controller 5 functions as a wireless controller. The microcomputer 42 controls the wireless module 44 for wirelessly transmitting data obtained by the microcomputer 42 to the game device 3, while using the memory 43 as a storage area for performing a process.

Data output by each of the operating units 32, the image-capturing/processing unit 35, the acceleration sensor 37, and the gyrosensor 48 to the microcomputer 42 is temporarily stored on the memory 43. These types of data are transmitted to the game device 3 as operation data (controller operation data). Specifically, at the time of transmission to the controller communication module 19 of the game device 3, the microcomputer 42 outputs the operation data stored on the memory 43 to the wireless module 44. The wireless module 44 uses, for example, the Bluetooth (registered trademark) technology to transmit the operation data to the game device 3. The CPU 10 of the game device 3 performs the game process using the operation data obtained from the controller 5. The wireless transmission from the communication unit 36 to the controller communication module 19 is sequentially performed at a predetermined time interval. Since the game process is generally performed at a cycle of 1/60 sec. (corresponding to one frame time), data may be transmitted at a cycle of a shorter time period.

As described above, the controller 5 can transmit each of marker coordinate data, acceleration data, angular velocity data, and operation button data as operation data representing an operation performed thereon. In addition, the game device 3 executes the game process using the operation data as a game input. Accordingly, by using the controller 5, the user can perform the game operation of moving the controller 5 itself, in addition to a conventional general game operation of pressing an operation button. For example, the user can perform operations of tilting the controller 5 to an arbitrary attitude, pointing the controller 5 to an arbitrary position on the screen, and moving the controller 5 itself.

1-6. Configuration of Terminal Device 7

Figure 8:
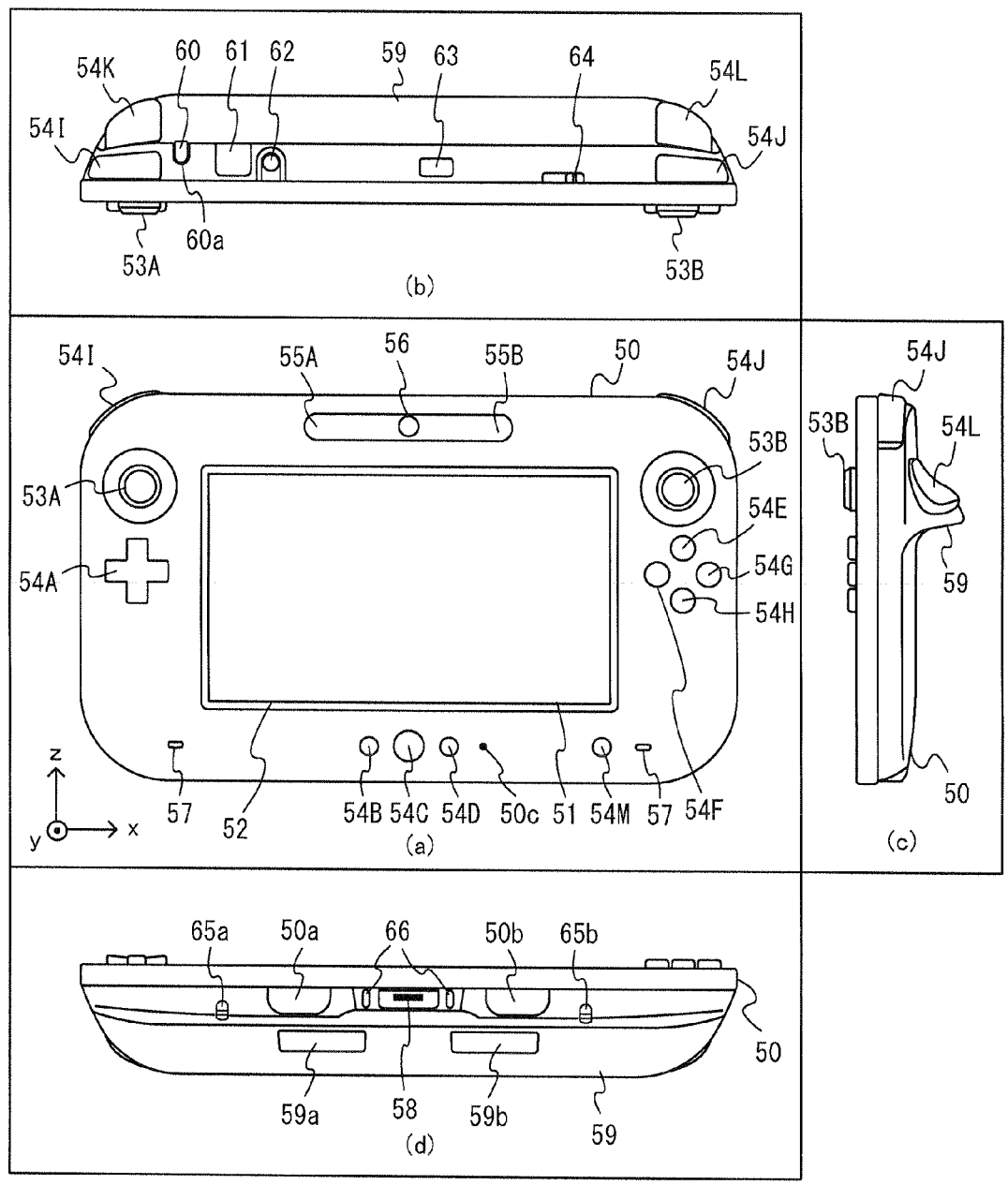
FIG. 8 provides diagrams showing an external configuration of an example non-limiting terminal device.

Now, a configuration of the terminal device 7 will be described with reference to FIGS. 8 through 10. FIG. 8 is a plan view showing an external configuration of the example terminal device 7. FIG. 8(*a*) is a front view of the terminal device 7, FIG. 8(*b*) is a top view thereof, FIG. 8(*c*) is a right side view thereof, and FIG. 8(*d*) is a bottom view thereof.

Figure 9:
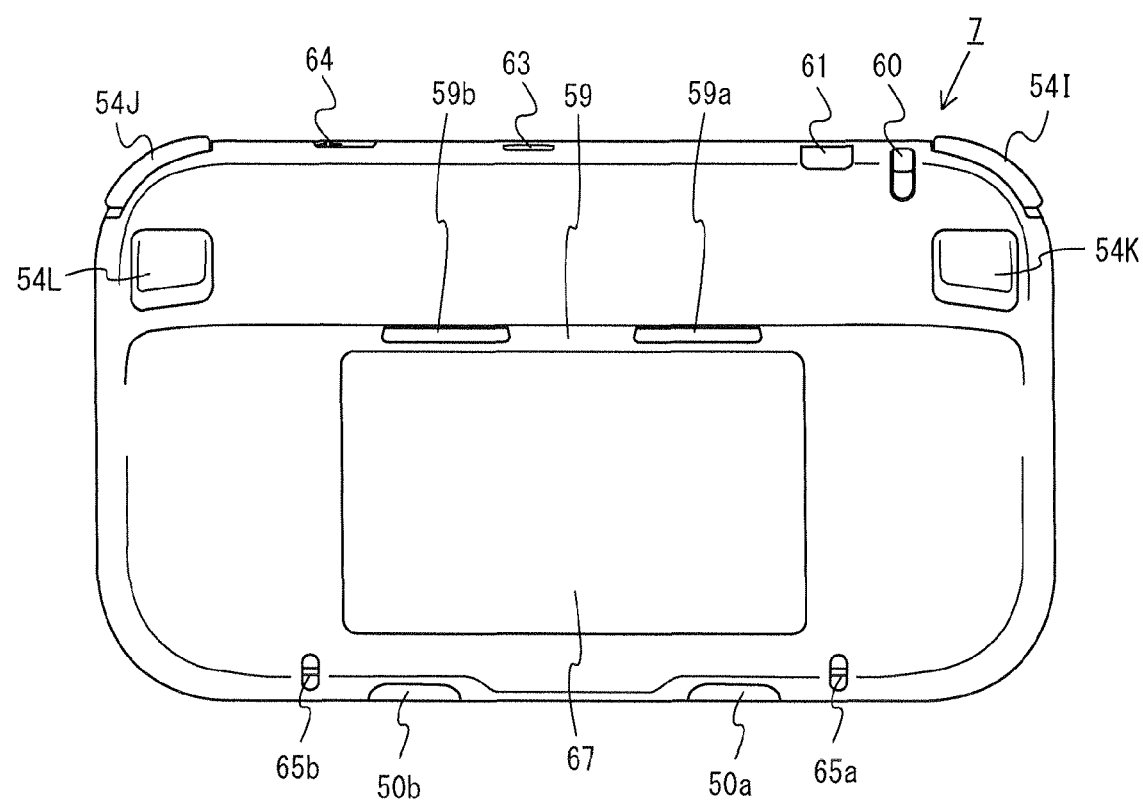
FIG. 9 is a diagram showing an external configuration of an example non-limiting terminal device.
Figure 10:
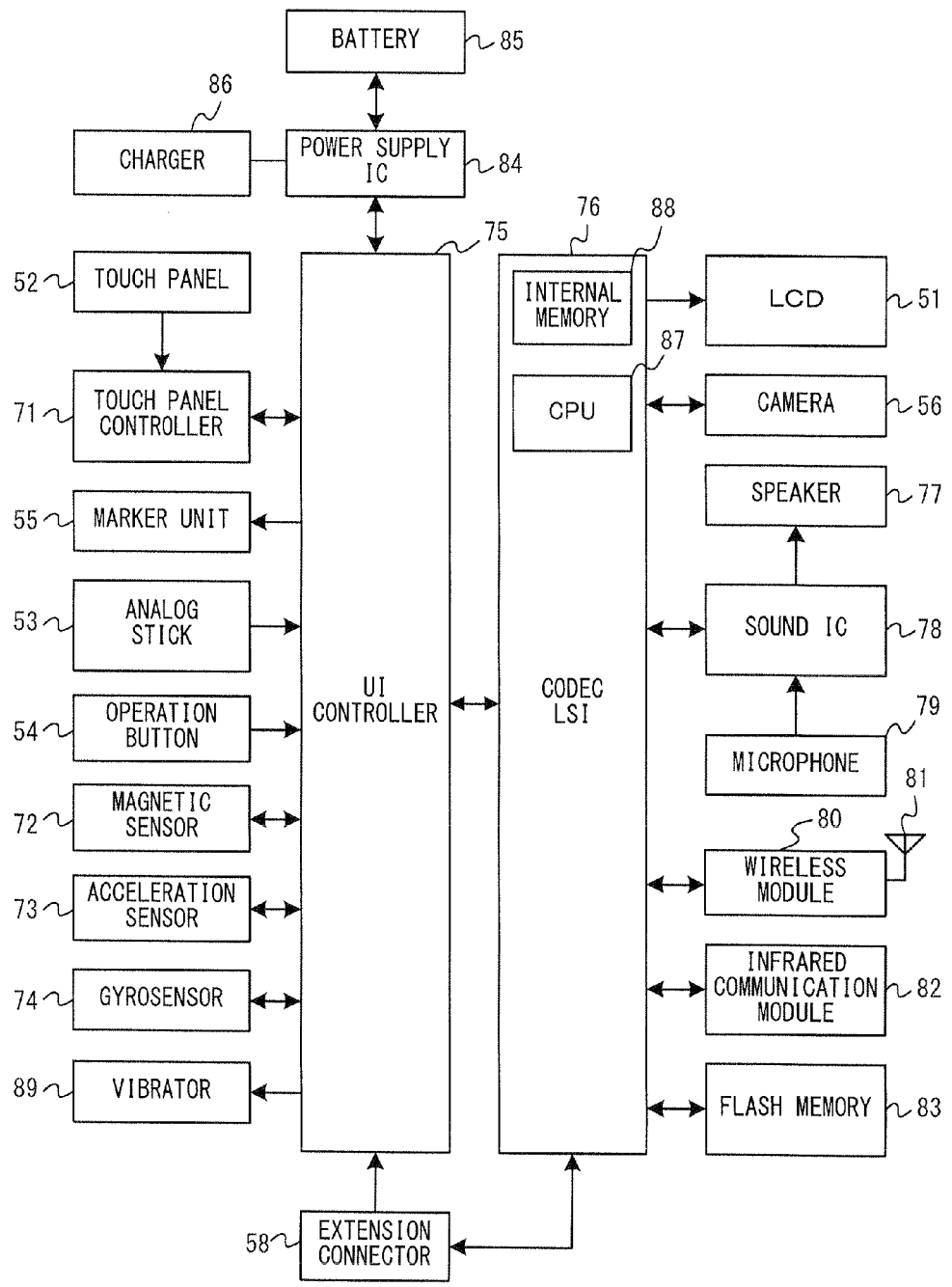
FIG. 10 is a block diagram showing an internal configuration of an example non-limiting terminal device.

FIG. 9 is a rear view of the example terminal device 7. The terminal device 7 may be of any configuration as long as including a display unit.

As shown in FIG. 8, the terminal device 7 includes a housing 50 generally having a horizontally-elongated rectangular plate shape. It can also be considered that the terminal device 7 is a tablet-type information processing device. The housing 50 may have a curved surface or may have a protrusion, etc., as long as it is generally in a plate shape. The housing 50 is sized so as to be held by the user. Thus, the user can hold and move the terminal device 7, or can change the position in which the terminal device 7 is placed. Although the details will be described later, the terminal device 7 is configured so as to be held and operated easily by the user even though the terminal device 7 is such a relatively large terminal device (controller device) as described above.

The terminal device 7 includes the LCD 51 on a front surface (front side) of the housing 50. The LCD 51 is provided near the center of the front surface of the housing 50. Therefore, the user can hold and move the terminal device 7 while looking at a screen of the LCD 51 by holding opposing end portions of the housing 50 with respect to the LCD 51. The user can hold the terminal device 7 in a landscape position (in a horizontally-oriented direction) by holding left and right opposing end portions of the housing 50 with respect to the LCD 51, or the user can hold the terminal device 7 in a portrait position (in a vertically-oriented direction).

As shown in FIG. 8(a), the terminal device 7 includes the touch panel 52 on the screen of the LCD 51 as an operating unit. The touch panel 52 may be of any type, for example, a resistive type, a capacitive type, etc. The touch panel 52 may be of a single-touch type or a multi-touch type. An input on the touch panel 52 can be made with a touch pen 60, a finger of the user, etc. The housing 50 has an accommodation hole 60a for accommodating the touch pen 60 usable for performing an operation on the touch panel 52 (see FIG. 8(b)). The accommodation hole 60a is provided in a top surface of the housing 50 so that the touch pen 60 does not fall here. Alternatively, the accommodation hole 60a may be provided on a side surface or a bottom surface of the housing 50.

As shown in FIG. 8, the terminal device 7 includes two analog sticks (slide pads) 53A and 53B and a plurality of buttons (keys) 54A through 54M, as operating units. The analog sticks 53A and 53B are each a direction-specifying device. The analog sticks 53A and 53B are each configured so that a movable member (stick portion) can be slid in any direction (at any angle in the up, down, left, right and diagonal directions) with respect to the front surface of the housing 50. The movable member of each of the analog sticks 53A and 53B may be of such a type as to be tilted in any direction with respect to the front surface of the housing 50. The left analog stick 53A is provided on the left side of the screen of the LCD 51, and the right analog stick 53B is provided on the right side of the screen of the LCD 51.

The buttons 54A through 54L are operating units for making predetermined inputs, and are keys that can be pressed. As will be discussed below, the buttons 54A through 54L are provided at such positions that the user can operate them while holding left and right portions of the terminal device 7. Therefore, the user can operate these operating units easily even when holding and moving the terminal device 7.

As shown in FIG. 8(a), the cross button (direction-input button) 54A and the buttons 54B through 54H and 54M, among the operation buttons 54A through 54M, are provided on a front surface of the housing 50. These buttons 54A through 54H and 54M are provided at positions at which these buttons can be operated by the thumbs of the user. The cross button 54A is provided on the left side of the LCD 51 and below the left analog stick 53A. The cross button 54A has a cross shape, and is a button with which it is possible to specify at least up, down, left and right directions.

The buttons 54B through 54D are provided below the LCD 51. These three buttons 54B through 54D are provided at positions at which these buttons can be operated with either the left or the right hand of the user. The terminal device 7 includes the power button 54M for turning ON/OFF the power of the terminal device 7. The power of the game device 3 can be remotely turned ON/OFF by operating the power button 54M. The power button 54M is provided below the LCD 51 as are the buttons 54B through 54D. The power button 54M is provided on the right side of the buttons 54B through 54D. The four buttons 54E through 54H are provided on the right side of the LCD 51 and below the right analog stick 53B. The four buttons 54E through 54H are also provided at upper, lower, left and right positions (with respect to the center position among the four buttons 54E through 54H). Therefore, with the terminal device 7, the four buttons 54E through 54H can also serve as buttons with which the user specifies the up, down, left and right directions.

In the first embodiment, a projecting portion (eaves portion 59) is provided on the rear side of the housing 50 (side opposite to the front surface where the LCD 51 is provided) (see FIGS. 8(c) and 9). As shown in FIG. 8(c), the eaves portion 59 is a mountain-shaped member which is projecting from a rear surface of the generally plate-shaped housing 50. The projecting portion has such a height (thickness) that it can rest on fingers of the user holding the rear surface of the housing 50. The user can hold the terminal device 7 stably without getting tired even if the terminal device 7 has a relatively large size, by holding the terminal device 7 while resting his/her fingers on the eaves portion 59 (placing the eaves portion 59 on the fingers). That is, the eaves portion 59 can be referred to as a supporting member for allowing the fingers to support the housing 50, or can be referred to also as a "finger-resting portion".

The eaves portion 59 is provided above the center of the housing 50 with respect to an up-down direction. The eaves portion 59 is provided on the reverse side so as to generally correspond to the operating units (analog sticks 53A and 53B) which are provided on the front surface of the housing 50. That is, the projecting portion is provided so as to extend across an area, on the reverse side, including positions corresponding to the operating units which are provided respectively on the left side and on the right side of the display unit. Therefore, for operating the operating units, the user can hold the terminal device 7 so as to support the eaves portion 59 with his/her middle fingers or ring fingers. Thus, it is easy to hold the terminal device 7, and it is easy to operate the operating units. In the first embodiment, since the projecting portion has an eaves-like shape extending in a left-right direction, the user can hold the terminal device 7 with his/her middle fingers or ring fingers placed along a bottom surface of the projecting portion. This makes it easy to hold the terminal device 7. In other embodiments, the eaves portion 59 may be located at any position and may have any size and any shape. The eaves portion 59 may not be formed.

As shown in FIGS. 8(a), 8(b) and 8(c), a first L button 54I and a first R button 54J are provided respectively in left and right opposing portions on the top surface of the housing 50. In other embodiments, the operating units provided respectively in the left and right portions on the top surface of the housing 50 do not have to be provided at left and right ends, and may be provided at positions other than the ends. The operating units may be provided respectively on left and right side surfaces of the housing 50. As shown in FIGS. 8(*c*) and 9, a second L button 54K and a second R button 54L are provided on a top surface of the projecting portion (eaves portion 59). The second L button 54K is provided near a left end of the eaves portion 59. The second R button 54L is provided near a right end of the eaves portion 59.

In the first embodiment, the user can hold the terminal device 7 easily by holding the terminal device 7 with his/her fingers abutting against the bottom surface of the projecting portion (eaves portion 59). Since the first L button 54I and the first R button 54J are provided on the top surface of the housing 50 and the second L button 54K and the second R button 54L are provided on the top surface of the projecting portion, the user can operate these buttons easily in the state described above. The user can hold the terminal device 7 with his/her ring fingers abutting against the bottom surface of the eaves portion 59 (so as to support the eaves portion 59 with his/her ring fingers), or can also hold the terminal device 7 with his/her middle fingers abutting against the bottom surface of the eaves portion 59.

With the terminal device 7 in the first embodiment, the projecting portion (eaves portion 59) is provided on the rear surface. Therefore, when the terminal device 7 is put down with the screen of the LCD 51 (front surface of the housing 50) facing up, the screen is slightly inclined. Therefore, the screen is seen easily with the terminal device 7 put down. Input operations to the touch panel 52 are performed easily with the terminal device 7 put down. In other embodiments, an additional projecting portion having generally the same height as the eaves portion 59 may be formed on the rear surface of the housing 50. In this case, with the screen of the LCD 51 facing up, the terminal device 7 can be put down so that the screen is horizontal with the projecting portions in contact with a floor surface. The additional projecting portion may be a removable (or foldable) member. In this case, the terminal device can be put down with the screen either slightly inclined or with the screen horizontal. That is, in the case where the terminal device 7 is put down and used, the eaves portion 59 can be used as a leg portion.

The buttons 54A through 54L are each assigned an appropriate function in accordance with the game program. For example, the cross button 54A and the buttons 54E through 54H may be used for direction-specifying operations, selection operations, etc., whereas the buttons 54B through 54E may be used for OK button operations, cancel button operations, etc. The terminal device 7 may include a button for turning ON/OFF the power of the LCD 51, or a button for performing a connection setting (pairing) with the game device 3.

As shown in FIG. 8(*a*), the terminal device 7 includes the marker unit 55 including the marker 55A and the marker 55B on the front surface of the housing 50. The marker unit 55 is provided above the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive of infrared light. The marker unit 55 is used for the game device 3 to calculate the movement, etc., of the controller 5, as is the marker device 6 described above. The game device 3 can control lighting of the infrared LEDs of the marker unit 55.

The terminal device 7 includes the camera 56 as the image-capturing mechanism. The camera 56 includes an image-capturing element (e.g., CCD image sensor, CMOS image sensor, or the like) having a predetermined resolution, and a lens. As shown in FIG. 8, the camera 56 is provided on the front surface of the housing 50 in the first embodiment. Therefore, the camera 56 can capture an image of the face of the user holding the terminal device 7, and can capture an image of the user playing a game while looking at the LCD 51, for example. In the first embodiment, the camera 56 is provided between the two markers 55A and 55B.

The terminal device 7 includes a microphone 79 as a sound input mechanism. A microphone hole 50*c* is provided in the front surface of the housing 50. The microphone 79 is provided inside the housing 50 behind the microphone hole 50*c*. The microphone 79 detects a sound around the terminal device 7 such as the voice of the user or the like.

The terminal device 7 includes speakers 77 as the sound output mechanism. As shown in FIG. 8(*d*), speaker holes 57 are provided in a lower portion of the front surface of the housing 50. An output sound from the speakers 77 is output from the speaker holes 57. In the first embodiment, the terminal device 7 includes two speakers, and the speaker holes 57 are provided at the respective positions of the left speaker and the right speaker. The terminal device 7 includes a knob 64 for adjusting the sound volume of the speakers 77. The terminal device 7 includes a sound output terminal 62 connectable to a sound output unit such as an earphone. Although the sound output terminal 62 and the knob 64 are provided on the top surface of the housing 50 considering the fact that an additional device is connected to the bottom surface of the housing 50, the sound output terminal 62 and the knob 64 may alternatively be provided on the left or right side surface or on the bottom surface.

The housing 50 includes a window 63 through which an infrared signal from an infrared communication module 82 is output to the outside of the terminal device 7. The window 63 is provided on the top surface of the housing 50 so that the infrared signal is output in a forward direction of the user when the user holds the opposing sides of the LCD 51. In other embodiments, the window 63 may be provided at any position such as, for example, on the rear surface of the housing 50.

The terminal device 7 includes an extension connector 58 via which another device can be connected to the terminal device 7. The extension connector 58 is a communication terminal for exchanging data (information) with another device connected to the terminal device 7. The additional device connected to the extension connector 58 may be any device, and may be, for example, a game-specific controller (gun-shaped controller, etc.) or an input device such as a keyboard or the like. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a charging stand (not shown), power is supplied from the charging stand to the terminal device 7.

The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger.

As shown in FIGS. 8(*d*) and 9, engagement holes 59*a* and 59*b* engageable with tab portions of an additional device are provided in the bottom surface of the projecting portion (the eaves portion 59). Engagement holes 50*a* and 50*b* are provided in the bottom surface of the housing 50. In the case where the additional device is connected to the terminal device 7, four tab portions of the additional device are respectively engaged with the four engagement holes, which secures the terminal device 7 and the additional device with each other.

The terminal device 7 includes a battery cover 67 which can be attached to and removed from the housing 50. A battery (battery 85 shown in FIG. 10) is placed inside the battery cover 67. In the first embodiment, the battery cover 67 is provided on the rear side of the housing 50, below the projecting portion (the eaves portion 59).

The housing 50 of the terminal device 7 includes holes 65a and 65b through which a strap cord can be tied to the terminal device 7. The user can tie a strap to one of the holes 65a and 65b, and fasten the strap to the wrist of the user. Thus, even if the user drops the terminal device 7 or if the terminal device 7 comes off the hand, the terminal device 7 is prevented from falling or hitting another object.

With the terminal device 7 shown in FIGS. 8 and 9, the shape of each operation button, the shape of the housing 50, the number and the positions of the components, etc., are merely examples, and the example embodiment can be realized with other shapes, numbers, and positions.

Now, an internal configuration of the terminal device 7 will be described with reference to FIG. 10. FIG. 10 is a block diagram showing an internal configuration of the example terminal device 7. As shown in FIG. 10, in addition to the components shown in FIG. 8, the terminal device 7 includes a touch panel controller 71, a magnetic sensor 72, an acceleration sensor 73, the gyrosensor 74, a user interface controller (UI controller) 75, a codec LSI 76, the speakers 77, a sound IC 78, the microphone 79, a wireless module 80, an antenna 81, the infrared communication module 82, a flash memory 83, a power supply IC 84, the battery 85, and a vibrator 89. These electronic components are mounted on an electronic circuit board and accommodated in the housing 50.

The UI controller 75 is a circuit for controlling input/output of data to/from various types of input/output units. The UI controller 75 is connected to the touch panel controller 71, the analog sticks 53 (analog sticks 53A and 53B), the operation buttons 54 (operation buttons 54A through 54L), the marker unit 55, the magnetic sensor 72, the acceleration sensor 73, the gyrosensor 74, and the vibrator 89. The UI controller 75 is connected to the codec LSI 76 and the extension connector 58. The power supply IC 84 is connected to the UI controller 75, and power is supplied to various units via the UI controller 75. The built-in battery 85 is connected to the power supply IC 84 to supply power. The charger 86 or a cable with which power can be obtained from an external power source can be connected to the power supply IC 84 via a charging connector, and the terminal device 7 can be supplied with power from an external power source, and also can be charged, using the charger 86 or the cable. The terminal device 7 may be charged by attaching the terminal device 7 to a cradle (not shown) having a charging function.

The touch panel controller 71 is a circuit connected to the touch panel 52 for controlling the touch panel 52. The touch panel controller 71 generates input position data of a predetermined format based on a signal from the touch panel 52, and outputs the data to the UI controller 75. The input position data represents, for example, coordinates of a position on the input surface of the touch panel 52 at which an input has been made. The touch panel controller 71 reads a signal from the touch panel 52 and generates input position data at a rate of once per predetermined amount of time. Various control instructions for the touch panel 52 are output from the UI controller 75 to the touch panel controller 71.

The analog sticks 53 each output, to the UI controller 75, stick data representing the direction and the amount of slide (or tilt) of the stick portion operated with a finger of the user. The operation buttons 54 each output, to the UI controller 75, operation button data representing an input state of each of the operation buttons 54A through 54L (e.g., whether the button has been pressed or not).

The magnetic sensor 72 detects an azimuthal direction by sensing the size and direction of the magnetic field. Azimuthal direction data representing the detected azimuthal direction is output to the UI controller 75. A control instruction for the magnetic sensor 72 is output from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect the azimuthal direction. Strictly describing, in a place where there is a magnetic field other than a geomagnetic field, the obtained azimuthal direction data does not represent the azimuthal direction. Nevertheless, when the terminal device 7 moves, the azimuthal direction data changes even in such a case. Therefore, it possible to calculate the change in the attitude of the terminal device 7.

The acceleration sensor 73 is provided inside the housing 50 for detecting the magnitude of a linear acceleration along each of directions of three axes (x, y and z axes shown in FIG. 8(a)). Specifically, the acceleration sensor 73 detects the magnitude of the linear acceleration along each of the axes, where the x axis lies in a longitudinal direction of the housing 50, the y axis lies in a direction vertical to the front surface of the housing 50, and the z axis lies in a width direction of the housing 50. Acceleration data representing each detected acceleration is output to the UI controller 75. A control instruction for the acceleration sensor 73 is output from the UI controller 75 to the acceleration sensor 73. While the acceleration sensor 73 is assumed to be, for example, a capacitive-type MEMS-type acceleration sensor in the first embodiment, other types of acceleration sensors may be employed in other embodiments. The acceleration sensor 73 may be an acceleration sensor for detecting an acceleration along one axis or two axes.

The gyrosensor 74 is provided inside the housing 50 for detecting angular velocities about the three axes, i.e., the x-axis, the y-axis and the z-axis. Angular velocity data representing each detected angular velocity is output to the UI controller 75. A control instruction for the gyrosensor 74 is output from the UI controller 75 to the gyrosensor 74. The number and combination of gyrosensors used for detecting angular velocities about the three axes may be any number and combination, and the gyrosensor 74 may be formed by a 2-axis gyrosensor and a 1-axis gyrosensor, as is the gyrosensor 48. The gyrosensor 74 may be a gyrosensor for detecting an angular velocity about one axis or angular velocities about two axes.

The vibrator 89 is, for example, a vibration motor or a solenoid, and is connected to the UI controller 75. The terminal device 7 is vibrated by actuation of the vibrator 89 in response to a command from the UI controller 75. Thus, a so-called vibration-feedback game is realized, in which the vibration is conveyed to the user's hand holding the terminal device 7.

The UI controller 75 outputs, to the codec LSI 76, operation data including input position data, stick data, operation button data, azimuthal direction data, acceleration data, and angular velocity data received from various components described above. In the case where another device is connected to the terminal device 7 via the extension connector 58, data representing an operation performed on the another device may be further included in the operation data.

The codec LSI 76 is a circuit for performing a compression process on data to be transmitted to the game device 3, and a decompression process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not perform a game process itself, the terminal device 7 may execute a minimal possible program for the management thereof and for the communication. A program stored on the flash memory 83 is read out to the internal memory 88 and executed by the CPU 87 upon power-up, and thus the terminal device 7 is started. A part of an area of the internal memory 88 is used as the VRAM for the LCD 51.

The camera 56 captures an image in response to an instruction from the game device 3, and outputs the captured image data to the codec LSI 76. A control instructions for the camera 56, such as an image-capturing instruction or the like, is output from the codec LSI 76 to the camera 56. The camera 56 can also capture a moving image. That is, the camera 56 can repeatedly capture images and repeatedly output the image data to the codec LSI 76.

The sound IC 78 is a circuit connected to the speakers 77 and the microphone 79 for controlling input/output of sound data to/from the speakers 77 and the microphone 79. That is, when receiving sound data from the codec LSI 76, the sound IC 78 outputs a sound signal obtained by performing D/A conversion on the sound data to the speakers 77 so that sound is output from the speakers 77. The microphone 79 detects a sound propagated to the terminal device 7 (voice of the user, etc.), and outputs a sound signal representing such a sound to the sound IC 78. The sound IC 78 performs A/D conversion on the sound signal from the microphone 79 to output sound data of a predetermined format to the codec LSI 76.

The infrared communication module 82 emits an infrared signal to perform infrared communication with another device. Here, the infrared communication module 82 has, for example, a function of performing infrared communication in accordance with the IrDA standard and a function of outputting an infrared signal (control signal) for controlling the TV 2.

The codec LSI 76 transmits, as terminal operation data, image data from the camera 56, sound data from the microphone 79, and operation data from the UI controller 75 to the game device 3 via the wireless module 80. In the first embodiment, the codec LSI 76 performs a compression process similar to that of the codec LSI 27 on the image data and the sound data. The terminal operation data and the compressed image data and sound data are output, as transmission data, to the wireless module 80. The antenna 81 is connected to the wireless module 80, and the wireless module 80 transmits the transmission data to the game device 3 via the antenna 81. The wireless module 80 has a similar function to that of the terminal communication module 28 of the game device 3. That is, the wireless module 80 has a function of connecting to a wireless LAN by a scheme in conformity with the IEEE 802.11n standard, for example. The transmitted data may be encrypted when necessary or may not be encrypted.

As described above, the transmission data transmitted from the terminal device 7 to the game device 3 includes operation data (terminal operation data), image data, and sound data. In the case where another device is connected to the terminal device 7 via the extension connector 58, data received from the another device may be further included in the transmission data. The codec LSI 76 may transmit, to the game device 3, data received via infrared communication by the infrared communication module 82 as being included in the transmission data when necessary.

As described above, compressed image data and sound data are transmitted from the game device 3 to the terminal device 7. These types of data are received by the antenna 81 (reception unit) and transferred to the codec LSI 76 via the wireless module 80. The codec LSI 76 decompresses the received image data and sound data. The decompressed image data is output to the LCD 51, and the image is displayed on the LCD 51. That is, the codec LSI 76 (the CPU 87) causes the received image data to be displayed on the display unit. The decompressed sound data is output to the sound IC 78, and the sound IC 78 causes sound to be output from the speakers 77.

In the case where terminal control data is included in data received from the game device 3, the codec LSI 76 and the UI controller 75 each issue a control instruction to various units in accordance with the terminal control data. As described above, the terminal control data is data representing a control instruction for each of the components of the terminal device 7 (in the first embodiment, the camera 56, the touch panel controller 71, the marker unit 55, the sensors 72 through 74, and the infrared communication module 82). In the first embodiment, the control instruction represented by the terminal control data may be an instruction to activate the operation of each of the components or deactivate (stop) the operation thereof. That is, components that are not used in a game may be deactivated in order to reduce the power consumption, in which case it is ensured that data from the deactivated components are not included in the transmission data to be transmitted from the terminal device 7 to the game device 3. For the marker unit 55, which includes infrared LEDs, the control can be done simply by turning ON/OFF the power supply thereto.

The game device 3 can control an output of the infrared communication module 82, and thus controls the operation of the TV 2. Specifically, the game device 3 outputs, to the terminal device 7, an instruction (terminal control data described above) to cause the infrared communication module 82 to output an infrared signal corresponding to a control command for controlling the TV 2. In response to this instruction, the codec LSI 76 causes the infrared communication module 82 to output an infrared signal corresponding to the control command. Here, the TV 2 includes an infrared reception unit capable of receiving an infrared signal. By the infrared reception unit receiving the infrared signal output by the infrared communication module 82, the TV 2 operates in accordance with the infrared signal. The instruction from the game device 3 may indicate an infrared signal itself, or when the terminal device 7 has an infrared signal pattern stored thereon, may indicate the pattern.

As described above, while the terminal device 7 includes the operating units such as the touch panel 52, the analog sticks 53 and the operation buttons 54. In other embodiments, other operating units may be included instead of, or in addition to, these operating units.

The terminal device 7 includes the magnetic sensor 72, the acceleration sensor 73 and the gyrosensor 74 as the sensors for calculating the movement of the terminal device 7 (including the position and the attitude thereof, or changes in the position and the attitude thereof). In other embodiments, the terminal device 7 may include only one or two of these sensors, or may not include any of these sensors. In still other embodiments, other sensors may be included instead of, or in addition to, these sensors.

While the terminal device 7 includes the camera 56 and the microphone 79, the terminal device 7 may not include the camera 56 or the microphone 79, or may include only one of them in other embodiments.

While the terminal device 7 includes the marker unit 55 as a component for calculating the positional relationship between the terminal device 7 and the controller 5 (the position and/or attitude, etc., of the terminal device 7 as seen from the controller 5), the terminal device 7 may not include the marker unit 55 in other embodiments. In still other embodiments, the terminal device 7 may include other mechanisms as a component for calculating the positional relationship. For example, in other embodiments, the controller 5 may include a marker unit, and the terminal device 7 may include an image-capturing element. In such a case, the marker device 6 may include an image-capturing element, instead of an infrared LED.

1-7. Operation of Video Display System

Now, an operation of the video display system 90 will be described. Hereinafter, a case will be described in which the game system 1 requests the transmission server 91 to acquire the video information (selection instruction), the transmission server 91 transmits the video information in response to the request, and the game system 1 receives the video information and displays the video content and the advertisement information on the two display devices. In an example described below, a TV program which has been already broadcast (program which the user has missed) is provided as the video content, and the producer of the TV program (broadcaster) uses the transmission server 91 to provide the TV program to the game system 1.

Figure 11:
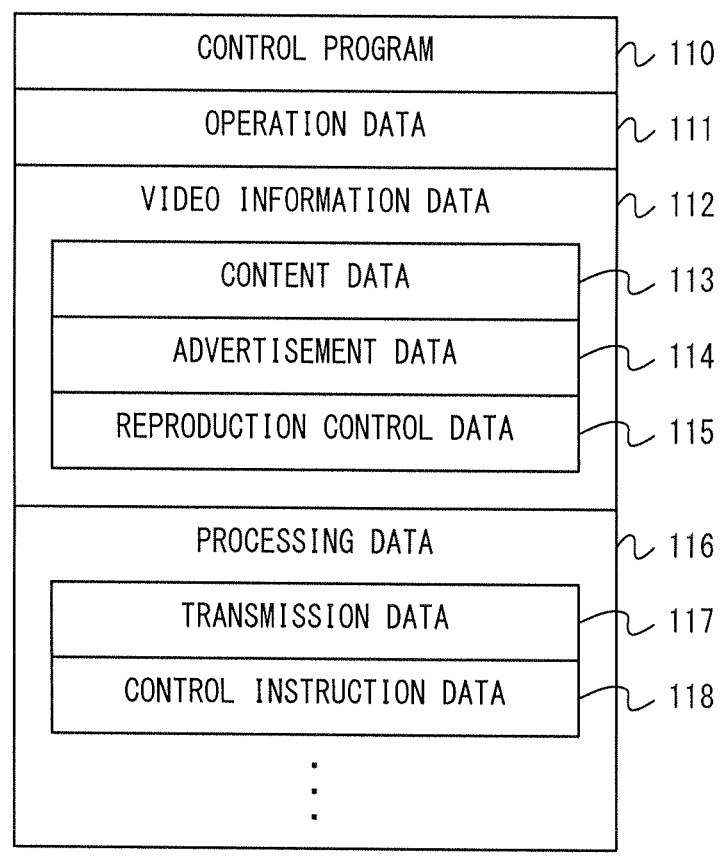
FIG. 11 shows an example of data stored on a storage unit of the game device.

First, various types of data usable for the operation of the video display system 90 will be described. FIG. 11 shows an example of data stored on a storage unit of the game device 3 (including the external main memory 12, the internal main memory 11e, and the flash memory 17). As shown in FIG. 11, a control program 110, operation data 111, video information data 112, and processing data 116 are stored on the storage unit of the game device 3. In addition to the data shown in FIG. 11, various types of data usable for a process executed by the game device 3 (image data, sound data and the like) are stored on the storage unit. The data shown in FIG. 11 may be stored on any other storage device accessible to the game device 3, as well as on the storage unit in the game device 3.

Figure 12:
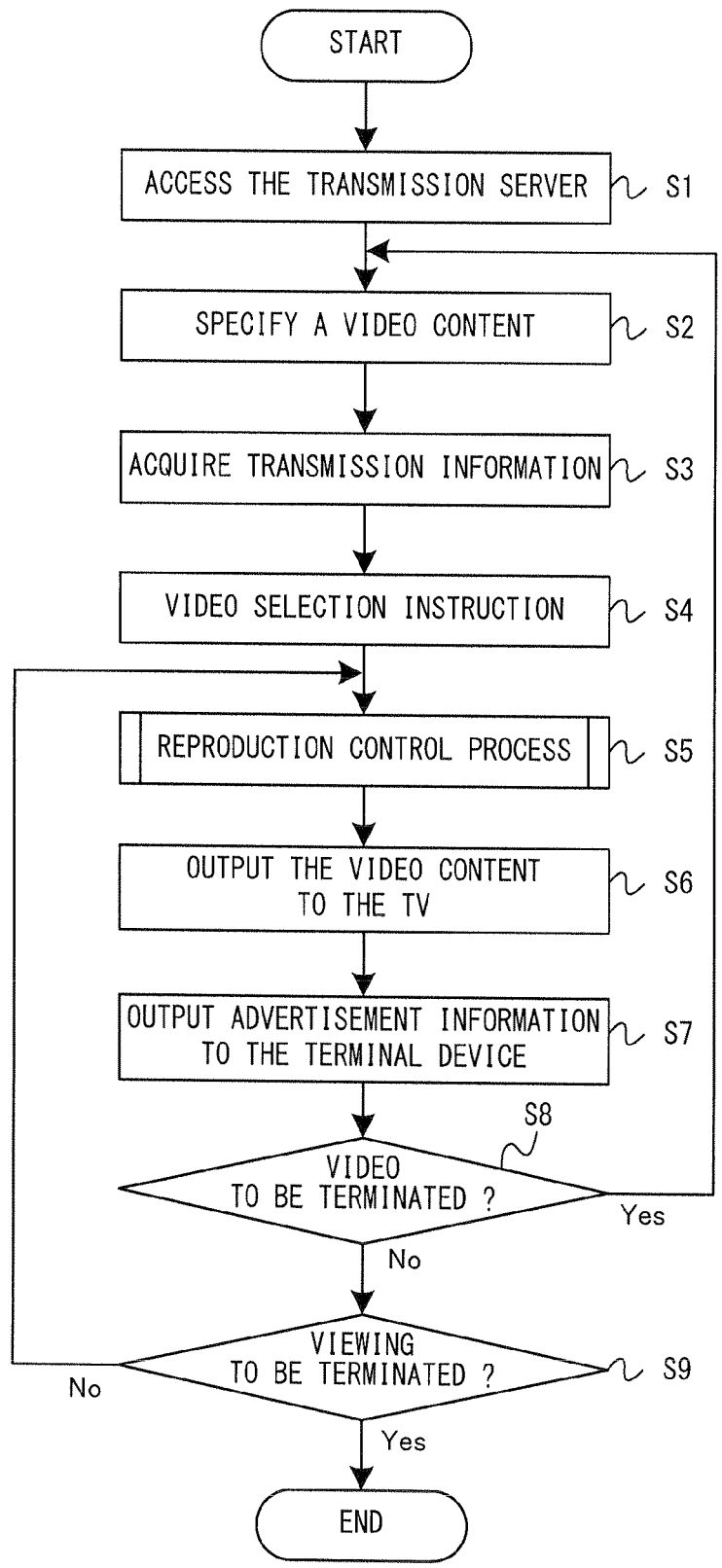
FIG. 12 is a main flowchart showing an example of process flow executable by the game device in the first embodiment.

The control program 110 is a program for causing a CPU 10 to execute a process in the game device 3 (game system 1). In the first embodiment, the CPU 10 executes the control program 110, and thus steps shown in the flowchart shown in FIG. 12 are executed. The control program 110 is partially or entirely read from the flash memory 17 at an appropriate timing after the game device 3 is powered on, and thus is stored on the storage unit. The control program 110 may be acquired from the optical disc 4 or another device external to the game device 3 (e.g., via the Internet), instead of from the flash memory 17.

The operation data 111 is data representing an operation performed by a player on the terminal device 7 (terminal operation data). The operation data 111 is transmitted from the terminal device 7, acquired by the game device 3, and stored on the storage unit. The game device 3 is communicable with a plurality of terminal devices, and can acquire operation data from each of the plurality of terminal devices. In the case where there are a plurality of terminal devices, terminal operation data transmitted from each of the terminal devices is stored on the storage unit. On the storage unit, a predetermined number of pieces of terminal operation data may be stored sequentially from the latest data (the last data acquired) for each terminal device.

In the first embodiment, the operation data 111 includes angular velocity data, acceleration data, operation button data, stick data, touch position data, and azimuthal direction data. The angular velocity data is data representing an angular velocity detected by the gyrosensor 74. The acceleration data is data representing an acceleration (acceleration vector) detected by the acceleration sensor 73. The operation button data is data representing an input state on each of the operation buttons 54A through 54L provided in the terminal device 7. Specifically, the operation button data represents whether each of the operation buttons 54A through 54L has been pressed or not. Stick data is data representing a direction in which and a magnitude by which the stick portion of each of the analog sticks 53 (analog sticks 53A and 53B) has been slid (or tilted). The touch position data is data representing a position on the input surface of the touch panel 52 at which an input has been made (touch position). In the first embodiment, the touch position data represents coordinate values of a two-dimensional coordinate system which indicate the position on the input surface. In the case where the touch panel 52 is of the multi-touch type, the touch position data may represent a plurality of touch positions. The azimuthal direction data is data representing an azimuthal direction detected by the magnetic sensor 72.

The operation data 111 may include either one of the above-mentioned types of data included in the operation data 111 in the first embodiment. In the case where the terminal device 7 includes another input mechanism (e.g., touch pad, image-capturing mechanism of the controller 5, or the like), the operation data 111 may include data representing an operation on the another input mechanism.

The video information data 112 is data representing the video information acquired by the game device 3. In the first embodiment, the video information data 112 includes content data 113, advertisement data 114, and reproduction control data 115. The content data 113 is data representing the video content included in the video information. The advertisement data 114 is data representing the advertisement information included in the video information. The reproduction control data 115 is data representing an instruction to control reproduction of the advertisement information by the terminal device 7 (reproduction control instruction).

The processing data 116 is data usable in a video display process (FIG. 12) described later. The processing data 116 includes transmission data 117 and control command data 118. In addition to the data shown in FIG. 11, the processing data 116 includes various types of data usable in the control program 110.

The transmission data 117 represents transmission information to be transmitted to the transmission server 91 from the game system 1 (game device 3). The transmission data 117 represents attribute information on the user and/or current information. The attribute information is information regarding the user of the game system 1, for example, the age, address (district in which the user resides), the family structure or the like of the user. The current information represents a current state (e.g., current time, current weather, etc.). In the first embodiment, the transmission data 117 includes both of the data representing the attribute information and the data representing the current information.

The control command data 118 is data representing a control command for controlling the TV 2. In the first embodiment, data representing various types of control commands for causing the TV 2 to perform various types of operations is stored on the storage unit in the game device 3 in advance. The control command data 118 represents the control command to be transmitted to the TV 2 among these various types of control commands.

Now, with reference to FIGS. 12 through 17, processes executed by the game device 3 in the first embodiment will be described in detail. FIG. 12 is a main flowchart showing an example of process flow executed by the game device 3 in the first embodiment. When the game device 3 is powered on, the CPU 10 of the game device 3 executes a boot program stored on a boot ROM (not shown) to initialize units including the main memory (external main memory 12 or internal main memory 11e). Then, the control program 110 stored on the flash memory 17 is read into the main memory, and the CPU 10 starts executing the control program 110. The flowchart shown in FIG. 12 shows the process executed after the above-described process is completed. The game device 3 may be configured to execute the control program 110 soon after being powered on. Alternatively, the game device 3 may be configured as follows. After the game device 3 is powered on, a built-in program for displaying a predetermined menu screen is executed, and then it is instructed to boot the control program 110 by, for example, a selection operation on the menu screen. In response to this, the control program 110 is executed.

The steps shown in each of the flowcharts shown in the figures are merely examples, and the processing order of the steps may be exchanged as long as substantially the same results are provided (same as in a second embodiment). The values of the variables and the threshold values used in determination steps are also merely examples, and other values may be adopted when necessary. In this specification, each of the steps in the flowcharts will be described as being executed by the CPU 10. Alternatively, the steps in the flowcharts may be partially executed by a processor other than the CPU 10 or a dedicated circuit.

First, in step S1, the CPU 10 accesses the transmission server 91. Specifically, the CPU 10 requests the transmission server 91 for a selection image usable for selecting a video content, and acquires and displays the selection image. The selection image is, for example, a web page which introduces video contents. In the case where there are a plurality of accessible servers (e.g., in the case where a transmission server is installed for each of a plurality of broadcasters), the CPU 10 may specify the transmission server to access in accordance with a predetermined condition. For example, the transmission server may be specified in accordance with an instruction of the user or based on the attribute information on the user described later. Any specific method for specifying the transmission server is usable. For example, the CPU 10 may access a server which provides a web page linked to the transmission servers so that the user can specify the transmission server on the web page.

In step S1, the CPU 10 transmits an acquisition request for acquiring the selection image to the transmission server 91. Specifically, the CPU 10 stores data on the acquisition request in a predetermined area of the flash memory 17 as data to be transmitted to the network 92. The input/output processor 11a transmits the data on the acquisition request stored on the flash memory 17 to the network 92 at a predetermined timing. Owing to this, the data on the acquisition request is transmitted to the transmission server 91. When the acquisition request is received by the transmission server 91, the selection image is transmitted from the transmission server 91 to the game device 3. Hereinafter, with reference to FIG. 13, the process executed by the transmission server 91 will be described.

Figure 13:
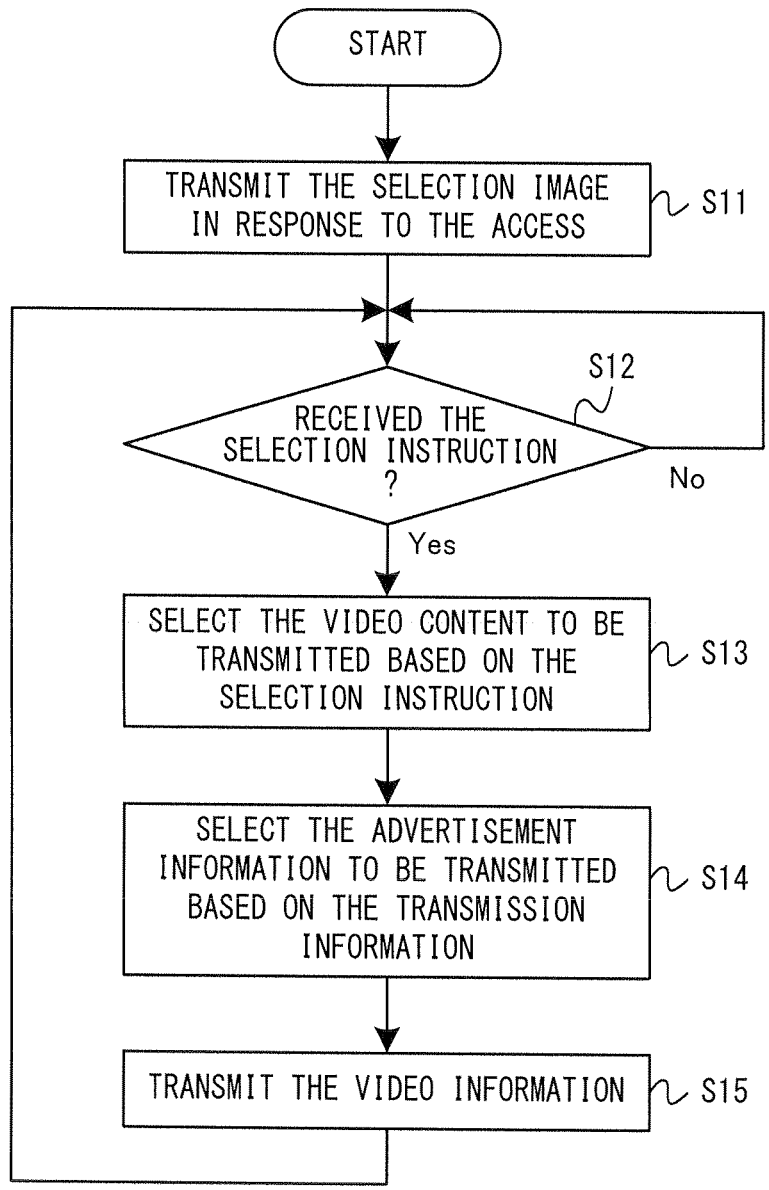
FIG. 13 is a main flowchart showing an example of process flow executable by a transmission server in the first embodiment.

FIG. 13 is a main flowchart showing an example of process flow executed by the transmission server 91 in the first embodiment. A series of processes shown in FIG. 13 is executed by the processing unit 12 of the transmission server 91 for executing a predetermined control program. The processes shown in FIG. 13 is started in response to an access made to the transmission server 91 by the game system 1. When the access from the game system 1 is discontinued, the processing unit 102 terminates the processes shown in FIG. 13. In the case where a plurality of game systems access the transmission server 91, the processing unit 102 executes the process shown in FIG. 13 in parallel for the plurality of game systems.

First, in step S11, the processing unit 102 transmits the selection image in response to the acquisition request from the game device 3. At this point, the data on the web page of the selection image has been stored on a predetermined storage unit of the transmission server 91. The processing unit 102 reads the data and transmits the data to the game device 3 via the communication unit 101. After the process of step S11, the transmission server 91 executes step 12 described later.

As a result of the process of step S11, the game device 3 receives the selection image. The CPU 10 outputs the received selection image to at least one of the two display devices (TV 2 and terminal device 7) and displays the selection image. In step S1, the image displayed on the side of the game system 1 (selection image, etc.) may be displayed on the TV 2 or on the terminal device 7. In the case where the image is displayed on the terminal device 7, the user can operate the image easily by use of the touch panel 52 or the like and also can use the TV 2 for another purpose, which is convenient. The operation by the user in step S1 may be performed in any manner. In the first embodiment, the operation by the user in step S1 is performed by use of the terminal device 7. After the process of step S1 described above, the process of step S2 is executed.

In step S2 shown in FIG. 12, the CPU 10 specifies the video content to be reproduced. Specifically, the CPU 10 accepts, from the user, a selection operation of selecting one of the video contents included in the selection image and specifies the video content selected by the selection operation. The selection operation may be performed in any manner. In the first embodiment, the selection operation is performed by use of the terminal device 7. For example, a selection image including an image representing each video content is displayed on the terminal device 7, and in response to the operation of touching the image representing a certain video content, the certain video content is specified. When the video content is specified, the CPU 10 stores data on the information identifying the specified video content (referred to as "identified information", for example, ID attached to the video content) on the main memory. After the process of step S3, the process of step S3 is executed.

In step S3, the CPU 10 acquires the transmission information to be transmitted to the transmission server 91. In the first embodiment, attribute information representing the attribute of the user and current information representing the current state are acquired as the transmission information. The transmission information may be acquired in any manner. For example, the CPU 10 may acquire information stored on the game device 3 (game system 1) in advance. In the case where, for example, attributer information on the age, the district of residence, the family structure or the like of the user is registered in the game system 1 in advance, such attribute information may be acquired as the transmission information. In the case where attribute information on a plurality of users is registered, the CPU 10 may identify the user who is currently using the terminal device 7 based on, for example, an image of the user captured by the camera 56 of the terminal device 7 to acquire the attribute information on the user. The CPU 10 may acquire transmission information on the current information on the current weather or the like from an external device via the network 92. Data representing the transmission information acquired as described above is stored on the main memory as the transmission data 117. After the process of step S3, the process of step S4 is executed.

In step S4, the CPU 10 issues a selection instruction on the video information (acquisition request) to the transmission server 91. The selection instruction includes the above-mentioned identifying information and transmission information. Specifically, the CPU 10 reads data on the identifying information and the transmission data 117 from the main memory, and generates selection instruction data including the read data. The selection instruction data is transmitted to the transmission server 91 in substantially the same manner as the acquisition request in step S1. After the process of step S4, the game device 3 executes the process of step S5.

In response to the selection instruction on the video information being transmitted to the transmission server 91 by the process of step S4 executed by the game system 1, the video information is transmitted from the transmission server 91. Specifically, in step S12 after step S11, the processing unit 102 of the transmission server 91 determines whether the selection instruction on the video information has been received or not. When the determination result of step S12 is positive, the process of step S13 is executed. By contrast, when the determination result of step S12 is negative, the process of step S12 is executed again. Namely, the processing unit 102 waits until the selection instruction is received from the game device 3, and upon receipt thereof, executes the process of step S13.

In step S13, based on the selection information on the video information, the processing unit 102 selects the video content to be transmitted (video content to be displayed on the TV 2). Specifically, among video contents stored on the video storage unit 103, the video content which is identified by the ID included in the selection instruction is selected as the video content to be transmitted. After the process of step S13, the process of step S14 is executed.

In step S14, based on the transmission information included in the selection instruction on the video information, the processing unit 102 selects the advertisement information to be transmitted. The advertisement information selected in this step is the advertisement information to be displayed on the terminal device 7 when the video content selected in step S13 is displayed on the TV 2. Specifically, among advertisement information stored on the advertisement storage unit 104, the advertisement information corresponding to the transmission information is selected as the advertisement information to be transmitted. The selection of the advertisement information based on the transmission information may be performed in any specific manner. For example, the transmission server 91 prepares, in advance, correspondence information which represents the correspondence between a condition regarding a predetermined item included in the transmission information (e.g., the condition that the age of the user is between 30 and 40, or the condition that the district where the user resides is in a predetermined district) and advertisement information which is to be selected when such a condition is fulfilled. In step S14, the CPU 10 uses the correspondence information to select the advertisement information corresponding to the transmission information. In the case where the reproduction time duration of one piece of advertisement information is shorter than the reproduction time duration of the video content selected in step 13, a plurality of pieces of advertisement information may be selected. The advertisement information to be selected may be changed in accordance with the video content. Namely, information which represents the correspondence between video contents and advertisement information which is to be reproduced when each of the video contents is reproduced may be prepared; and in step S14, the CPU 10 may select the advertisement information to be transmitted among the advertisement information corresponding to the video content selected in step S13. After the process of step S14, the process of step S15 is executed.

As described above, in the first embodiment, the game device 3 acquires the transmission information representing the attribute of the user and/or the current state (step S3), and transmits the transmission information to the transmission server 91 (step S4). Based on the transmission information, the transmission server 91 determines the advertisement information to be transmitted to the game device 3, which is an addressee of the received transmission information (step S14). According to the first embodiment, the transmission server 91 can present the viewer with the advertisement information corresponding to the attribute of the viewer of the video content or the current state. Owing to this, appropriate advertisement information corresponding to the age, the district of residence or the like of the viewer is presented, or appropriate advertisement information corresponding to the time or the like when the video content is to be viewed is presented. Thus, the advertizing effect can be improved.

In step S15, the processing unit 102 transmits the video information to the game device 3. The video information includes the video content and the advertisement information selected in steps S13 and S14. The video information may be transmitted in any manner. In the first embodiment, the processing unit 102 performs streaming transmission of the video information. Specifically, the processing unit 102 reads the video contents stored on the video storage unit 103 and the advertisement information stored on the advertisement storage unit 104, and transmits the moving images of the video contents and the advertisement information in succession. In the case where, for example, the advertisement information does not need to be transmitted for the same time duration as that of the video content (e.g., in the case where the advertisement information is reproduced by the terminal device 7 in repetition), only the video content may be transmitted temporarily. In other embodiments, the game device 3 may first download the entirety of the video information and then reproduce the video information. The transmission server 91 may process, for example, encrypt the video information, and the video information may be decoded on the side of the game system 1. In this case, the video content and the advertisement information may be encrypted separately, or the video information including the video content and the advertisement information may be encrypted.

As described above, in the first embodiment, the transmission server 91 transmits the video information including a combination of the video content and the advertisement information to the game system 1. Owing to this, the video content and the advertisement information which is to be presented together with the video content can be transmitted as a set. This allows the side of the transmission server (broadcaster) to adjust the content of advertisement easily.

In the first embodiment, the transmission server 91 performs streaming transmission of the video content and the advertisement information including a moving image to the game device 3. In this case, the game device 3 outputs the video content received in succession to the TV 2 in succession while transmitting the advertisement information received in succession to the terminal device 7 in succession (steps S6 and S7 described later). Owing to this, predetermined advertisement information can be reproduced at an appropriate timing in accordance with a specific content of the video content. For example, predetermined advertisement information is reproduced at a timing when the video content provides a predetermined specific content (e.g., in the case where the video content is a relay broadcasting program of a baseball game, at a timing when the offense and defense are exchanged), and thus the advertizing effect of the advertisement information can be improved. According to the first embodiment, advertisement information suitable to the video content can be transmitted from the side of the server 91 easily. Therefore, advertisement information suitable to the video content can be presented to the user (viewer), and thus the advertizing effect can be improved.

In the first embodiment, the video information may include a reproduction control instruction. The reproduction control instruction is an instruction to control the reproduction of the advertisement information by the terminal device 7. For example, the reproduction control instruction may be an instruction to reproduce the advertisement information, which is a target of control, in repetition. Alternatively, the reproduction control instruction may be an instruction to reproduce the advertisement information, which is a target of control, in response to the reproduced specific content of the video content reaching a predetermined state (e.g., in response to a predetermined specific content having been reproduced, or in response to a predetermined time duration having passed from the start of the reproduction). The reproduction control instruction may be issued in the form of data representing a condition for reproduction or in the form of a program executable by the game device 3. In step S15, the CPU 10 transmits the video information in the state of including the reproduction control instruction at an appropriate timing during the streaming transmission of the video information. For example, the reproduction control instruction may be transmitted before the advertisement information, which is a target of control, is transmitted.

The transmission of the video information in step S15 is continued until the entirety of the video information is transmitted. When the transmission of the video information is completed, the process of step S12 is executed again. After this, the processing unit 102 executes the processes of steps S12 through S15 in repetition until the access to the transmission server 91 by the game system 1 is discontinued.

Returning to FIG. 12, in step S5, the CPU 10 executes the reproduction control process. The reproduction control process is a process of causing the video content and the advertisement information included in the video information from the transmission server 91 to be displayed on the two display devices. In the first embodiment, the reproduction control process is executed in repetition at a rate of once in a predetermined time duration (1 frame time). Hereinafter, with reference to FIG. 14, the reproduction control process will be described in detail.

Figure 14:
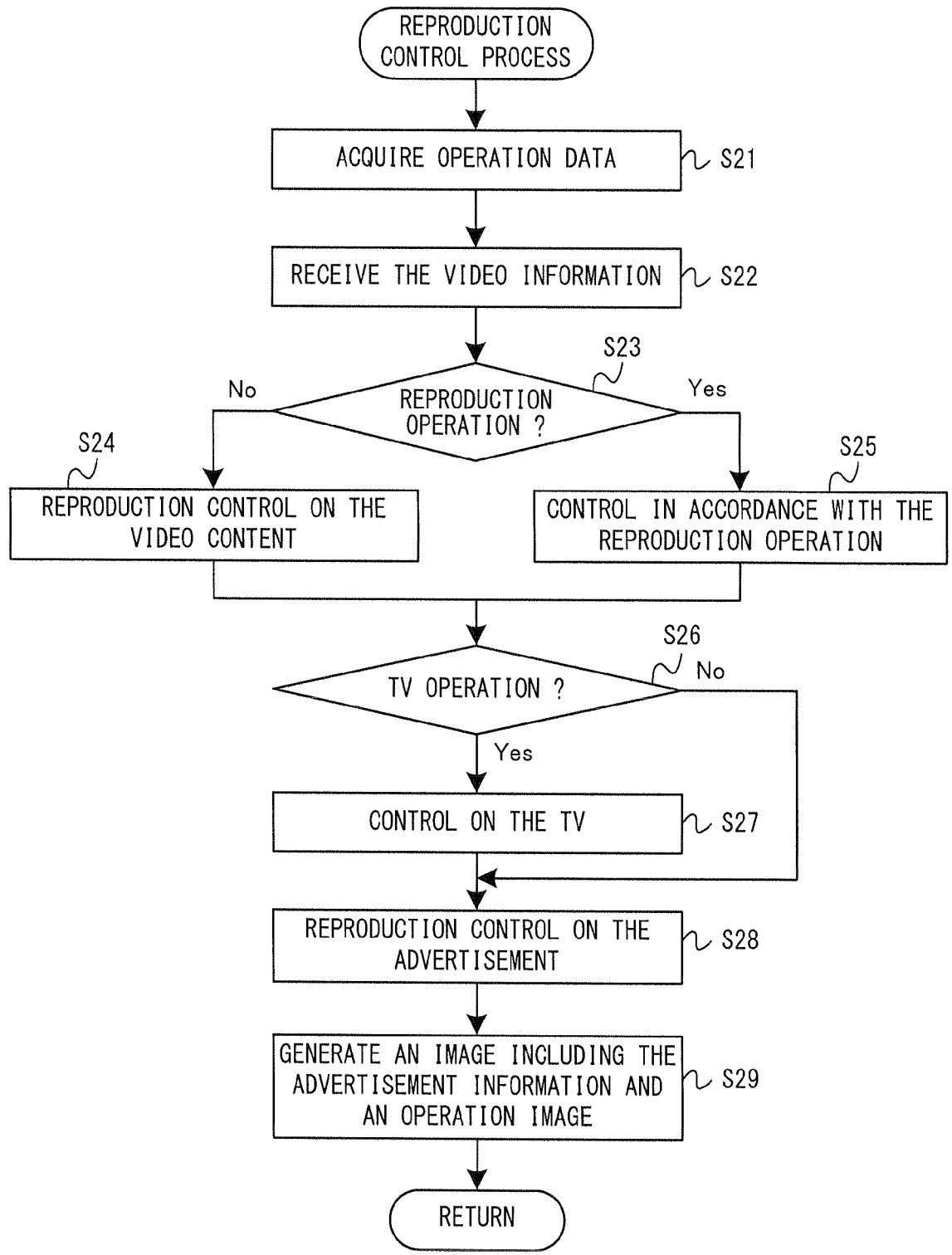
FIG. 14 is a flowchart showing an example of reproduction control process (step 5) shown in FIG. 12 in detail.

FIG. 14 is a flowchart showing an example of process flow of the reproduction control process shown in FIG. 12 (step S5) in detail. The reproduction control process is executed as follows. First, in step S21, the CPU 10 acquires the operation data (terminal operation data) transmitted from the terminal device 7. The terminal device 7 transmits the terminal operation data to the game device 3 in repetition, and thus the game device 3 receives the terminal device operation in succession. In the game device 3, the terminal communication module 28 receives the terminal operation data in succession, and the input/output processor 11a stores the terminal operation data on the main memory in succession. In step S21, the CPU 10 reads the latest terminal operation data 111 from the main memory. After the process of step S21, the process of step S22 is executed.

In step S22, the CPU 10 receives (acquires) the video information transmitted from the transmission server 91. Namely, the data received from the transmission server 91 is stored on the flash memory 17. Specifically, the data representing the video content included in the video information is stored on the flash memory 17 as the content data 113, the data representing the advertisement information included in the video information is stored on the flash memory 17 as the advertisement data 114, and the data representing the reproduction control instruction is stored on the flash memory 17 as the reproduction control data 115. Since the transmission server 91 transmits the video information in succession by streaming transmission, each type of the data included in the video information is stored on the flash memory 17 in succession. Among the data stored on the flash memory 117, data on the image (moving image or still image) which has been reproduced may be erased when appropriate. After the process of step S22, the process of step S23 is executed.

In step S23, the CPU 10 determines whether an operation regarding the reproduction of the video content (reproduction operation) has been performed or not. The reproduction operation may be any operation which instructs to control the reproduction of the video content. In the first embodiment, the reproduction operation is an operation of reproducing the video content, stopping the reproduction, or temporarily pausing the reproduction. In other embodiments, the reproduction operation may be an operation of, for example, fast-forwarding or reversing the reproduction of the video content, or an operation of, for example, adjusting the volume of the sound which is output together with the video content. The reproduction operation may be performed in any manner. In the first embodiment, the reproduction operation is performed by use of the terminal device 7. In the first embodiment, the user can perform the reproduction operation by use of the touch panel 52, which will be described later in detail regarding step S29. In step S23, the process is executed as follows specifically. Based on the operation data read in step S21, the CPU 10 determines whether the reproduction operation has been performed or not. When the determination result of step S23 is negative, the process of step S24 is executed. By contrast, when the determination result of step S23 is positive, the process of step S25 is executed.

In step S24, the CPU 10 controls the reproduction of the video content. Specifically, the CPU 10 specifies an image of a video content to be output to the TV 2 among the images of the video contents stored on the flash memory 17. In step S24, the video contents are specified in a time series such that normal reproduction is performed. After the process of step S24, the process of step S26 described later is executed.

In step S25, the CPU 10 controls the reproduction of the video content in accordance with the reproduction operation. Specifically, the CPU 10 specifies an image among the images of the video contents stored on the flash memory 17 such that the image of the video content to be output to the TV 2 is suitable to the reproduction operation (fast-forwarding, reversing, pausing, etc.). After the process of step S25, the process of step S26 is executed.

In the first embodiment, the user can perform an operation on the TV 2 by use of the terminal device 7. Specifically, the TV 2 receives a control signal, generated in accordance with an operation performed by the user on the terminal device 7, from the terminal device 7 or the game device 3, and performs an operation in accordance with the control signal. Hereinafter, the processes of steps S26 and S27 for controlling the operation of the TV 2 will be described in detail.

In step S26, the CPU 10 determines whether an operation for controlling the TV 2 (TV operation) has been performed or not. The TV operation may be any operation which instructs to control the operation of the TV 2. In the first embodiment, the TV operation is an operation of, for example, turning ON/OFF the power of the TV 2, increasing or decreasing the sound volume, or changing the display mode. In other embodiments, in the case where the TV 2 can control the reproduction of the video content, the TV operation may be an operation (on the TV 2) regarding the reproduction of the video content, for example, an operation of reproducing the video content, or fast-forwarding or reversing the reproduction. The TV operation may be performed in any manner. In the first embodiment, the TV operation is performed by use of the terminal device 7. In the first embodiment, the user can perform the TV operation by use of the touch panel 52, like the reproduction operation, which will be described later in detail. In step S26, the process is executed as follows specifically. Based on the operation data read in step S21, the CPU 10 determines whether the TV operation has been performed or not. When the determination result of step S26 is positive, the process of step S27 is executed. By contrast, when the determination result of step S26 is negative, the process of step S27 is skipped and the process of step S28 is executed.

In step S27, the CPU 10 controls the TV 2 in accordance with the TV operation performed by the user. Specifically, a control command for causing the TV 2 to perform an operation in accordance with the TV operation is generated and is output to the TV 2. The CPU 10 stores the control command data 118 representing the control command on the storage unit. The TV 2 may be controlled by the control command in any manner. In the game system 1 in the first embodiment, the TV 2 can be controlled by a first method and/or a second method described below.

According to the first method, the terminal device 7 transmits a control signal regarding the reproduction and/or the display of the video content to the TV 2 in response to an operation performed by the user on the terminal device 7, and the TV 2 performs an operation in accordance with the control signal from the terminal device 7. In the first embodiment, the CPU 10 transmits, to the terminal device 7, an instruction to cause the infrared communication module 82 to output an infrared signal corresponding to the control command represented by the control command data 118. In response to this instruction, the codec LSI 76 of the terminal device 7 outputs the infrared signal corresponding to the control command to be output to the infrared communication module 82. As a result of the infrared signal being received by the infrared reception unit of the TV 2, the TV 2 performs an operation in accordance with the control command. In the first embodiment, the terminal device 7 controls the TV 2 by infrared communication using an infrared reception function owned by a general TV. Therefore, a general TV can be used easily as the display device, and thus a system usable for a variety of applications can be provided.

According to the second method, the game device 3 outputs the control signal to the TV 2, and the TV 2 performs an operation in accordance with the control signal. Specifically, in the first embodiment, the CPU 10 outputs the control signal corresponding to the control command represented by the control command data 118 to the TV 2 via the AV connector 16. The game system 1 controls the operation of the TV 2 by at least either the first method or the second method. After the process of step S27, the process of step S28 is executed.

As described above, in the first embodiment, the terminal device 7 includes an operating unit for accepting an operation performed by the user, and transmits the operation data representing an operation performed on the operating unit to the game device 3. The game device 3 acquires the operation data (step S21), and performs control regarding the reproduction and/or the display of the video content on the TV 2 based on the operation data (steps S25 and S28). In the first embodiment, the "control regarding the reproduction of the video content" is the control in the process of step S25. In the first embodiment, the "control regarding the display of the video content" is the control of turning ON/OFF the TV 2 in the process of step S28. As described above, in the first embodiment, the user can perform an operation on the video content by use of the terminal device 7. According to the first embodiment, the user views the terminal device 7 when performing an operation on the video content. At this point, it is possible to direct the user's attention to also the advertisement information displayed on the terminal device 7. Namely, in the first embodiment, an operation on the video content is allowed to be performed by use of the terminal device 7 (which displays the advertisement information), and thus it is possible to direct the user's attention also to the advertisement information displayed on the terminal device 7 during the reproduction of the video content. This can improve the advertizing effect of the advertisement information.

In step S28, the CPU 10 performs reproduction control on the advertisement information. Specifically, the CPU 10 specifies an image to be output to the terminal device 7 among images of the advertisement information stored on the flash memory 17. The specification of the image in step S28 may be performed in any manner. In the first embodiment, in the case where there is a reproduction control instruction from the transmission server 91, the image is specified in accordance with the reproduction control instruction. By contrast, in the case where is no reproduction control instruction from the transmission server 91, the images are specified in a time series such that normal reproduction is performed. Specifically, the CPU 10 determines whether the reproduction control data 115 is stored on the flash memory 17 or not. When the reproduction control data 115 is stored, the CPU 10 reads the reproduction control data 115 and specifies the image such that the advertisement information is reproduced in accordance with the reproduction control instruction. By contrast, when the reproduction control data 115 is not stored, the CPU 10 specifies the images such that the images are reproduced in a time series.

As described above, in the first embodiment, the transmission server 91 transmits the video information including the reproduction control instruction regarding the reproduction of the advertisement information (step S15), and the CPU 10 controls the reproduction of the advertisement information in accordance with the reproduction control instruction (step S28). Owing to this, the reproduction of the advertisement information by the terminal device 7 can be controlled on the side of the transmission server 91 easily. For example, the advertisement information can be reproduced in a form described below.

Figure 15:
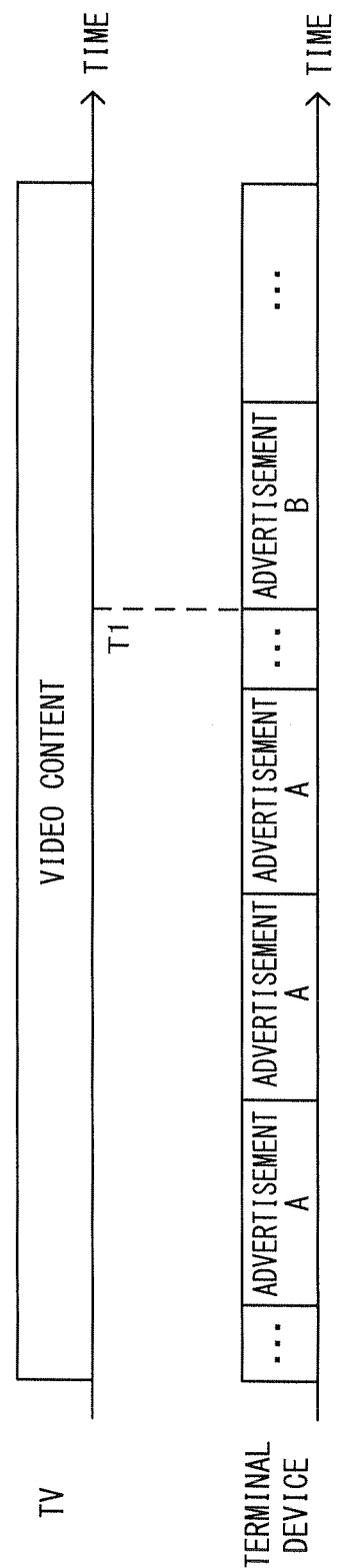
FIG. 15 shows an example of specific content reproduced by a TV and a terminal device.

FIG. 15 shows an example of content to be reproduced by the TV 2 and the terminal device 7. In the first embodiment, as shown in, for example, FIG. 15, the CPU 10 may control a predetermined advertisement A to be reproduced in repetition in accordance with the reproduction control instruction (in this case, the reproduction time duration of the predetermined advertisement A is shorter than that of the video content to be reproduced by the TV 2). The advertisement A is, for example, a commercial provided as one piece of advertisement information. Owing to this, the moving image of the advertisement information is reproduced in repetition, and thus the advertizing effect can be improved. In addition, the use of the reproduction control instruction can reduce the amount of data of the video information to be transmitted from the transmission server 91.

The CPU 10 may control the reproduction of the advertisement information by the terminal device 7 such that predetermined advertisement information is reproduced by the terminal device 7 at a timing when the specific content of the video content reaches a predetermined state. Specifically, as shown in FIG. 15, the CPU 10 may control the reproduction such that a predetermined advertisement B is reproduced by the terminal device 7 at a timing T1 when the video content reproduced by the TV 2 reaches a predetermined state.

The predetermined state may be any state, and the timing may be any timing. The timing T1 is, for example, a timing when the user is assumed to terminate the viewing (attention) of the video content, or a timing when the user's attention is assumed to be diverged from the video content. Specifically, in the case where the video content is a relay broadcasting program of a baseball game, the timing T1 may be a timing when the offense and defense are exchanged. In the case where the video content include a commercial, the timing T1 may be a timing when the video content is switched from the TV program to the commercial. In this manner, the predetermined advertisement B is reproduced by the terminal device 7 at a timing when the attention of the user is assumed to be diverged from the video content displayed on the TV 2. Owing to this, it is possible to cause the user to notice the advertisement B easily, which can improve the advertizing effect of the advertisement B.

The advertisement information may be related to the specific content of the video content. In this case, the timing T1 may be, for example, a timing when the content related to the advertisement B is reproduced as the video content. Specifically, in the case where the video content includes advertizing moving images (commercials), at a timing when a predetermined advertizing moving image in the video content is reproduced (during or immediate after the reproduction), the CPU 10 may reproduce the advertisement B related to the predetermined advertizing moving image by the terminal device 7. Alternatively, at a timing when a product is displayed in the video content, the CPU 10 may reproduce the advertisement B regarding the product by the terminal device 7. As described above, the CPU 10 may output advertisement information to the terminal device 7 such that advertisement information corresponding to the specific content of the video content to be reproduced by the TV 2 is reproduced by the terminal device 7. Owing to this, regarding the product or the like introduced in the video content reproduced by the TV 2, detailed information can be provided to the user by the terminal device 7 immediately. Therefore, at a timing when the user wishes to view (obtain more detailed information of) the product, such detailed information can be provided to the user. This can improve the advertizing effect of the advertisement B. According to the above, for example, a continuation to the advertisement (commercial) included in the video content can be presented by the advertisement information displayed on the terminal device 7. Owing to this, the advertisement can be made interesting to the user, which can improve the advertizing effect of the advertisement information.

As the advertisement B, a web page may be displayed as well as the moving image, the still image or the like. For example, in the case where the video content to be displayed on the TV 2 includes a URL, the web page of the URL may be displayed on the terminal device 7. More specifically, when the URL of a website of a sponsor is displayed in the commercial included in the video content, a page of the website may be displayed on the terminal device 7. Owing to this, the work of the user of inputting the URL can be omitted, and also the advertizing effect of the web page can be improved. An operation of purchasing the product using the website may be made possible. In this case, the specific content of the video content and the purchase screen can be associated with each other to provide a situation close to TV shopping, which provides a high advertizing effect. It may be made possible to input information for purchasing a product by a touch operation. The terminal device 7 may have a built-in RFID reader or may be connected to an RFID reader, and thus a card may be read for payment.

Timing information attached to the video content may be used to determine whether the specific content of the video content reaches the predetermined state or not. The timing information may be any information which can make the determination. For example, the timing information is a flag indicating that the video content reaches the predetermined state, or a time stamp attached to each of images included in the video content. The CPU 10 refers to the timing information to make the determination. This determination method allows the display timing of the advertisement information to be controlled and managed easily on the side of the transmission server 91 by use of the reproduction control instruction. In other embodiments, the determination may be made by the game device 3 analyzing the images of the video content.

In the first embodiment, the transmission server 91 uses the reproduction control instruction so that the display timing of the advertisement information is controlled in the game system 1 as shown in FIG. 15. In other embodiments, the transmission server 91 may control the display timing of the advertisement information as shown in FIG. 15 without using the reproduction control instruction (e.g., by streaming transmission or the like).

Returning to FIG. 14, in step S29 after step S28, the CPU 10 generates an image including the advertisement information and an operation image. In the first embodiment, the image generated in step S29 is displayed on the terminal device 7. The operation image is an image regarding the operation performed on the operating unit of the terminal device 7 (touch panel 52, buttons 54A through 54M, etc.). Specifically, the operation image may be an image of a button displayed on the terminal device 7 in order to allow an operation to be performed on the touch panel 52, or an image representing an operation performed by use of any of the buttons of the terminal device 7 (e.g., image representing "determine by button A" or "cancel by button B").

Figure 16:
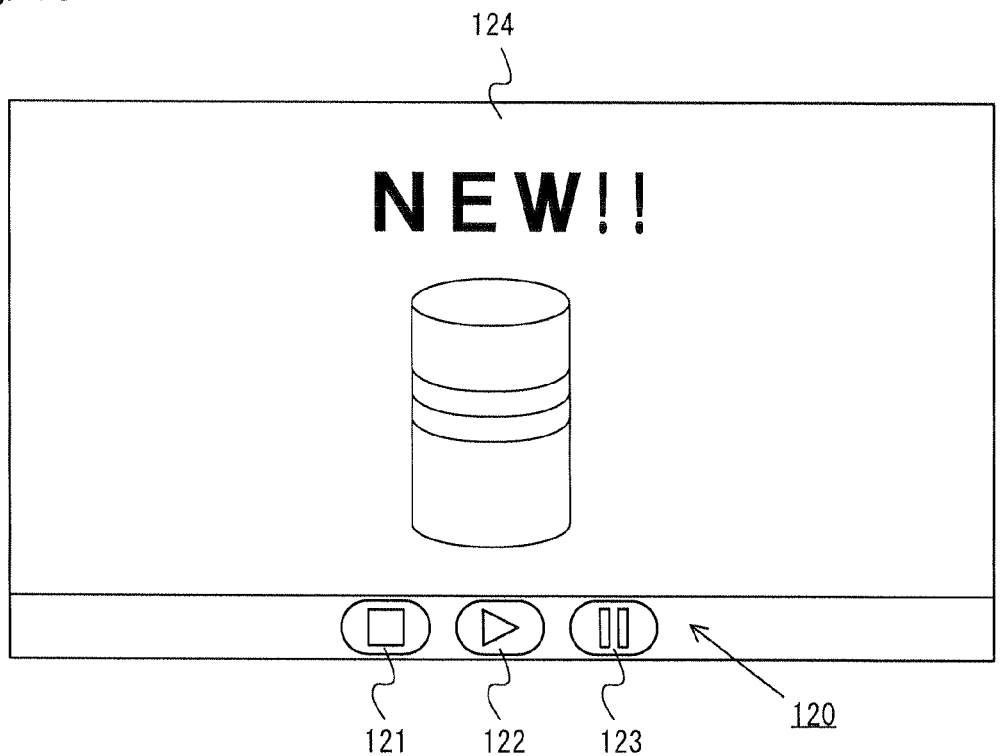
FIG. 16 shows an example of reproduction operation image.

In the first embodiment, an image for performing an operation regarding the reproduction of the video content by the TV 2 (reproduction operation image) and/or an image for performing an operation on the TV 2 (TV operation image) is displayed on the terminal device 7 as the operation image. FIG. 16 shows an example of reproduction operation image. As shown in FIG. 16, the terminal device 7 displays a reproduction operation image 120 in addition to advertisement information 124. The reproduction operation image 120 includes a stop button 121, a reproduction button 122, and a pause button 123. The stop button 121 is an image representing an instruction to stop the reproduction of the video content. The reproduction button 122 is an image representing an instruction to reproduce the video content. The pause button 123 is an image representing an instruction to pause the reproduction of the video content. In other embodiments, an image representing an instruction to fast-forward or reverse the reproduction of the video content, an image representing a bar usable to issue an instruction to specify the reproduction position of the video content, or the like may be displayed as a reproduction operation image.

Figure 17:
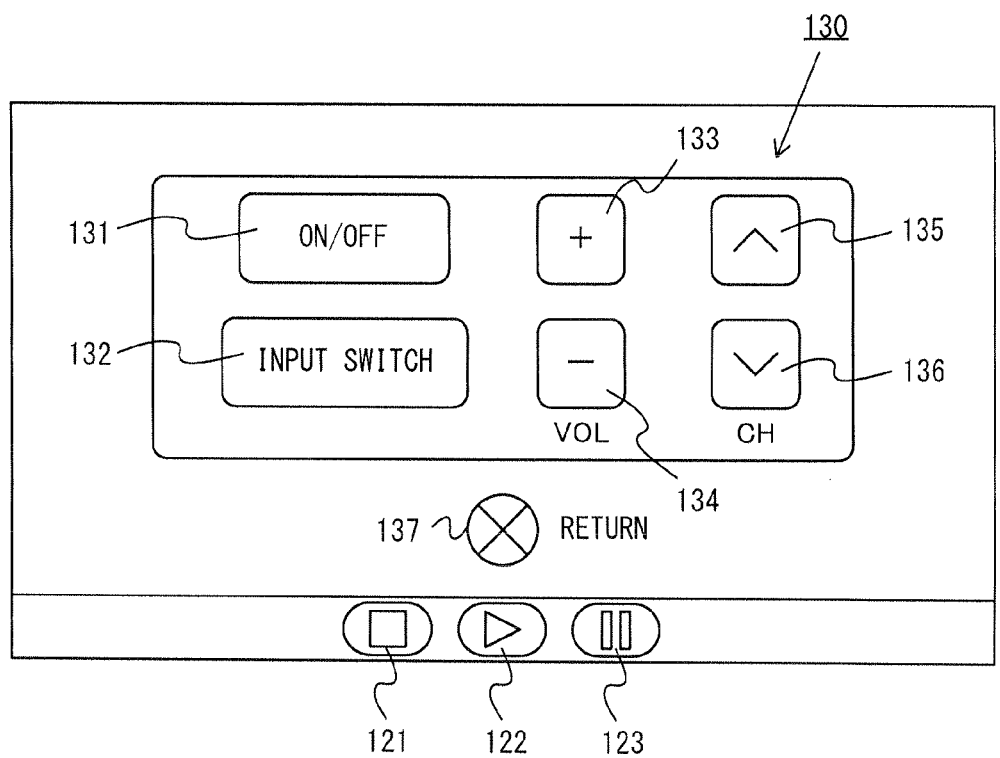
FIG. 17 shows an example of TV operation image.

FIG. 17 shows an example of TV operation image. As shown in FIG. 17, a TV operation image 130 is displayed on the terminal device 7. Although not shown in FIG. 17 for the purpose of making the figure easier to see, the advertisement information 124 is displayed below the TV operation image 130 in the first embodiment. In other embodiments, the advertisement information 124 may not be displayed, or the TV operation image 130 may be displayed over the advertisement information 124 in a semitransparent state. As shown in FIG. 17, the TV operation image 130 includes a power button 131, an input switch button 132, a volume up button 133, a volume down button 134, a channel increase button 135, a channel decrease button 136, and a return button 137. The buttons 131 through 136 are each an image representing a control instruction on the TV 2. The power button 131 is an image representing an instruction to switch ON/OFF the power of the TV 2. The input switch button 132 is an image representing an instruction to switch the input to the TV 2 (e.g., switching the input between a mode of inputting and displaying a video of a TV program and a mode of inputting and displaying an image from the game device 3). The volume up button 133 is an image representing an instruction to increase a sound volume of the TV 2. The volume down button 134 is an image representing an instruction to decrease the sound volume of the TV 2. The channel increase button 135 is an image representing an instruction to switch the station of the TV 2 one by one in an ascending manner. The channel decrease button 136 is an image representing an instruction to switch the station of the TV 2 one by one in a descending manner. By use of each of the buttons 131 through 136, the user can perform an operation on the power, input switch, sound volume and station selection of the TV 2. The return button 137 is an image representing an instruction to stop the display of the TV operation image 130. In other embodiments, buttons provided in a remote control of a general TV, for example, a button representing each of channels, a button representing an instruction to display a program guide, a button representing an instruction to record (in the case where the game device 3 or the TV 2 has a recording function) and the like may be displayed on the terminal device 7, in addition to the above-mentioned buttons.

In the first embodiment, the reproduction operation in step S23 is an operation of touching any of the buttons 121 through 123 of the reproduction operation image 120. The TV operation in step S27 is an operation of touching any of the buttons 131 through 136 of the TV operation image 130. Namely, in the first embodiment, the user can perform a reproduction operation and a TV operation by use of the touch panel 52 of the terminal device 7. An input for these operations may be controlled at a timing during the reproduction of the video content. Specifically, the CPU 10 may partially or entirely control these operations at a predetermined timing while the video content is being displayed. For example, at a timing when a predetermined video is displayed, the CPU 10 may control such that an operation of stopping the display, fast-forwarding the display or the like is not accepted, or such that such a button is not displayed. Owing to such control, the video which the provider of the video content (the side of the transmission server) wishes to show can be viewed by the user without fail. For example, in the case where the video content include a commercial, the CPU 10 can control such that the commercial can be viewed without being skipped. An instruction to restrict the reproduction operation or the TV operation may be performed by the transmission server 91. Specifically, such an instruction may be transmitted from the transmission server 91 to the game system 1 together with the video information, and the CPU 10 may restrict the operation based on the received instruction.

In the first embodiment, in the case where a predetermined operation of causing the TV operation image 130 to be displayed is performed, the CPU 10 generates an image including the advertisement information 124 and the TV operation image 130 overlapped thereon (see FIG. 17). By contrast, in the case where the predetermined operation is not performed, the CPU 10 generates an image including the advertisement information 124 and the reproduction operation image 120 (FIG. 16). The predetermined operation may be any operation. For example, the predetermined operation may be an operation of pressing a predetermined button provided in the terminal device 7. Owing to this, the user can cause the TV operation image 130 to be displayed easily by one operation, which is convenient.

In step S29, the process is executed as follows specifically. The CPU 10 reads an image of the advertisement information to be displayed from the flash memory 17, and generates an image including the image and also the reproduction operation image 120 (and the TV operation image 130 when necessary). Such an operation image may be generated in any manner. In the first embodiment, image data usable for generating the reproduction operation image 120 and the TV operation image 130 is stored on the main memory or the like in advance. In other embodiments, the image data may be acquired from the transmission server 91 together with the video information as described later. The CPU 10 stores the generated image on the storage unit of the game device 3 (e.g., flash memory 17, main memory, or VRAM 11d). After step S29, the CPU 10 terminates the reproduction control process.

As described above regarding step S29, in the first embodiment, in the case where the video content is displayed on the TV 2, the terminal device 7 displays the operation image together with the advertisement information (FIG. 16 and FIG. 17). Owing to this, the user views the operation image when performing an operation on the video content. Therefore, it is possible to direct the user's attention also to the advertisement information displayed on the terminal device 7 together with the operation image. According to the process of step S29, the operation image is displayed on the terminal device 7, and thus the advertizing effect of the advertisement information can be improved.

In the first embodiment, the terminal device 7 includes the touch panel 52, and the operation for performing control on the reproduction and/or the display of the video content on the TV 2 is performed by use of the touch panel 52. Therefore, the user can perform an operation perceptively and easily by use of the touch panel 52. When performing an operation by use of the touch panel 52, the user views the operation image. Therefore, it is possible to direct the user's attention to the advertisement information displayed together with the operation image, with certainty. This can improve the advertizing effect of the advertisement information.

In other embodiments, the reproduction operation may be partially or entirely set to be different in accordance with the transmission server 91 as an addressee of the video content and/or in accordance with the video content transmitted. For example, the transmission server 91 transmits information on the reproduction operation (information representing the correspondence between the content of the reproduction operation and the operation to be performed by the game device 3 in accordance with the reproduction operation) and data on the reproduction operation image together with the video information, and the game device 3 executes the process of step S25 using the information on the reproduction operation. The game device 3 also executes the process of step S29 using the received data on the reproduction operation image. Owing to this, the method of the reproduction operation can be controlled on the side of the transmission server 91, and thus an operation method suitable to the video content can be provided.

Returning to FIG. 12, in step S6 after step S5, the CPU 10 outputs the video content to the TV 2. First, the CPU 10 reads the content data 113 stored on the flash memory 17, and stores an image included in the moving image of the video content on the VRAM 11*d*. At this point, the CPU 10 and the GPU 11*b* generate an image from the data stored on the flash memory 17 when necessary. For example, in the case where the content data 113 stored on the flash memory 17 is compressed by a predetermined scheme, the data on the moving image is decompressed to generate an image. In the case where the data on the moving image is stored in units of packets, an image is generated from the data in units of packets. The image stored on the VRAM 11*d* is transferred to the AV-IC 15, and the AV-IC 15 outputs the image to the TV 2 via the AV connector 16. Owing to this, an image included in the moving image is displayed on the TV 2. A sound may be acquired from the transmission server 91 together with the moving image of the video content. In step S5, a sound may be output to the TV 2 together with the moving image and may be output from the speaker 2*a* of the TV 2. After the above-described process of step S6, the process of step S7 is executed.

In step S7, the CPU 10 outputs (transmits) the image of the advertisement information to the terminal device 7. Specifically, the data on the terminal image stored on the storage unit in step S29 is transferred to the codec LSI 27 by the CPU 10, and is compressed as predetermined by the codec LSI 27. The compressed image data is transmitted to the terminal device 7 by the terminal communication module 28 via the antenna 29. The terminal device 7 receives the image data, transmitted from the game device 3, by the wireless module 80, and the received image data is decompressed as predetermined by the codec LSI 76. The decompressed image data is output to the LCD 51. Owing to this, the terminal image is displayed on the LCD 51. After the process of step S7, the process of step S8 is executed.

The advertisement information including a sound together with the image may be acquired from the transmission server 91. In this case, in step S7, the sound may be transmitted to the terminal device 7 together with the image, and may be output from the speakers 77 of the terminal device 7. In the case where information on the sound to be reproduced together with the video content is included in the video information and is reproduced by the TV 2 together with the video content, the terminal device 7 may be controlled so as not to output the sound such that the reproduction by the TV 2 is not disturbed. Specifically, in this case, the advertisement information may be controlled so as not to include the sound information. In other embodiments, at the above-mentioned "timing when the video content to be reproduced by the TV 2 reaches a predetermined state (timing T1 shown in FIG. 15)", the CPU 10 may notify the user of the timing by use of the terminal device 7. The timing may be notified to the user by, for example, outputting a sound from the terminal device 7 or by vibrating the vibrator 89 of the terminal device 7.

In step S8, the CPU 10 determines whether or not to terminate the reproduction of the video content by the TV 2. The determination in step S8 is made, for example, in accordance with whether the video content has been reproduced until the end or not, or in accordance with whether an instruction to stop the reproduction of the video content has been issued or not. When the determination result of step S8 is positive, the process of step S2 is executed again. Specifically, when the reproduction of the video content is terminated, the processing unit 102 specifies the video content to be reproduced next in accordance with an instruction by the user. By contrast, when the determination result of step S8 is negative, the process of step S9 is executed.

In step S9, the CPU 10 determines whether or not to terminate the viewing of the video content (and the advertisement information). The determination in step S9 is made, for example, in accordance with whether an instruction to terminate the viewing has been issued by the user or not. When the determination result of step S9 is negative, the process of step S5 is executed again. After this, while the reproduction of the video content is continued (while the determination results of steps S8 and S9 are negative), the CPU 10 executes the processes of steps S5 through S9 in repetition. By contrast, when the determination result of step S9 is positive, the CPU 10 terminates the process shown in FIG. 12.

As described above, in the first embodiment, the video content included in the video information transmitted from the transmission server 91 is displayed on the TV 2, and the advertisement information included in the video information is displayed on the terminal device 7. Owing to this, the advertisement information can be presented to the user effectively, and thus the advertizing effect can be improved.

In the case where a program which the user has missed is provided as the video content as in the first embodiment, it is possible to motivate the user who has viewed such a program to view TV broadcasting related to the program which he/she missed. In the case where a version for sample viewing of the video content is provided as the advertisement information, it is possible to motivate the user to view the video content. In this manner, according to the first embodiment, regardless of whether a TV program is provided as the video content (without charge) or for a charge, a video distribution system advantageous to the provider of the video content (broadcaster, etc.) can be constructed.

1-8. Modifications of the First Embodiment (Modification in which Related Information is Transmitted)

In the above embodiment, the advertisement information is transmitted as information to be transmitted together with the video content. In other embodiments, related information relating to the video content may be transmitted together with the video content, instead of the advertisement information. The related information is, for example, information related to the information introduced in the video content, additional information related to the video content or the like. Specifically, in the case where the video content is a cooking program, information on a recipe of a dish may be displayed on the terminal device 7 as the related information. In the case where the video content is a film or a TV drama, information on the cast may be displayed on the terminal device 7 as the related information. The related information includes advertisement information of a product introduced in the video content or advertisement information on the video content itself. In the case where the video content includes an advertisement, advertisement information related to the advertisement can be the related information. Namely, such advertisement information may be displayed on the terminal device 7 as the related information. In the case where the related information is displayed on the terminal device 7 as described above, the related information can be displayed for the same time duration as the reproduction time duration of the video content. Therefore, a large amount of information regarding the video content can be presented to the user. In the case where the related information is displayed on the terminal device 7, like in the case of the advertisement information, the related information displayed on the terminal device 7 is not displayed on the TV 2. Therefore, the related information does not disturb the video content displayed on the TV 2, and thus the video content can be presented to the user in an easy-to-view manner.

(Modification in which Advertisement Information is Transmitted During TV Broadcasting)

In the above embodiment, in the case where the video content transmitted from the transmission server 91 is displayed on the TV 2, advertisement information is displayed on the terminal device 7. In other embodiments, in the case where a TV program received by TV broadcasting is displayed on the TV 2, advertisement information (or related information) may be displayed on the terminal device 7. In this case, it is conceivable that the video display system operates as follows.

The game device 3 first acquires program selection information usable for selecting a TV program (e.g., information on the electronic program guide) from a predetermined server. In response to the acquisition request from the game device 3, the server transmits the program selection information to the game device 3. Upon receipt of the program selection information, the game device 3 causes the terminal device 7 or the TV 2 to display the program selection information. In accordance with, for example, an operation performed by the user on the terminal device 7, the game device 3 specifies a TV program to be viewed among a plurality of TV programs included in an image of the program selection information. The game device 3 also transmits information on the specified TV program to the server as transmission information. The transmission information may include attribute information or current information, like in the above embodiment. Upon receipt of the transmission information, the server transmits advertisement information to the game device 3. The advertisement information to be transmitted may be selected in accordance with the attribute information and/or the current information included in the transmission information like in the above embodiment, or may be selected in accordance with the specified TV program. The server may transmit the advertisement information of a content suitable to the TV program specified by the game device 3. Meanwhile, the game device 3, after specifying the TV program, controls the TV 2 such that the program is received and displayed. The game device 3 also causes the advertisement information transmitted from the server to be displayed on the terminal device 7. Owing to the above, the game system 1 can display the TV program by the TV broadcasting on the TV 2 and also display the advertisement information on the terminal device 7.

(Modification in which a Plurality of Terminal Devices are Included)

In the above embodiment, the video display system 90 includes one terminal device 7. In other embodiments, the video display system may include a plurality of terminal devices 7. In the case where there are a plurality of terminal devices, the terminal devices may display different advertisement information and/or related information or the same advertisement information and/or related information. For example, one terminal device may display advertisement information while another terminal device may display related information. In this manner, in the case where there are a plurality of terminal devices, diversified information can be provided to the user.

In other embodiments, even in the case where the game system 1 is not used, a combination of the video content and the advertisement can be presented in substantially the same manner as above. For example, information devices such as a set top box (receiving device) connected to a TV and a tablet terminal (terminal device) may be used. In the case of a structure using a set top box and a tablet terminal, the video content and the advertisement information included in the video information may be respectively distributed to the set top box and the tablet terminal by a router or the like so that the set top box and the tablet terminal respectively display the video content and the advertisement information. Alternatively, when synchronization is performed, the video content and the advertisement information are received by the set top box and the tablet terminal respectively and reproduced in association with each other. Specifically, the transmission server 91 may transmit the video information including the video content and the advertisement information to the set top box (TV 2) and the tablet terminal via the network 92. The transmission server 91 may transmit the video content and the advertisement information to the respective display devices separately. Specifically, the transmission server 91 may transmit the video content to the set top box and transmit the advertisement information to the tablet terminal. The TV 2 may display the received video content while the tablet terminal may display the received advertisement information in association with the display of the video content on the TV 2 (in the case where the video content is displayed on the TV 2).

2. Second Embodiment 2-1. Configuration of Information Processing System

Hereinafter, an example of information processing system according to a second embodiment will be described. In the second embodiment, it is assumed that the video content to be reproduced by the TV 2 is, for example, a video content provided by TV broadcasting, a video content stored on the storage medium of the TV 2, or the like, which is not provided from the transmission server 91. In the second embodiment, a sound of the video content reproduced by the TV 2 is sensed by the terminal device 7, and sound information on the sensed sound is transmitted to the server. The server specifies the video content reproduced by the TV 2 based on the received sound information, and transmits presentation information corresponding to the video content to the terminal side. A terminal device 7 displays the presentation information transmitted from the server. In this manner, in the second embodiment, the video content reproduced by the TV 2 and also information suitable to the video content can be provided to the user.

In the second embodiment, the presentation information is the advertisement information described in the first embodiment. Note that the presentation information is not limited to the advertisement information and may be any type of information. For example, the presentation information may be the above-described related information relating to the video content. The presentation information can be considered to be additional information to the video content. Therefore, the presentation information may include information which is different from the information included in the video content itself. Typically, the presentation information is information which is different from identification information of the video content (information on a title or the like of the video content). The presentation information is displayable on a display device, and may be a moving image, a still image, or a web page. The presentation information may include sound information.

Figure 18:
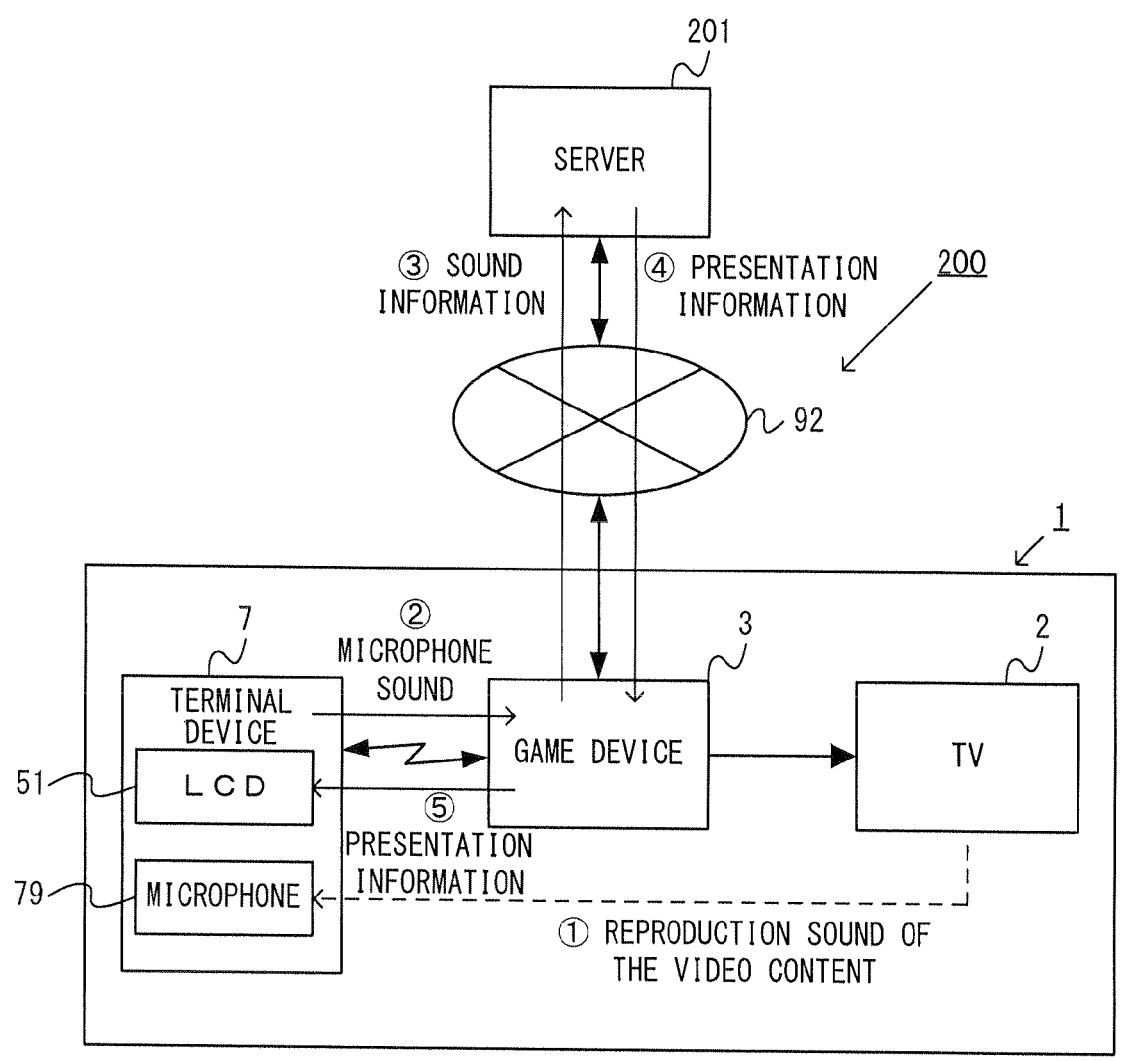
FIG. 18 is a block diagram showing an example non-limiting information processing system in a second embodiment.

FIG. 18 is a block diagram showing an example of information processing system according to the second embodiment. As shown in FIG. 18, an information processing system 200 in the second embodiment includes a server 201 and the game system 1. The server 201 and the game system 1 are mutually communicable via the network 92. In the second embodiment, identical elements as those of the first embodiment bear identical reference numerals thereto, and detailed descriptions thereof will be omitted.

In the second embodiment, the game system, which is an example of terminal-side system (terminal system), has substantially the same configuration as that in the first embodiment. However, processes executed by the game system 1 are different from those in the first embodiment (described later in detail). In other embodiments, the terminal system may include one device. For example, the terminal system may be configured as a smart phone, a mobile phone, a tablet terminal, a mobile game device or the like.

Figure 19:
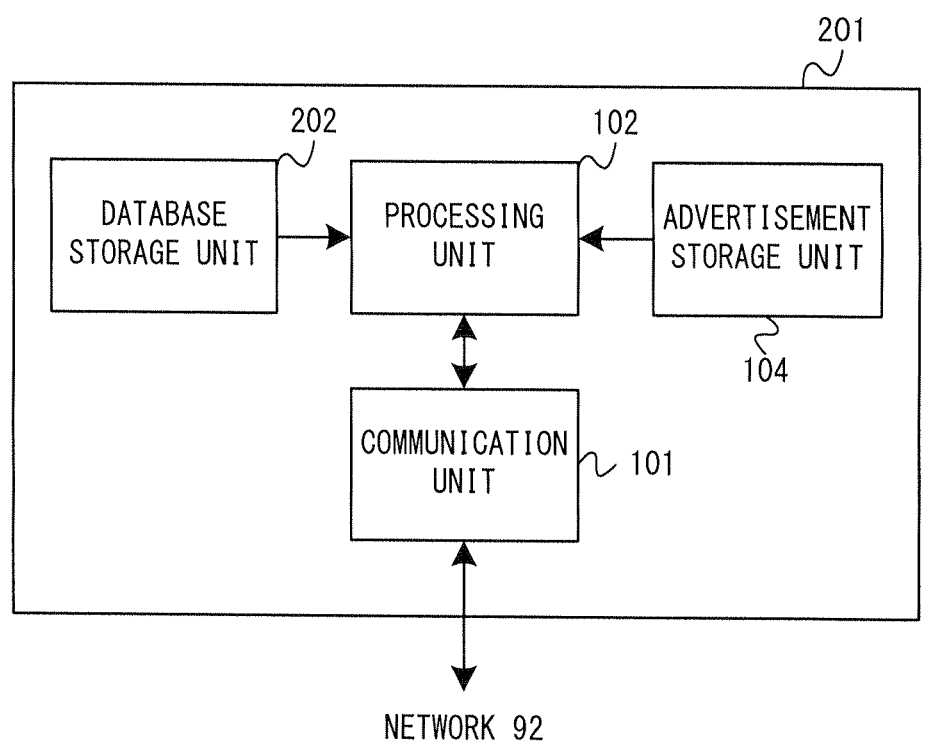
FIG. 19 is a block diagram showing a configuration of an example non-limiting server.

The server 201, which is an example of server-side system (server system), specifies the video content which is being reproduced on the side of the game system 1 based on information from the game system 1, and transmits the presentation information. FIG. 19 is a block diagram showing an example of configuration of the server 201. As shown in FIG. 19, the server 201 includes the communication unit 101, the processing unit 102, and the advertisement storage unit 104 which are substantially the same as those in the first embodiment. As described later in detail, processes executed by the processing section 102 in the second embodiment are different from those in the first embodiment.

The server 201 also includes a database storage unit 202. The database storage unit 202 stores video database usable for specifying the video content to be reproduced on the terminal side. The video database includes, for example, data associating the above-described sound information with the identification information of the video content including a sound corresponding to the sound information. The identification information may be, for example, a title of the video content (title of a TV program, title of a film, etc.).

The database storage unit 202 stores a presentation information database usable for specifying the presentation information to be transmitted to the terminal side. The presentation information database includes, for example, data associating the identification information of the video content with one or more pieces of presentation information to be presented together with the video content. In the second embodiment, the presentation information database includes information which represents the timing to present the presentation information, for each piece of presentation information. As described later in detail, such a database may be prepared in advance, or a specific content of the database may be added or updated sequentially (in real time).

The server 201 may have any configuration which is communicable with an external device (game system 1, etc.) via the network 92 and has a function of transmitting presentation information in response to a request from the external device. The server 201 (server system) may include one or more information processing devices. For example, the advertisement storage unit 104 and the database storage unit 202 may be included in different servers. In this specification, in the case where the server system includes a plurality of server devices, the entirety of the server devices will be referred to as a "server".

2-2. Overview of Operation of Information Processing System

Figure 20:
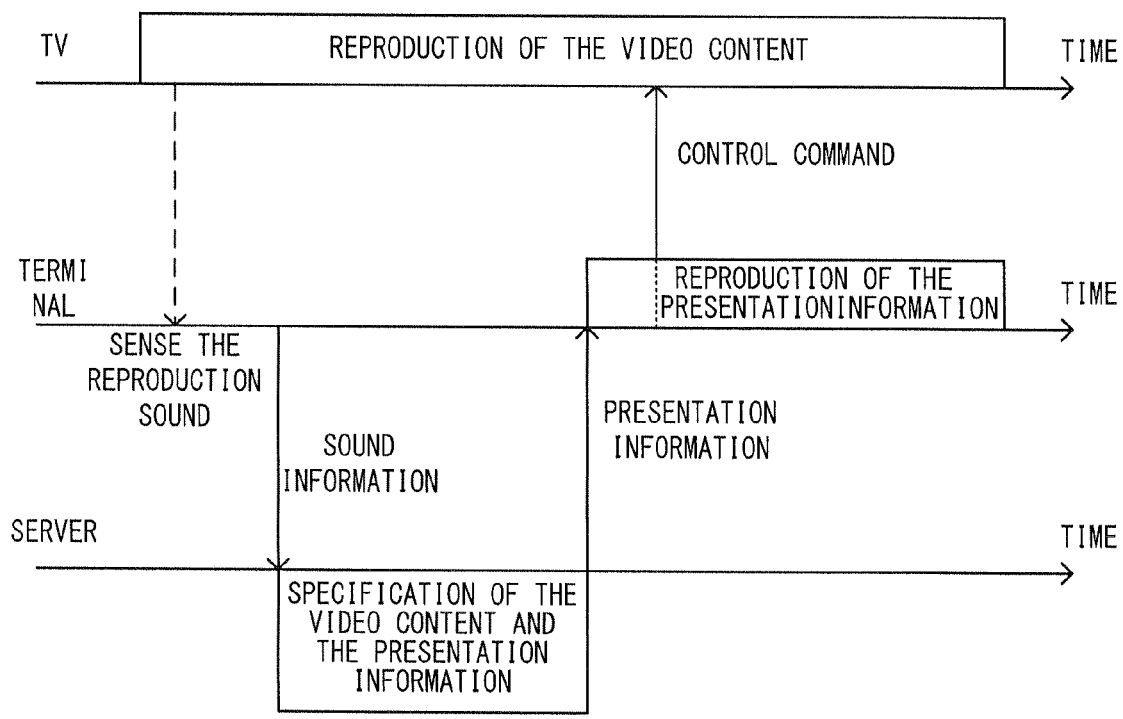
FIG. 20 shows an example of operation flow in the information processing system.

Now, with reference to FIG. 18, FIG. 20 and FIG. 21, an overview of an operation of the information processing system 200 will be described. FIG. 20 shows an example of operation flow of the information processing system 200.

(Overall Process Flow of Information Processing System)

As shown in FIG. 20, in the second embodiment, the video content is reproduced by the TV 2. The video content may be any content, and may be, for example, a program of TV broadcasting, or a video content stored on a storage medium (hard disc, DVD, etc.) accessible to the TV 2. In the second embodiment, an example in which a TV program which is currently being broadcast is reproduced by the TV 2 will be described. In the second embodiment, the video content does not need to be provided from the server, and therefore the terminal system may not include the TV 2 or may not be connected to (communicable with) the TV 2.

As shown in FIG. 18 and FIG. 20, in the case where the video content is reproduced by the TV 2, the terminal device 7 senses a reproduction sound of the video content by the microphone 79. The terminal device 7 transmits the sound (microphone sound) sensed by the microphone 79 to the game device 3. The game device 3 generates sound information based on the microphone sound. The sound information is information representing the microphone sound or a feature of the microphone sound. The sound information is, for example, information on an acoustic fingerprint. The sound information may be a sound signal itself of the microphone sound. The terminal system (game system 1) transmits the generated sound information to the server 201.

As shown in FIG. 20, based on the received sound information, the server 201 specifies the video content which is being reproduced in the vicinity of the terminal device 7. The specification of the video content is performed by use of the video database described above. In the second embodiment, the server 201 specifies a TV program which is currently being reproduced by the TV 2.

After specifying the video content which is being reproduced on the terminal side, the server 201 specifies the presentation information to be presented together with the specified video content. The specification of the presentation information is performed by use of the video database described above. In the second embodiment, the server 201 specifies the advertisement information to be presented together with the video content. The server 201 transmits the specified presentation information (advertisement information) to the terminal system.

The terminal system displays the presentation information transmitted from the server 201 on the display unit (LCD 51). Specifically, as shown in FIG. 18, the game device 3 receives the presentation information transmitted from the server 201 and transmits the received presentation information to the terminal device 7. The terminal device 7 displays the received presentation information on the LCD 51. As described above, in the second embodiment, the video content is reproduced by the TV 2, and also the presentation information is displayed on the terminal device 7. Owing to this, information useful for the user can be presented, and also other information can be presented to the user effectively together with the video content.

(Determination on Presentation Timing)

In the second embodiment, the information processing system 200 may determine the timing to present the presentation information. When specifying the video content based on the sound information, the server 201 can specify (or estimate) the timing when a desired specific content is to be reproduced if a specific content of the specified video content (TV program) is known to the server 201. In this case, the server 201 can present the presentation information on the terminal side at the timing when the desired content is reproduced. For example, in a time zone in which a product is introduced in a TV program, the information processing system 200 can present the advertisement information of the product on the terminal device 7. For example, in a time zone in which a country is introduced in a TV program, the information processing system 200 can present the advertisement information on travelling in the country.

Figure 21:
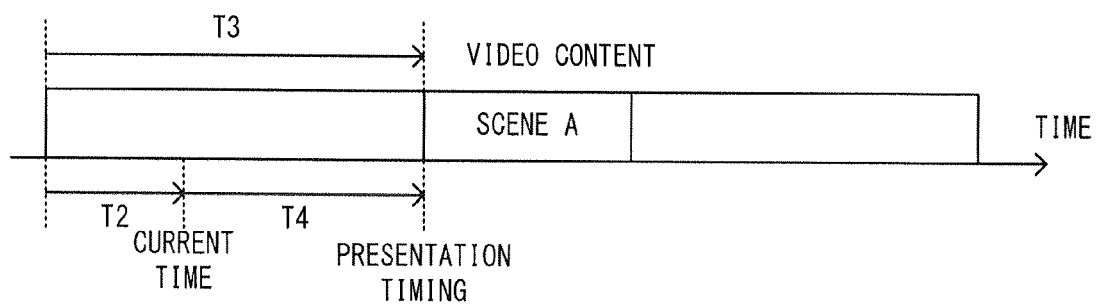
FIG. 21 shows an example of presentation timing of presentation information.

FIG. 21 shows an example of presentation timing of presentation information. In the second embodiment, the presentation timing is determined based on the video content specified by the server 201. Specifically, the server 201 first specifies the current position of the specified video content on a time axis based on the sound information (see FIG. 21). The "current position" is the position of the time point (or time zone) when the sound sensed by the microphone 79 on the terminal side is reproduced. Next, the server 201 determines the timing to present the presentation information based on the current time and a time table of the specified video content. The time table is, for example, information associating some scenes included in the video content with the time elapsed from the start of the video content. For example, a case where presentation information is displayed at the timing when a scene A in the video content is reproduced will be discussed. In this case, where the time elapsed from the start of the video content until the current time is time T2 and the time elapsed from the start of the video content until the start of the scene A is T3, the server 201 determines the timing after an elapse of time T4 (=T3−T2) from the current time as the presentation timing. The time T2 can be specified as the position of the current time based on the sound information. The time T3 can be specified based on the time table. In this manner, the server 201 can determine the presentation timing.

The terminal system displays the presentation information on the display unit at the presentation timing determined as described above. Owing to this, the presentation information can be presented at an appropriate timing, and therefore can be presented to the user effectively. The control on reproducing the presentation information at the presentation timing may be performed on the server side or on the terminal side. Specifically, in the case where the control is performed on the server side, the server 201 may control a transmission timing of the presentation information such that the presentation information is displayed on the display unit at the presentation timing. In this case, the server 201 may determine the transmission timing in consideration of a delay caused by communication or the like. In the case where the control is performed on the terminal side, the server 201 transmits the presentation information and information representing the presentation timing to the terminal system. This information may be, for example, information which instructs to control the reproduction described in the first embodiment. The terminal system controls the timing to present the presentation information based on the information representing the presentation timing.

(Control on TV)

As described above in the first embodiment, the terminal system can control the operation of the TV 2. Specifically, the terminal system can control a predetermined display device (TV 2) which can reproduce a video content, regarding the reproduction and/or the display of the video content. Owing to this, the terminal system can change an operation of the predetermined display device (e.g., change of the receiving channel, stop, fast-forwarding or the like of the reproduction). Thus, the video content and the presentation information can be presented to the user effectively. For example, the terminal system can change the reproduction of the video content in accordance with the reproduction of the presentation information. Therefore, it is possible to attract attention of the user to the terminal device 7 on which the presentation information is displayed by, for example, decreasing the reproduction sound volume of the video content. In the second embodiment, the method for controlling the operation of the TV 2 is substantially the same as that in the first embodiment.

As described above in the first embodiment, the terminal device 7 has a function of controlling the operation of the TV 2. Therefore, the user can change the operation of the TV 2 by use of the terminal device 7, and thus can improve the ease of operation on the video content. The user views the terminal device 7 when performing an operation on the video content. Therefore, at this point, it is possible to direct the user's attention to also the presentation information displayed on the terminal device 7. Accordingly, in the case where the presentation information is advertisement information, the advertizing effect of the advertisement information can be improved.

In the second embodiment, a control command for controlling the TV 2 may be transmitted from the server 201. Specifically, the server 201 specifies the control command on the reproduction and/or the display of the video content based on the specified video content, and transmits the control command to the terminal system. The terminal system controls the TV 2 based on the control command received from the server 201. Owing to this, the operation of the TV 2 can be controlled on the server side. For example, the server 201 can control the operation of the TV 2 such that the video content and the presentation information are presented to the user effectively. For example, the following operation is made possible by transmission of the control command.

Figure 22:
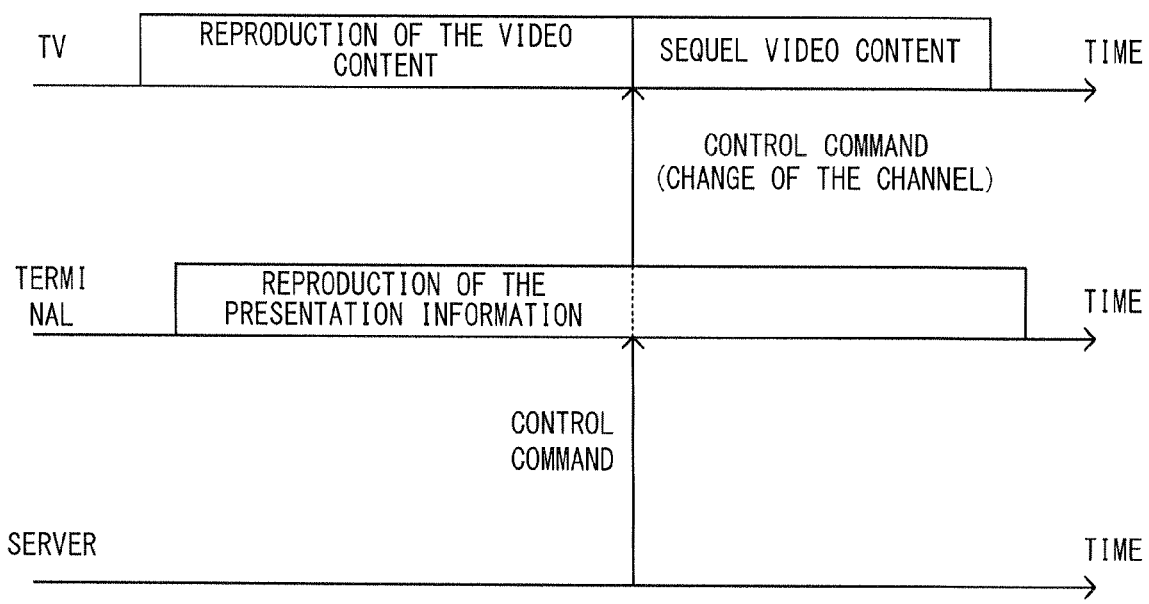
FIG. 22 shows an example of operation flow of the information processing system in the case where a control command is transmitted from the server side.

FIG. 22 shows an example of operation flow of the information processing system in the case where a control command is transmitted from the server side. In the example shown in FIG. 22, it is assumed that the video content reproduced by the TV 2 is a TV program. It is also assumed that after the broadcast of the TV program is finished at a certain broadcast station (channel), a sequel video content to the TV program is broadcast at another broadcast station in a continuous manner. In this case, when the program is finished at the certain broadcast station, the server 201 generates a control command to change the channel (selected station) to the another broadcast station, and transmits the control command to the terminal side. In the example of FIG. 22, this control command is transmitted when the program is finished. Alternatively, the control command may be transmitted before the program is finished. Upon receiving the control command, the game device 3 transmits the control command to the terminal device 7. The terminal device 7 outputs the control command (e.g., an infrared or wireless signal corresponding to the control command) to the TV 2. Owing to this, the channel of the TV 2 is changed to the different broadcast station which broadcasts the sequel video content with no operation performed by the user. The control command is not limited to a command to change the channel which is issued when the video content is finished, and may be any command regarding the reproduction and/or the display of the video content.

2-3. Operation of Information Processing System

Figure 23:
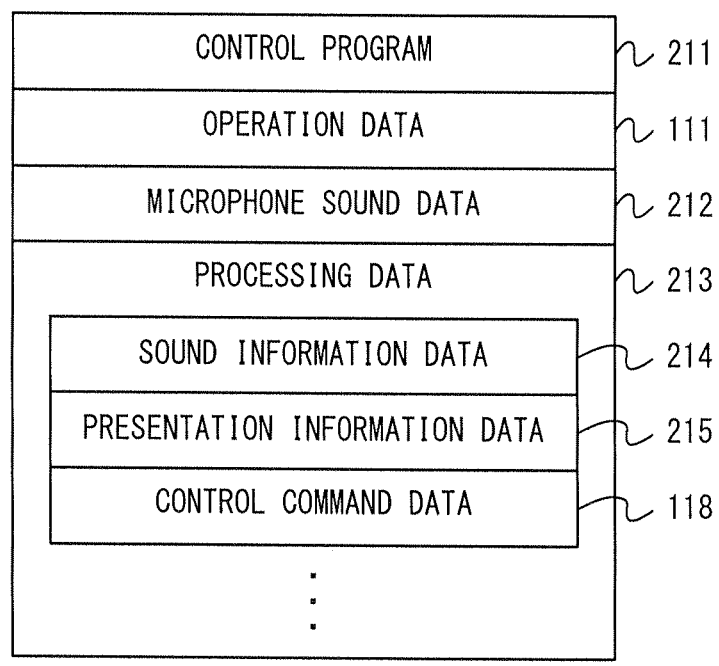
FIG. 23 shows an example of data stored on a storage unit of the game device.

Now, an operation of the information processing system 200 will be described in detail. First, various types of data usable for the operation of the information processing system 200 will be described. FIG. 23 shows an example of data stored on a storage unit of the game device 3 (including the external main memory 12, the internal main memory 11e, and the flash memory 17). As shown in FIG. 23, a control program 211, the operation data 111, microphone sound data 212, and processing data 213 are stored on the storage unit of the game device 3. In addition to the data shown in FIG. 23, various types of data usable for a process executed by the game device 3 (image data, sound data and the like) are stored on the storage unit. The data shown in FIG. 23 may be stored on any other storage device accessible to the game device 3, as well as on the storage unit in the game device 3.

The control program 211 is a program for causing the CPU 10 to execute a process in the game device 3 (game system 1). In the second embodiment, the CPU 10 executes the control program 211, and thus processes of steps shown in a flowchart shown in FIG. 24 (information presentation process) are executed. The control program 211 is partially or entirely read from the flash memory 17 at an appropriate timing after the game device 3 is powered on, and thus is stored on the storage unit. The control program 211 may be acquired from the optical disc 4 or another device external to the game device 3 (e.g., via the Internet), instead of from the flash memory 17.

The operation data 111 is substantially the same as that in the first embodiment. The microphone data 212 is data representing a sound sensed by the microphone 79 (microphone sound). The microphone sound is transmitted from the terminal device 7, acquired by the game device 3, and stored on the storage unit as the microphone data 212.

The processing data 213 is data usable in the information presentation process (FIG. 24) described later. The processing data 213 includes sound information data 214, presentation information data 215, and the control command data 118 substantially the same as that in the first embodiment.

The sound information data 214 is data representing the sound information described above. In the second embodiment, the sound information data 214 represents the acoustic fingerprint of the microphone sound. The presentation information data 215 is data representing the presentation information described above. The data on the presentation information transmitted from the server 201 is stored on the storage unit as the presentation information data 215.

Figure 24:
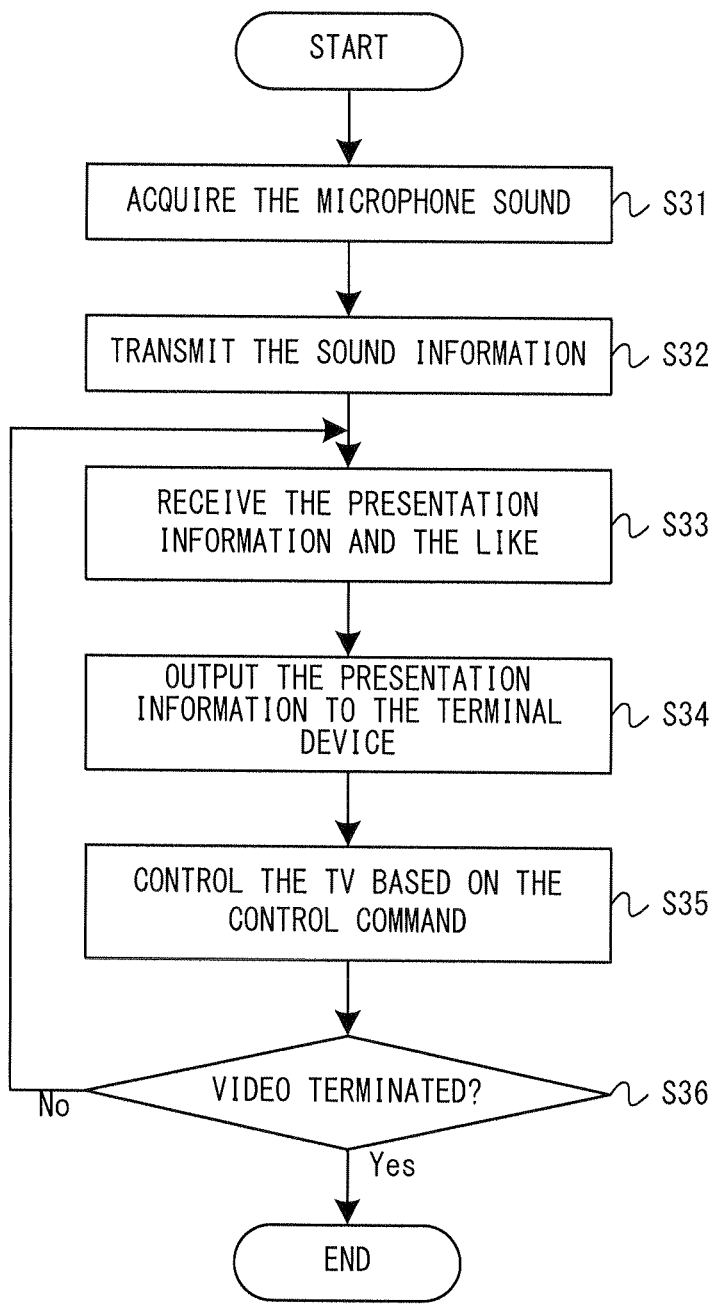
FIG. 24 is a flowchart showing an example of information presentation process flow executed by the game device in the second embodiment.

Now, with reference to FIG. 24 and FIG. 25, the information presentation process executed by the information processing system 200 in the second embodiment will be described in detail. FIG. 24 is a flowchart showing an example of information presentation process flow executed by the game device 3 in the second embodiment. In the second embodiment, the CPU 10 executes the control program 211 and thus the information presentation process shown in FIG. 24 is executed.

The conditions under which the terminal system starts executing the information presentation process are arbitrary. The execution of the information presentation process may be started when, for example, the terminal system is powered on. Alternatively, the execution of the information presentation process may be started when the control program 211 is instructed to be started by a selection operation performed on a menu screen displayed on the terminal device 7 and/or the TV 2. Still alternatively, the execution of the information presentation process may be started, for example, in the case where the user is estimated to be viewing the TV 2. Specifically, for example, the information presentation process may be executed in response to the terminal system acquiring an electronic program guide from the server by the method described in the first embodiment. Alternatively, the information presentation process may be executed in response to an operation for controlling the TV 2 performed by use of the terminal device 7.

At the start of the information presentation process shown in FIG. 24, first, in step S31, the CPU 10 acquires the microphone sound. Specifically, the terminal device 7 senses a sound in the vicinity thereof by the microphone 79, and transmits data on the sensed sound (microphone sound) to the game device 3. The data on the microphone sound is transmitted repeatedly, for example, at an interval of predetermined time duration, and the game device 3 acquires the data on the microphone sound repeatedly. The game device 3 stores the acquired data on the storage unit as the microphone sound data 212. After step S31, the process of step S32 is executed.

In step S32, the CPU 10 generates sound information based on the microphone sound, and transmits the sound information to the server 201. The sound information is generated based on the microphone sound. In the second embodiment, the CPU 10 generates sound information (acoustic fingerprint) from the microphone sound data 212 read from the storage unit. Data on the generated sound information is stored on the storage unit as the sound information data 214. The sound information data 214 stored on the storage unit is transmitted to the server 201. A specific operation of transmitting the data to the server 201 is substantially the same as that in the first embodiment. After step S32, the process of step S33 described later is executed.

When the sound information is transmitted to the server 201 in this manner, the server 201 transmits the presentation information to the terminal system. Hereinafter, with reference to FIG. 25, the process executed by the server 201 will be described.

Figure 25:
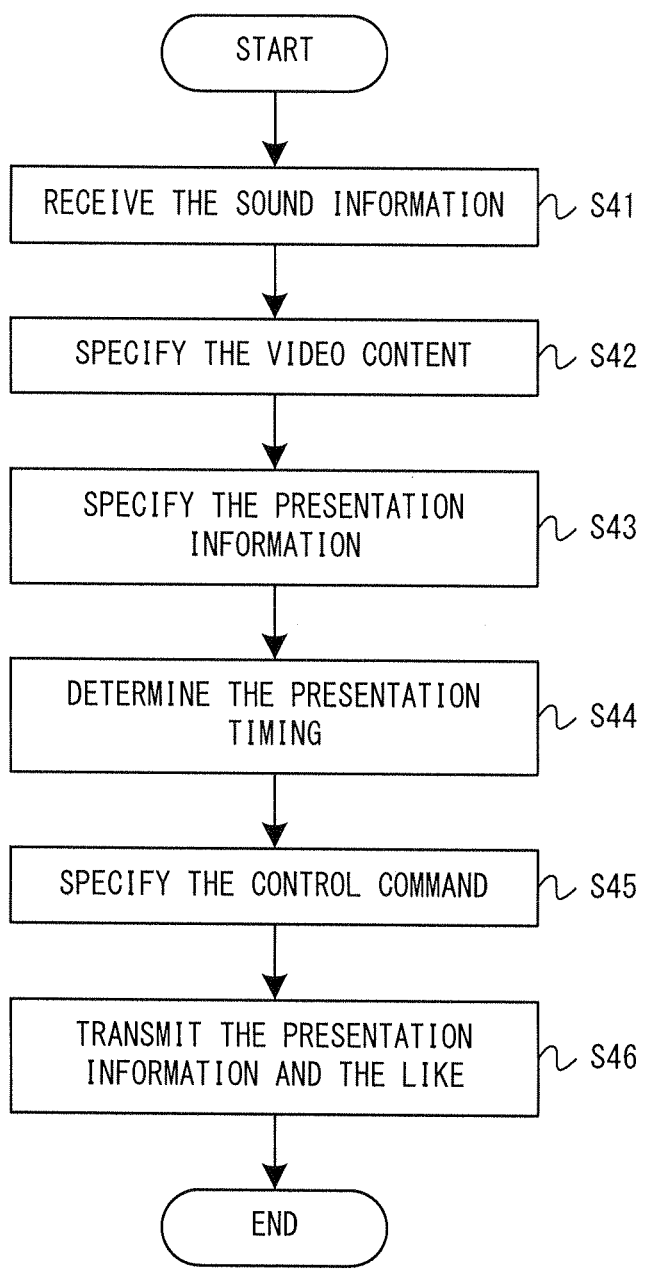
FIG. 25 is a flowchart showing an example of presentation information transmission process flow executed by the server in the second embodiment.

FIG. 25 is a flowchart showing an example of presentation information transmission process flow executed by the server 201 in the second embodiment. The presentation information transmission process is executed by the processing unit 102 of the server 201 executing a predetermined control program. The process shown in FIG. 25 is started, for example, in response to an access made by the terminal system (game system 1). When a plurality of terminal systems access the server 201, the processing unit 102 may execute the presentation information transmission process in parallel for the plurality of terminal systems.

At the start of the presentation information transmission process shown in FIG. 25, first, in step S41, the processing unit 102 receives the sound information. Next in step S42, the processing unit 102 specifies the video content based on the received sound information. The processing unit 102 reads the video database described above from the database storage unit 202, and refers to the video database to specify the video content associated with the received sound information. More specifically, when the received sound information matches a part of sound information included in the video database, the processing unit 102 specifies the video content associated with this specific sound information in the video database. After step S42, the process of step S43 is executed.

The video database may be generated or updated in real time. For example, a program of TV broadcasting is received by the server 201 and the sound in the program is analyzed to generate sound information (acoustic fingerprint), so that the database can be dynamically updated.

In step S43, the processing unit 102 specifies the presentation information based on the specified video content. The processing unit 102 reads the presentation information database described above from the database storage unit 202, and specifies the presentation information associated with the specified video content in the presentation information database. In the case where there are a plurality of pieces of presentation information to be specified, the processing unit 102 may set an order of presenting the presentation information. The order of presentation may be set randomly or set in advance in the presentation information database. After step S43, the process of step S44 is executed.

In step S44, the processing unit 102 determines the presentation timing based on the specified presentation information. The determination of the presentation timing is performed by, for example, the method described above in the "(Determination on presentation timing)" section. The server 201 does not need to determine the presentation timing. In this case, the process of step S44 does not need to be executed. After step S44, the process of step S45 is executed.

In step S45, the processing unit 102 generates a control command. The control command is generated based on the specified video content. For example, a database which associates video contents with control commands may be prepared, so that the control command is generated by referring to the database. The server 201 does not need to transmit the control command. In this case, the process of step S45 does not need to be executed. After step S45, the process of step S46 is executed.

In step S46, the processing unit 102 transmits the presentation information and the like to the terminal system. In the second embodiment, the presentation information and the control command are transmitted. Specifically, the processing unit 102 reads the presentation information (advertisement information) specified in step S43 from the advertisement storage unit 104, and transmits the presentation information to the terminal system. The reproduction control instruction described in the first embodiment may be transmitted together with the presentation information. In the second embodiment, the processing unit 102 transmits the presentation information at the transmission timing based on the presentation timing determined in step S44. In the case where the presentation timing is not determined, the specified presentation information may be transmitted sequentially. The presentation information may be transmitted by any method. In the second embodiment, the server 201 performs streaming transmission like in the first embodiment.

The processing unit transmits the control command generated in step S45 to the terminal system. The control command may be transmitted together with the presentation information or may be transmitted at a different timing from the presentation timing.

The transmission of the presentation information and the like in step S46 is continued until the transmission of the entirety of the presentation information and the like is terminated. When the transmission is completed, the processing unit 102 terminates the presentation information transmission process shown in FIG. 25.

Returning to FIG. 24, in step S33, the game device 3 receives the presentation information and the like. The received presentation information is stored on the storage unit as the presentation information data 215. In the case where the control command is received, the control command data 118 is stored on the storage unit. The process of receiving the presentation information (advertisement information) from the server 201 and storing the presentation information on the storage unit is substantially the same as that in the first embodiment. After step S33, the process of step S34 is executed.

In step S34, the CPU 10 performs reproduction control on the presentation information (advertisement information). The process of step S34 is performed in substantially the same manner as that in, for example, the process of step S28 in the first embodiment (the process may also include the process of step S29). As a result of the process of step S34, an image of the presentation information is displayed on the display unit of the terminal device 7. After step S34, the process of step S35 is executed.

In step S35, the CPU 10 controls the TV 2 based on the control command. Specifically, the CPU 10 determines whether or not there is a control command to be executed at the current time, in the control command data 118 stored on the storage unit. For example, in the case where, at a timing corresponding to the timing when a control command is to be executed, the control command is transmitted from the server 201, the CPU 10 determines that the control command is to be executed at the timing when the control command is received. In the case where the information representing the timing when a control command is to be executed is transmitted from the serve 201 together with the control command, the CPU 10 makes a determination based on the information. When it is determined in step S35 that there is a control command to be executed at the current time, the CPU 10 controls the operation of the TV 2 based on the control command. A specific method of controlling the TV 2 is substantially the same as that in the first embodiment. When there is no control command to be executed at the current time, the CPU 10 terminates the process of step S35. After step S35, the process of step S36 is executed.

In step S36, the CPU 10 determines whether or not the reproduction of the video content by the TV 2 has been terminated or not. The determination in step S36 may be performed in any manner. For example, the CPU 10 may make the determination by receiving the termination time of the video content from the server 201 in advance. Alternatively, for example, in the case where the server 201 performs streaming transmission of the presentation information until the reproduction of the video content is terminated, the CPU 10 may determine that the reproduction of the video content has been terminated when the presentation information is not received from the server 201 for a predetermined time duration. When the determination result of step S36 is negative, the process of step S33 is executed again. After this, while the reproduction of the video content by the TV 2 is continued (as long as the determination result of step S36 is negative), the CPU 10 executes the series of processes of steps S33 through S36 in repetition. By contrast, when the determination result of step S36 is positive, the CPU 10 terminates the information presentation process shown in FIG. 24.

In other embodiments, the processes of steps S31 and S32 described above may be executed in repetition until the reproduction of the video content is terminated like the processes of steps S33 through S35. Namely, the terminal system may execute the acquisition of the microphone sound and the transmission of the sound information in repetition. When receiving the sound information from the terminal system again, the server 201 executes the process of specifying the video content again (step S42). When the specified video content is changed, the server 201 specifies the presentation information again (step S43), and transmits the presentation information again (step S46). Owing to this, even in the case where the video content reproduced by the TV 2 is changed in the middle (e.g., in the case where the channel is changed), presentation information suitable to the post-change video content can be provided to the user.

As described above, in the second embodiment, the presentation information (advertisement information) transmitted from the server 201 is displayed on the terminal device 7 while the video content reproduced by the TV 2 is being viewed. Owing to this, information useful for the user can be presented, and also the information can be presented to the user effectively as being added to the video content.

2-4. Modifications of the Second Embodiment (Modification in which a Video Content is Transmitted from the Server)

In the second embodiment described above, the video content reproduced by the TV 2 is not provided from the server 201. In a modification of the second embodiment, a video content provided from the server 201 may be reproduced by the TV 2. Specifically, based on the video content specified as the video content which is being reproduced by the TV 2, the server 201 may specify a sequel video content and transmit the sequel video content to the terminal system. The "sequel video content (to the specified video content)" is, for example, as follows: in the case where the specified video content is one episode of a drama series, the sequel video content (to the specified video content) is the next episode; or in the case where the specified video content is a film, the sequel video content (to the specified video content) is a sequel to the film.

Figure 26:
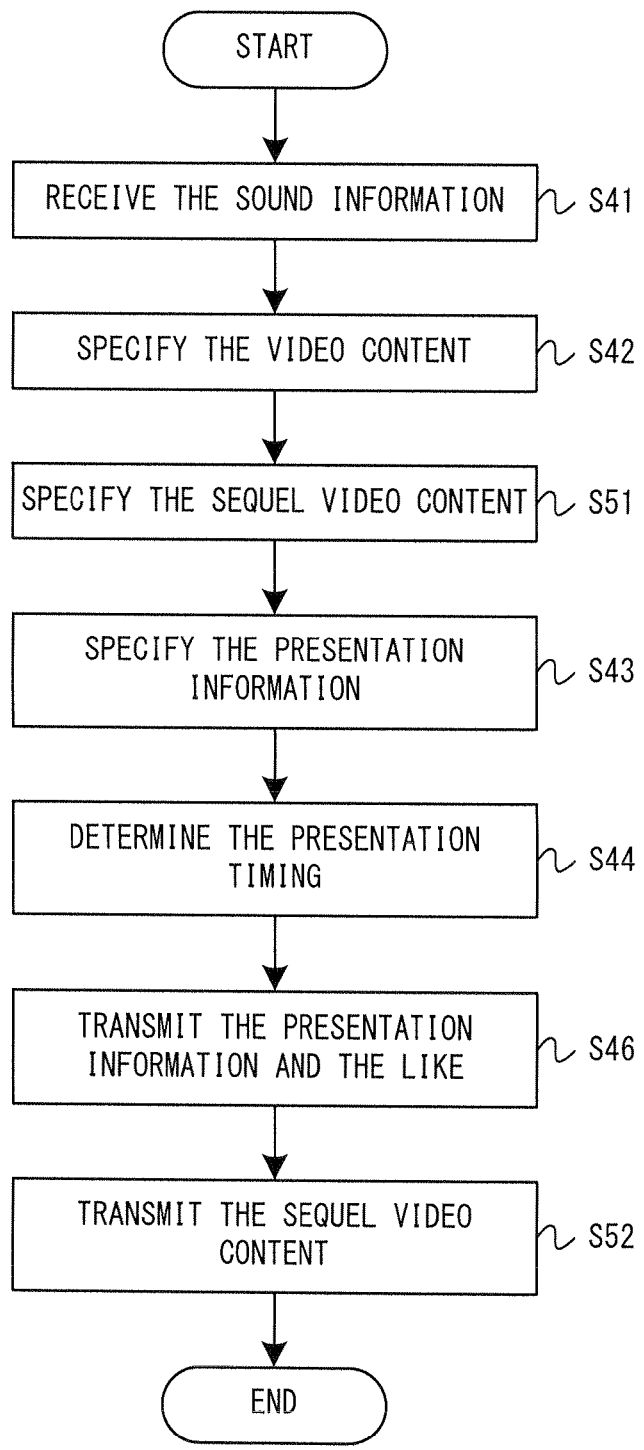
FIG. 26 is a flowchart showing an example of presentation information transmission process flow executed by the server in a modification of the second embodiment.

FIG. 26 is a flowchart showing an example of presentation information transmission process flow executed by the server 201 in the modification of the second embodiment. In FIG. 26, substantially the same steps as those in FIG. 25 bear the same step numbers thereto, and detailed descriptions thereof will be omitted.

As shown in FIG. 26, in this modification, after step S42, the process of step S51 is executed. In step S51, the processing unit 102 specifies the sequel video content based on the specified video content. For example, the server 201 prepares a video database which associates video contents with sequel video contents to such video contents. The processing unit 102 may specify the sequel video content by referring to the video database. After the process of step S51 is terminated, the process of step S43 described above is executed.

In this modification, after step S46, the process of step S52 is executed. In step S52, the processing unit 102 transmits the sequel video content to the terminal system. A specific process of transmission in step S52 may be substantially the same as that in step S15 or S43 described above. After the process of step S52 is terminated, the processing unit 102 terminates the presentation information transmission process.

Figure 27:
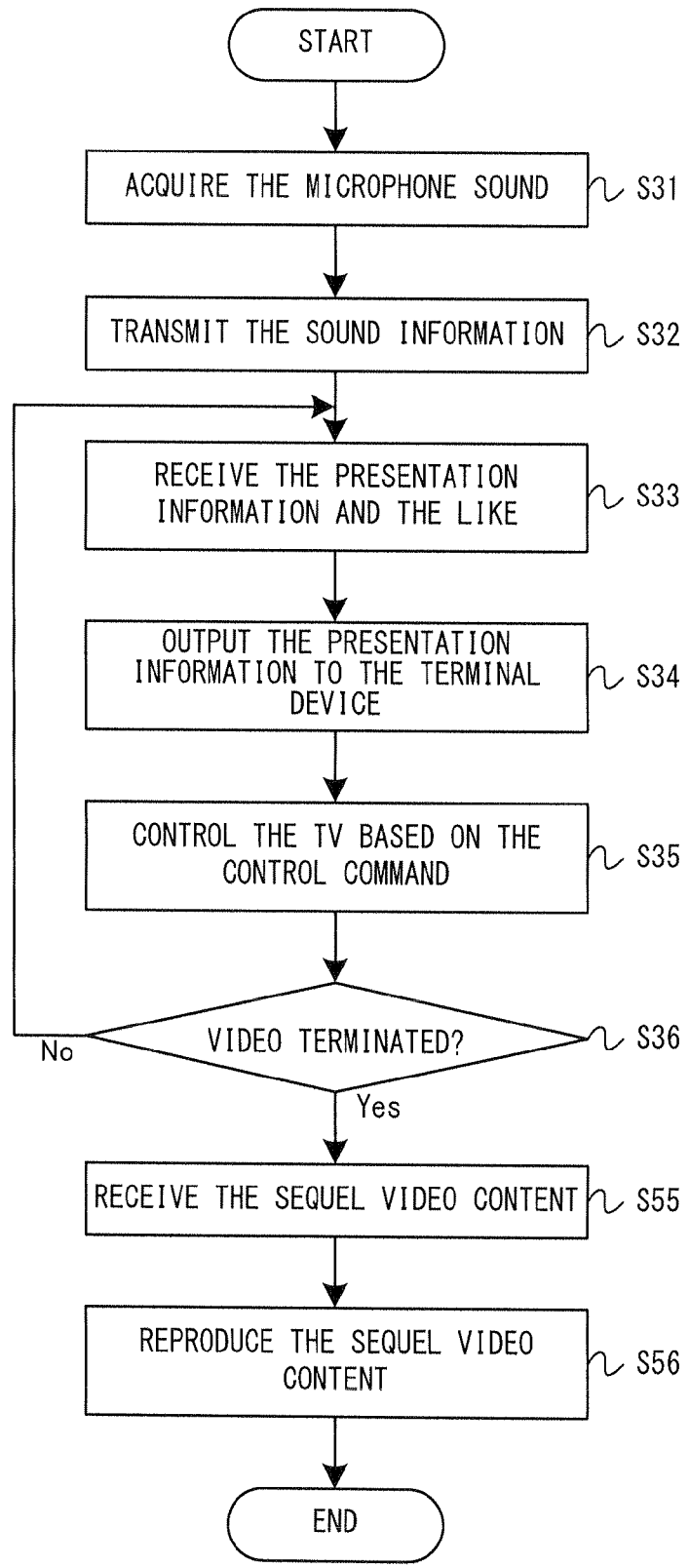
FIG. 27 is a flowchart showing an example of information presentation process flow executed by the game device in a modification of the second embodiment.

FIG. 27 is a flowchart showing an example of information presentation process flow executed by the game device 3 in the modification of the second embodiment. In FIG. 27, substantially the same steps as those in FIG. 24 bear the same step numbers thereto, and detailed descriptions thereof will be omitted.

In this modification, when the determination result of step S36 described above is positive, the process of step S55 is executed. In step S55, the CPU 10 receives the sequel video content from the server 201. A specific process of receiving in step S55 may be substantially the same as that in step S22 or S33 described above. In FIG. 27, the process of step S55 is executed after the reproduction of the first video content is terminated (after the process of step S36). Alternatively, the process of step S55 may be executed during the reproduction of the first video content (during the execution of the processing loop of steps S33 through S35). After step S55, the process of step S56 is executed.

In step S56, the CPU 10 reproduces the sequel video content by, for example, substantially the same method as that in step S6 and/or S7. The sequel video content may be reproduced by the TV 2, by the terminal device 7, or both thereof. In the case where the sequel video content is reproduced by the TV 2, the presentation information may be reproduced by the terminal device 7.

According to this modification, after the reproduction of the video content by the TV 2 is terminated, the information processing system can provide the sequel video content to such a video content to the user. Owing to this, information useful for the user can be presented.

(Modification in which Statistics Information of the Video Content is Generate)

In another modification of the second embodiment, the server 201 may generated statistics information on the specified video content. The statistics information is obtained from a history of video contents specified in a predetermined time duration in the past. A specific example of the statistics information may be information representing the viewing frequency classified by genre of the video contents, information representing the viewing frequency classified by broadcast station, or the like.

Figure 28:
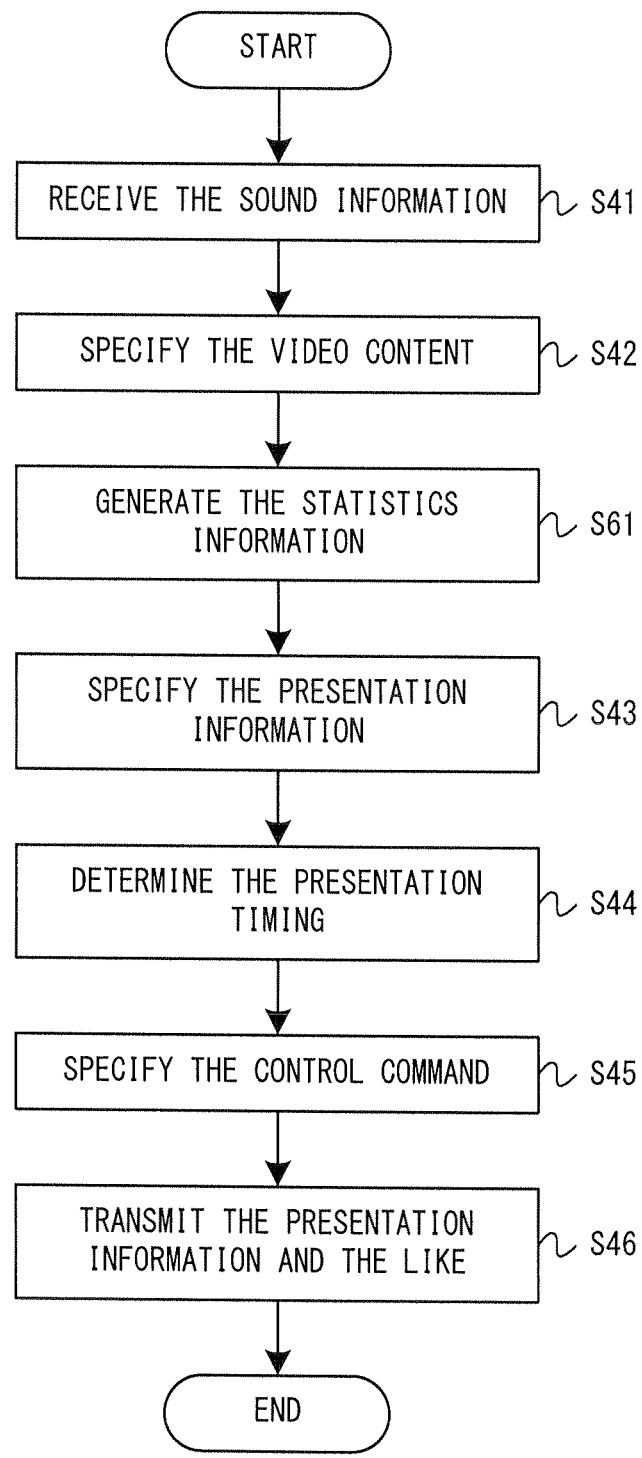
FIG. 28 is a flowchart showing an example of presentation information transmission process flow executed by the server in a modification of the second embodiment.

FIG. 28 is a flowchart showing an example of presentation information transmission process flow executed by the server 201 in the another modification of the second embodiment. In FIG. 28, substantially the same steps as those in FIG. 25 bear the same step numbers thereto, and detailed descriptions thereof will be omitted.

As shown in FIG. 28, in this modification, after step S42, the process of step S61 is executed. In step S61, the processing unit 102 generates statistics information based on the history of the specified video content. In this modification, in step S42, the processing unit 102 stores the information on the specified video content as a history. Based on the history, the statistics information is generated. After step S61, the process of step S43 is executed.

In this modification, in step S46, the processing unit 102 may transmit the statistics information as being included in the presentation information to the terminal system. In this case, the statistics information can be presented to the user. In step S43, the processing unit 102 may specify the presentation information based on the statistics information. In this case, the presentation information can be specified with the viewing history of the video content in the past being reflected, and presentation information suitable to the user can be specified.

(Modification in which a Sound Other than the Sound in the Video Content is Sensed)

In the second embodiment described above, the server 201 executes the process of specifying the video content for the purpose of sensing the sound of the video content reproduced in the vicinity of the terminal system (terminal device 7). In other embodiments, the terminal system may execute the process for the purpose of sensing a sound other than the sound in the video content. For example, the terminal system may sense a voice of conversation of the user and transmit the sound information to the server 201. In this case, the server 201 may specify a specific content of the conversation from the sound information. For example, the server 201 may recognize some words during the conversation. Then, the server 201 may specify the presentation information corresponding to the specified content and transmit such presentation information to the terminal system. Owing to this, useful information corresponding to the conversion of the user can be presented to the user as well as the information added to the video content.

(Modification in which a Video Content is Specified)

In the second embodiment described above, the server 201 specifies the video content which is being reproduced by a predetermined display device (TV 2) on the terminal side, by use of the sound information of the microphone sound. In other embodiments, the video content may be specified by another method. For example, the terminal system may transmit operation information representing an operation performed on a predetermined display device (TV 2) by use of the terminal device 7 to the server 201. In this case, the server 201 may specify the video content based on the operation information. Specifically, in the case where an operation of changing the channel of the TV 2 is performed by use of the terminal device 7, the terminal system transmits the operation information representing the channel change operation to the server 201. The server 201 specifies the TV program of the post-change channel from the channel change operation, and transmits the presentation information corresponding to the specified TV program to the terminal system. Owing to this also, like in the second embodiment, presentation information suitable to the video content can be provided to the user.

(Modification Regarding the Configuration of the Terminal System)

In the second information, the server performs the process of specifying the video content from the sound information. In other embodiments, the above-described process may be performed on the terminal side. For example, the terminal system may acquire (a part of) the video database from the server and specify the video content by use of the acquired video database. In this case, the process of specifying the presentation information may be performed on the server side or the terminal side. In the case where the process of specifying the presentation information is performed on the server side, the terminal system may transmit identification information of the video content to the server, and the server may specify the presentation information based on the identification information. In the case where the process of specifying the presentation information is performed on the terminal side, the terminal system may acquire (a part of) the presentation information database from the server and specify the presentation information by use of the acquired presentation information database.

In the first and second embodiments described above, a series of information processes (FIG. 12 or FIG. 24) to be executed by the terminal system (game system 1) is executed by the game device 3. A part of such information processes may be executed by another device. For example, in other embodiments, a part of the information processes (e.g., generation of the terminal image) or the entirety thereof may be executed by the terminal device 7. In the case where the entirety of the information processes is executed by the terminal device 7, the terminal device 7 may be communicable with the transmission server 91 while the game system 1 may not include the game device 3. In still other embodiments, in a system including a plurality of information processing devices communicable with each other via a network (wide area network and/or local network), the plurality of information processing devices may execute the information processes in a shared manner. For example, the information processes maybe executed by a cloud-type or distributed-type information processing system.

In the case where the plurality of information processing devices execute the information processes, the processes to be executed by the information processing devices are synchronized. Therefore, the information processes become complicated. By contrast, in the case where the information processes are executed by one game device 3 and the terminal device 7 executes the process of receiving and displaying the image (namely, in the case where the terminal device 7 acts as a thin client terminal) as in the first and second embodiments, there is no need to synchronize the information processes among the plurality of information processing devices and thus the information processes can be simplified. In the case where there is the game system 1 using the TV 2 and the terminal device 7, the game system 1 can be applied to view the video content and the advertisement by the first embodiment. Thus, the system can be provided easily.

In the second embodiment, like in the first embodiment, the terminal system may include a plurality of terminal devices 7. In the case where there are a plurality of terminal devices, the terminal devices may display different presentation information or the same presentation information. In the case where there are a plurality of terminal devices, diversified information can be provided to the user.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored on one or more on-board and/or removable memory devices. Multiple memory devices may be part of the same device or different devices, which are co-located or remotely located with respect to each other.

As described above, the above-described embodiments are usable for the purpose of, for example, presenting information useful for the user, and are usable as, for example, an information processing system or the like for providing information to be presented together with a video content, from the side of the server to the side of the terminal.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
a terminal system that includes a terminal device that has a handheld form factor; and
a server system,
wherein the terminal system includes:
a microphone provided in the terminal device configured to sense a sound in the vicinity thereof;
a transceiver configured to transmit sound information representing the sound sensed by the microphone or a feature of the sound to the server system;
a display device provided in the terminal device, the display device configured to display images; and
a controller provided in the terminal device, the controller configured to wirelessly communicate with a separate display device that reproduces video content, the communication to control how video content is displayed or what how sound included with the video content is output by the separate display device in response to reception of the wireless communication at the separate display device;
the server system includes at least one processor coupled to a memory, the server system configured to:
determine, based on the transmitted sound information, a video content which is being reproduced on the separate display device;
specify, in accordance with the determined video content, presentation information to be presented together with the determined video content;
transmit the presentation information to the terminal system;
specify, based on the determined video content, a control command regarding the reproduction and/or the display of the determined video content on the separate display device; and
transmit the control command to the terminal system,
the transceiver is further configured to receive the transmitted control command and the transmitted presentation information,
the controller is further configured to control at least one of display of an image included in the determined video content and output of a sound included in the determined video content on the separate display device based on the control command received from the server system,
the display device included in the terminal device is configured to display the presentation information received from the server system thereon.

2. The information processing system according to claim 1, advertisement information is specified on a product or a service which is regarding the video content and/or which appears in the video content.

3. The information processing system according to claim 1, wherein the server system is further configured to generate statistics information on the specified video content regarding the terminal system, and then transmit the statistics information to the terminal system.

4. The information processing system according to claim 1, wherein:
the server system is further configured to specify, based on the determined video content, a sequel video content to the video content, and then transmit the sequel video content to the terminal system; and
the terminal system is further configured to cause the display device of the terminal device and/or the separate display device separate from the terminal device to display the sequel video content.

5. The information processing system of claim 1, wherein the server system is further configured to:
based on the sound information, specify a time point of the sound sensed by the microphone on a time axis of the determined video content; and
determine a timing to present the presentation information based on the specified time point within the time axis of the determined video content and a time table of the determined video content, the timing being offset from the specified time point.

6. The information processing system of claim 1, wherein control command includes a command to change a channel of the separate display device.

7. The information processing system of claim 1, wherein the controller is further configured to control, based on the control command, a volume of the sound of the determined video content to decrease in temporal correspondence with display of the presentation information on the display device of the terminal device.

8. An information processing system comprising:
a terminal system that includes:
a terminal device that includes a microphone for sensing a sound in the vicinity thereof and a display unit, the terminal device having a handheld form factor;
a controller provided in the terminal device, the controller configured to wirelessly communicate with a separate display device that reproduces video content; and
an information processing device that includes at least one processor coupled to a memory and a transceiver, the information processing device configured to:
transmit, using a transceiver, sound information representing the sound sensed by the microphone or a feature of the sound; and
cause, via the controller, communication to be performed with the separate display device that reproduces video content, the communication to control how displayed video content, or sound associated with the displayed video content, is reproduced by the separate display device; and
a server system that includes at least one processor coupled to a memory, the server system configured to:
receive the sound information transmitted from the information processing device;
specify the sound in the vicinity of the terminal device based on the received sound information;
specify, in accordance with the specified sound, presentation information to be presented by the terminal device;
specify, based on the specified sound, a control command that controls how displayed video content, or sound associated with the displayed video content, is reproduced by the separate display device;
transmit the control command to the terminal system; and
transmit the presentation information to the information processing device, wherein the information processing device is further configured to:
receive the presentation information transmitted from the server system;
receive the transmitted control command;

cause, via the controller, communication to be performed to control how displayed video content, or sound associated with the displayed video content, is reproduced by the separate display device based on the control command received from the server system; and cause the display unit of the terminal device to display the presentation information.

9. The information processing system according to claim 8, wherein the specified sound corresponds to video content which is being reproduced in the vicinity of the terminal device.

10. The information processing system according to claim 9, wherein the server system is further configured to specify, as the presentation information, advertisement information on a product or a service which is regarding the video content and/or which appears in the video content.

11. The information processing system according to claim 9, wherein the server system is further configured to generate statistics information on the specified video content regarding the terminal system, and then transmit the statistics information to the terminal system.

12. The information processing system according to claim 9, wherein:
the server system is further configured to specify, based on the specified video content, a sequel video content to the video content, and then transmit the sequel video content to the terminal system; and
the terminal system causes a display device of the terminal device and/or the separate display device to display the sequel video content.

13. The information processing system of claim 8, wherein the server system is further configured to:
specify, based on the sound information, a time point of the sound sensed by the microphone on a time axis of the specified sound, and
determine a timing to present the presentation information based on the time point and a time table of the specified sound, the determined timing being offset from the specified time point.

14. An information processing system, comprising:
a terminal system that includes a terminal device that has a handheld form factor, the terminal system including:
a microphone provided in the terminal device for sensing a sound in the vicinity thereof;
a transceiver configured to transmit sound information representing the sound sensed by the microphone or a feature of the sound;
a controller provided in the terminal device, the controller configured to wirelessly communicate with a separate display device that reproduces video content, the communication to control how the separate display device displays the video content or how sound associated with the video content is output by at least one speaker; and
a display unit provided in the terminal device; and
a server system that includes at least one processor and a memory coupled thereto, the server system configured to:
determine the sound in the vicinity of the terminal device based on the transmitted sound information;
select presentation information to be presented by the terminal device based on the determined sound, and then transmit the selected presentation information to the terminal system;
determine, based on the selected presentation information, a control command regarding display of the video content or how sound associated with the video content is output by at least one speaker; and
transmit the determined control command to the terminal system,
wherein the transceiver of the terminal system is further configured to receive the presentation information transmitted from the server system and receive the transmitted determined control command,
wherein the display unit of the terminal device is configured to display the presentation information,
wherein the controller is further configured to control display of the video content on the separate display device or how sound associated with the video content is output by at least one speaker in accordance with the control command received from the server system.

15. A terminal system comprising:
a terminal device that has a handheld form factor;
a microphone provided in the terminal device and configured to sense a sound in the vicinity thereof;
a transceiver configured to:
transmit sound information representing the sound sensed by the microphone or a feature of the sound to a server system;
receive, from the server system, presentation information that has been specified in accordance with determined video content which is determined by the server system based on the transmitted sound information; and
receive, along with the presentation information, a control command, which has been determined in accordance with the determined video content, regarding at least one of (a) the display of the determined video content and (b) how sound associated with the determined video content is output;
a controller provided in the terminal device and configured to control functionality of a separate device that outputs the video content for display by wirelessly communicating with the separate device, the controller configured to control the functionality of the separate device in accordance with the received control command that relates to controlling how the determined video content is displayed or how sound associated with the determined video content is output; and
a display unit provided in the terminal device and configured to display the presentation information transmitted from the server system.

16. A server system communicable with a terminal system that includes a terminal device with a handheld form factor, the terminal device including a controller provided in the terminal device, which is configured to wirelessly communicate with a separate display device that reproduces video content, the communication to control how (a) the separate display device displays the video content or (b) sound is output subsequent to reception of the wireless communication at the separate display device, the server system comprising:
a processing system that includes at least one processor and a memory coupled thereto, the processing system configured to:
receive, using a transceiver, sound information representing a sound, sensed by a microphone of the terminal system, in the vicinity of the terminal device or a feature of the sound;
determine video content which is being reproduced in the vicinity of the terminal device based on the received sound information;

specify, in accordance with the determined video content, presentation information to be presented on a display device of the terminal device together with the determined video content displayed on the separate display;

determine, based on the specified presentation information, a control command regarding how sound associated with the determined video content is to be output or how the determined video content is to be displayed on the separate display device that is separate from the terminal system;

transmit the control command to the terminal system to wirelessly control the separate display device by using the controller of the terminal device in accordance with the control command, the control command adjusting how the sound associated with the determined video content is output or how the determined video content is displayed on the separate display device; and transmit, using the transceiver, the presentation information to the terminal system for display on the display device of the terminal device.

17. A non-transitory computer-readable storage medium having stored thereon an information processing program executable by a computer of a terminal system including a terminal device, the terminal device including a controller configured to wirelessly communicate with a separate display device that reproduces video content, the wireless communication to control how the separate display device displays the video content or outputs audio associated with the video content subsequent to reception of the wireless communication at the separate display device, the information processing program comprising instructions that are, when executed by the computer, configured to:

acquire a sound in the vicinity of the terminal device which is sensed by a microphone provided in the terminal device;

transmit sound information representing the sound sensed by the microphone or a feature of the sound to a server system;

receive, from the server system, presentation information specified in accordance with a video content which is determined based on the sound information by the server system;

receive a control command regarding the display of video content, or how sound is output in association with the video content, that is associated with the presentation information that has been specified in accordance with the determined video content; cause the controller of the terminal device to wirelessly control, in accordance with the control command, how (a) the separate display device displays the determined video content or (2) a speaker outputs audio that is associated with the determined video content; and cause a display unit provided in the terminal device to display the presentation information transmitted from the server system.

18. An information presentation method for programmatically using an information processing system that includes a terminal system which includes a terminal device, and a server system, the terminal device including a controller configured to wirelessly communicate with a separate display device that reproduces video content, the wireless communication to control how the separate display device displays the video content or how a speaker outputs audio content associated with the video content subsequent to reception of the wireless communication at the separate display device, the method comprising:

sensing, using a microphone provided in the terminal device, a sound in the vicinity of the terminal device;

transmitting sound information representing the sound sensed by the microphone or a feature of the sound to the server system;

determining, using at least one processor of the server system, video content which is being reproduced on the separate display device based on the sound information; and selecting, using at least one processor of the server system and in accordance with the determined video content, presentation information to be presented together with video content displayed on the separate display device;

determining, using at least one processor of the server system and based on the selected presentation information, a control command regarding the display of the video content on the separate display device or output of the audio content associated with the video content;

transmitting the control command to the terminal system to control the separate display device;

transmitting the presentation information to the terminal system from the server system;

controlling, by performed wireless communications from the controller, the display of the video content on the separate display device, or the output of audio content by a speaker, in accordance with the control command; and displaying the presentation information transmitted from the server system on a display unit provided in the terminal device.

* * * * *